United States Patent
Carlin et al.

(10) Patent No.: US 10,176,805 B2
(45) Date of Patent: Jan. 8, 2019

(54) NETWORKED AUDIBLE AND VISUAL ALARM LIGHT SYSTEM AND METHOD WITH VOICE COMMAND CONTROL AND BASE STATION HAVING ALARM FOR SMOKE, CARBON MONOXIDE AND GAS

(71) Applicants: John A. Carlin, Buffalo, NY (US);
Kevin A. Grupp, Clarence, NY (US);
Michael Arno, Clarence, NY (US);
Stephen Scordato, Lockport, NY (US)

(72) Inventors: John A. Carlin, Buffalo, NY (US);
Kevin A. Grupp, Clarence, NY (US);
Michael Arno, Clarence, NY (US);
Stephen Scordato, Lockport, NY (US)

(*) Notice: Subject to any disclaimer, the term of this patent is extended or adjusted under 35 U.S.C. 154(b) by 16 days.

(21) Appl. No.: 15/478,664

(22) Filed: Apr. 4, 2017

(65) Prior Publication Data
US 2018/0082685 A1    Mar. 22, 2018

Related U.S. Application Data

(60) Provisional application No. 62/397,598, filed on Sep. 21, 2016.

(51) Int. Cl.
G10L 15/22 (2006.01)
G08B 17/10 (2006.01)
H05B 37/02 (2006.01)
H05B 33/08 (2006.01)

(52) U.S. Cl.
CPC .............. *G10L 15/22* (2013.01); *G08B 17/10* (2013.01); *H05B 33/0872* (2013.01); *H05B 37/0236* (2013.01); *G10L 2015/223* (2013.01)

(58) Field of Classification Search
CPC ...................................................... G10L 15/22
See application file for complete search history.

(56) References Cited

U.S. PATENT DOCUMENTS

| 4,467,184 A | * 8/1984 | Loessel ............. G05D 23/1917 219/492 |
| 4,694,285 A | 9/1987 | Scripps |
| 7,786,879 B2 | 8/2010 | Lax |

(Continued)

*Primary Examiner* — Shreyans A Patel
(74) *Attorney, Agent, or Firm* — Vincent G. LoTempio; Kloss, Stenger & LoTempio; David T. Stephenson

(57) ABSTRACT

A networked visual and audible alarm light system and method with voice command control and base station having alarm for smoke, carbon monoxide, and gas provides illuminating LEDs, audible alerts, a base control, and a voice command control. The system detects and alerts to smoke, carbon monoxide, and gas. Multiple light fixtures audibly and visually alert in different colors, patterns, and intensities, dependent on the type of event detected. A network of systems are monitored and controlled from a base station that facilitates communication therebetween. The system provides speech recognition for powering on and off, dimming, brightening, and adjusting the lighting; including presets and emergency situations. The voice recognition command controls lighting choices, and can silence or suspend alarm-state by verbally commanding SHUT OFF. The base station monitors and programs individual LED and detecting devices that create a network within a home or structure to manage lighting and security.

20 Claims, 25 Drawing Sheets

(56) References Cited

U.S. PATENT DOCUMENTS

| | | | |
|---|---|---|---|
| 2008/0278007 A1* | 11/2008 | Moore | H01H 3/022 |
| | | | 307/116 |
| 2009/0237260 A1 | 9/2009 | Bradley, Jr. et al. | |
| 2010/0271802 A1* | 10/2010 | Recker | H05B 33/0803 |
| | | | 362/20 |
| 2014/0042909 A1 | 2/2014 | Chan | |
| 2014/0266747 A1 | 9/2014 | Prendergast | |
| 2014/0376747 A1* | 12/2014 | Mullet | G08C 23/00 |
| | | | 381/110 |
| 2015/0312394 A1* | 10/2015 | Mirza | H04M 1/7253 |
| | | | 455/420 |
| 2016/0118043 A1* | 4/2016 | Huang | G10L 15/22 |
| | | | 704/275 |
| 2016/0241947 A1* | 8/2016 | Degraye | H04R 3/12 |
| 2017/0213440 A1* | 7/2017 | O'Larte | G08B 21/182 |
| 2017/0352111 A1* | 12/2017 | Kuenzler | H05B 37/02 |
| 2018/0112834 A1* | 4/2018 | Rzasa | F21L 4/08 |
| 2018/0158460 A1* | 6/2018 | Lee | G10L 15/22 |
| 2018/0160510 A1* | 6/2018 | Ramer | H05B 37/0227 |

* cited by examiner

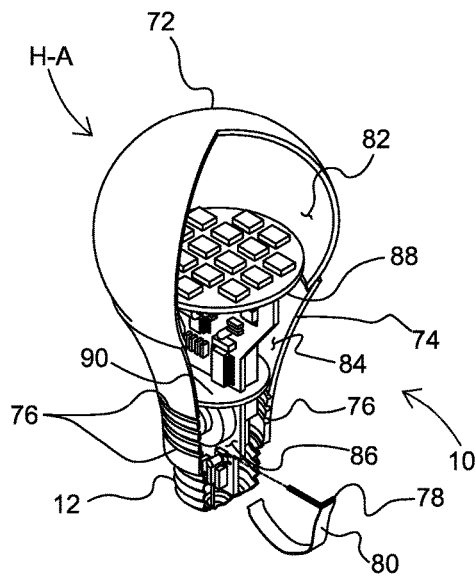
FIG. 3a
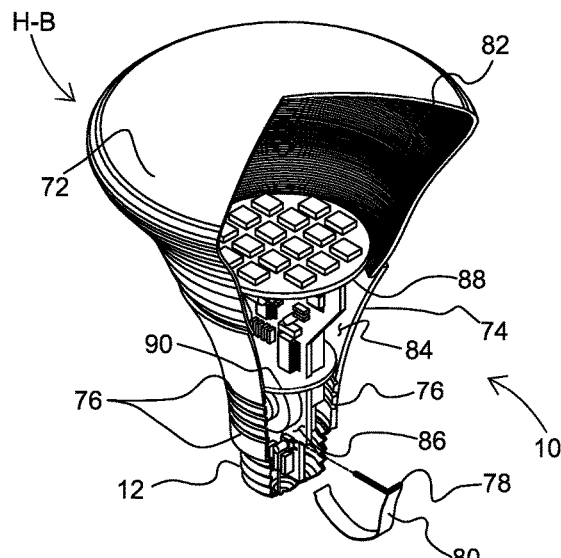
FIG. 3b
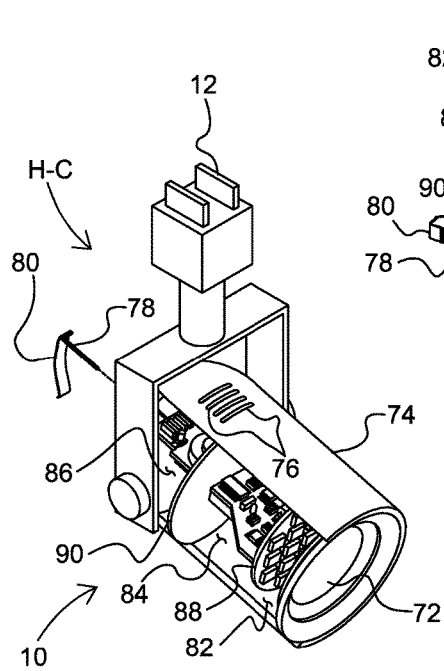
FIG. 3c
FIG. 3e
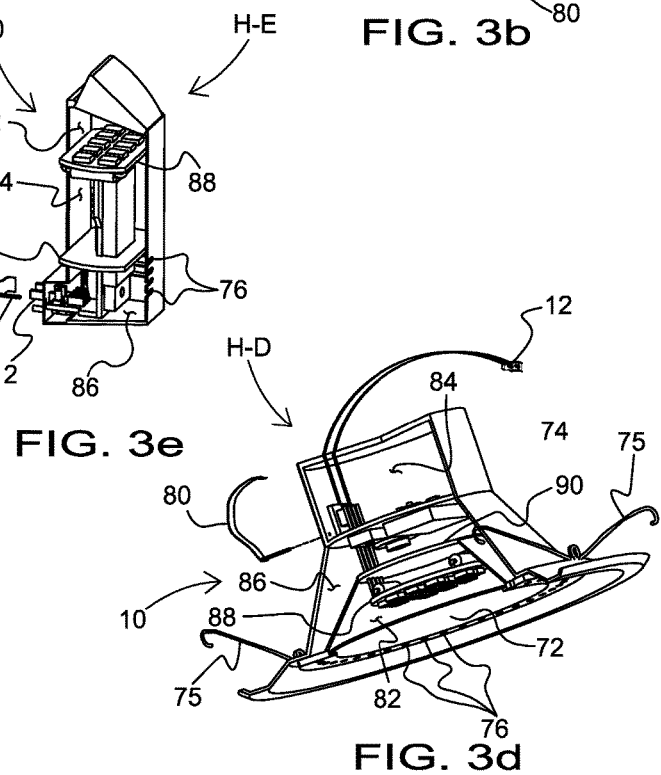
FIG. 3d

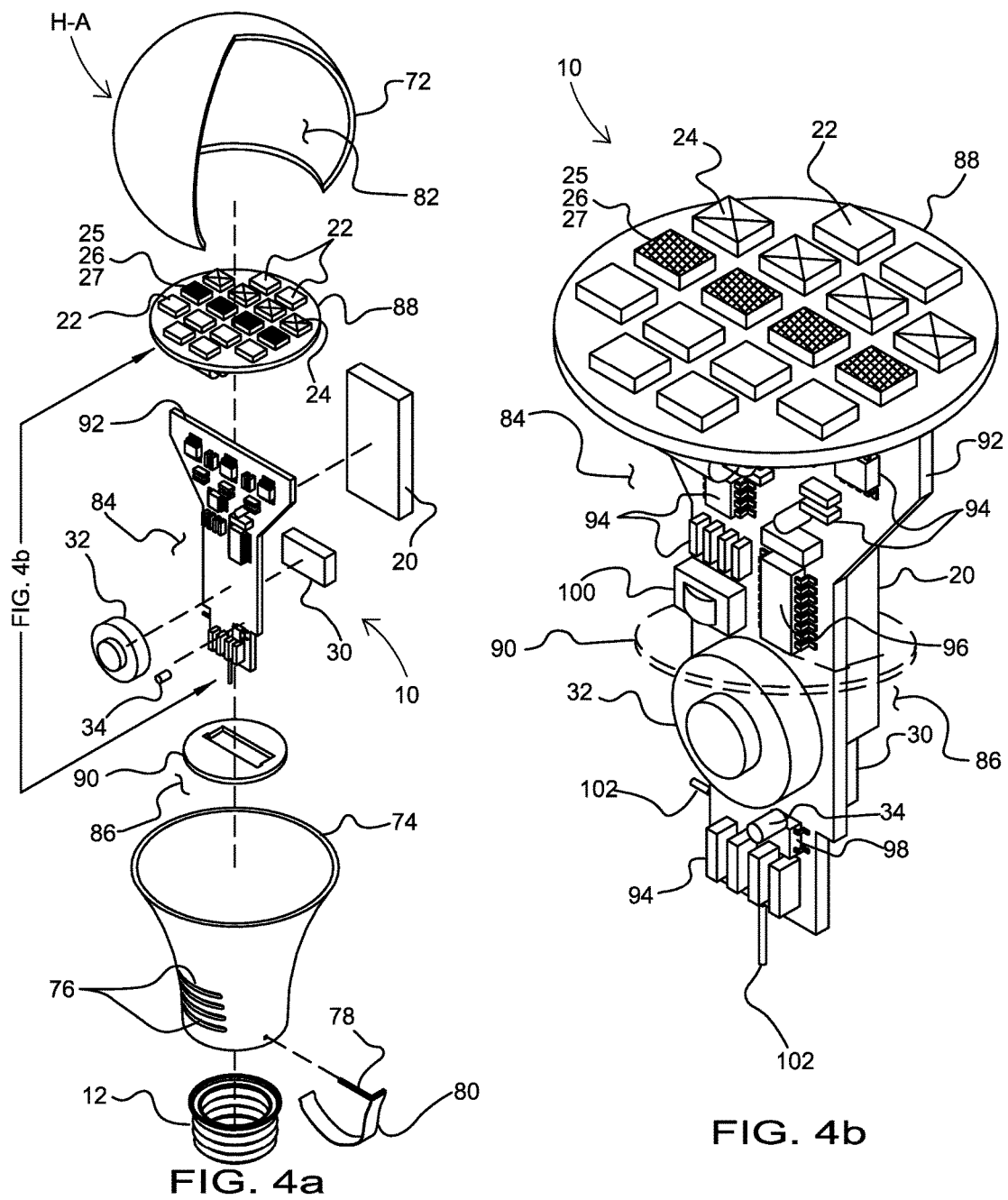

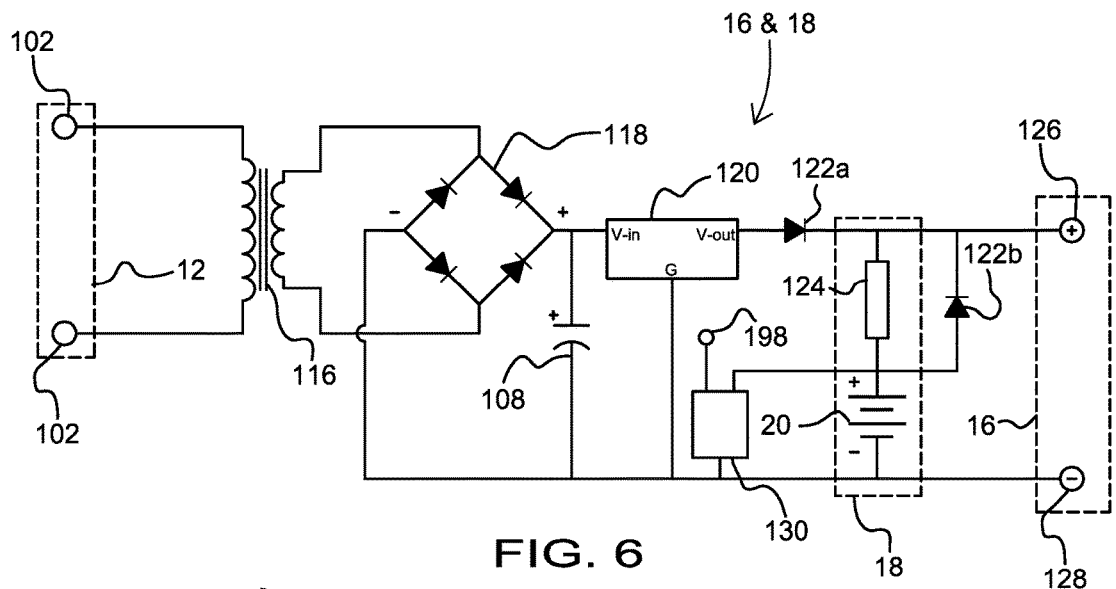
FIG. 6
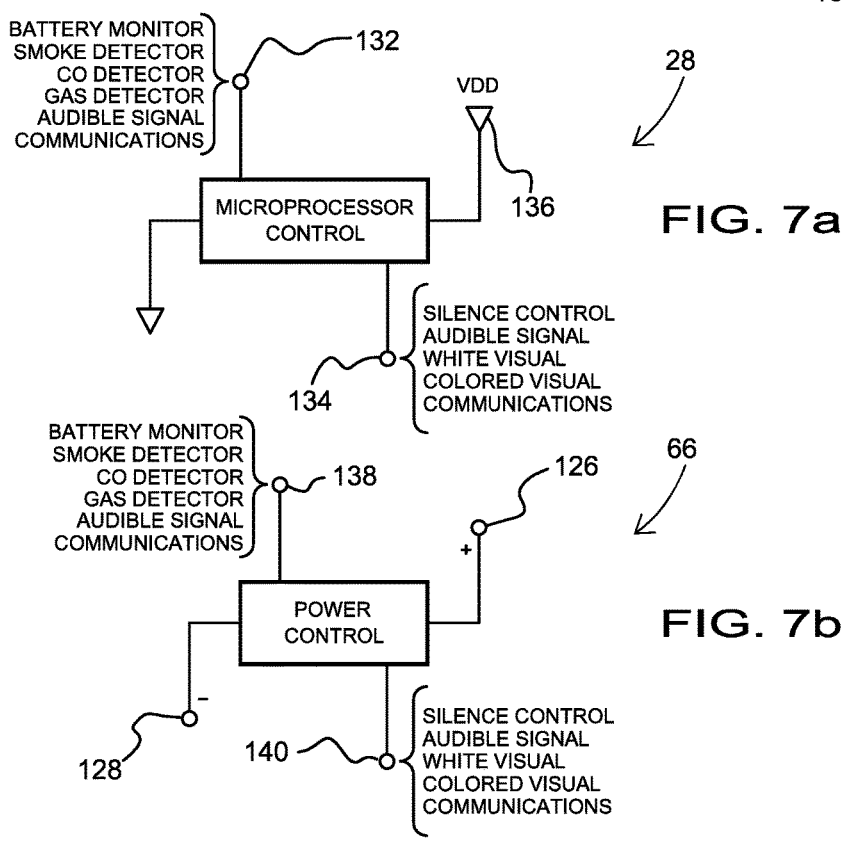
FIG. 7a
FIG. 7b

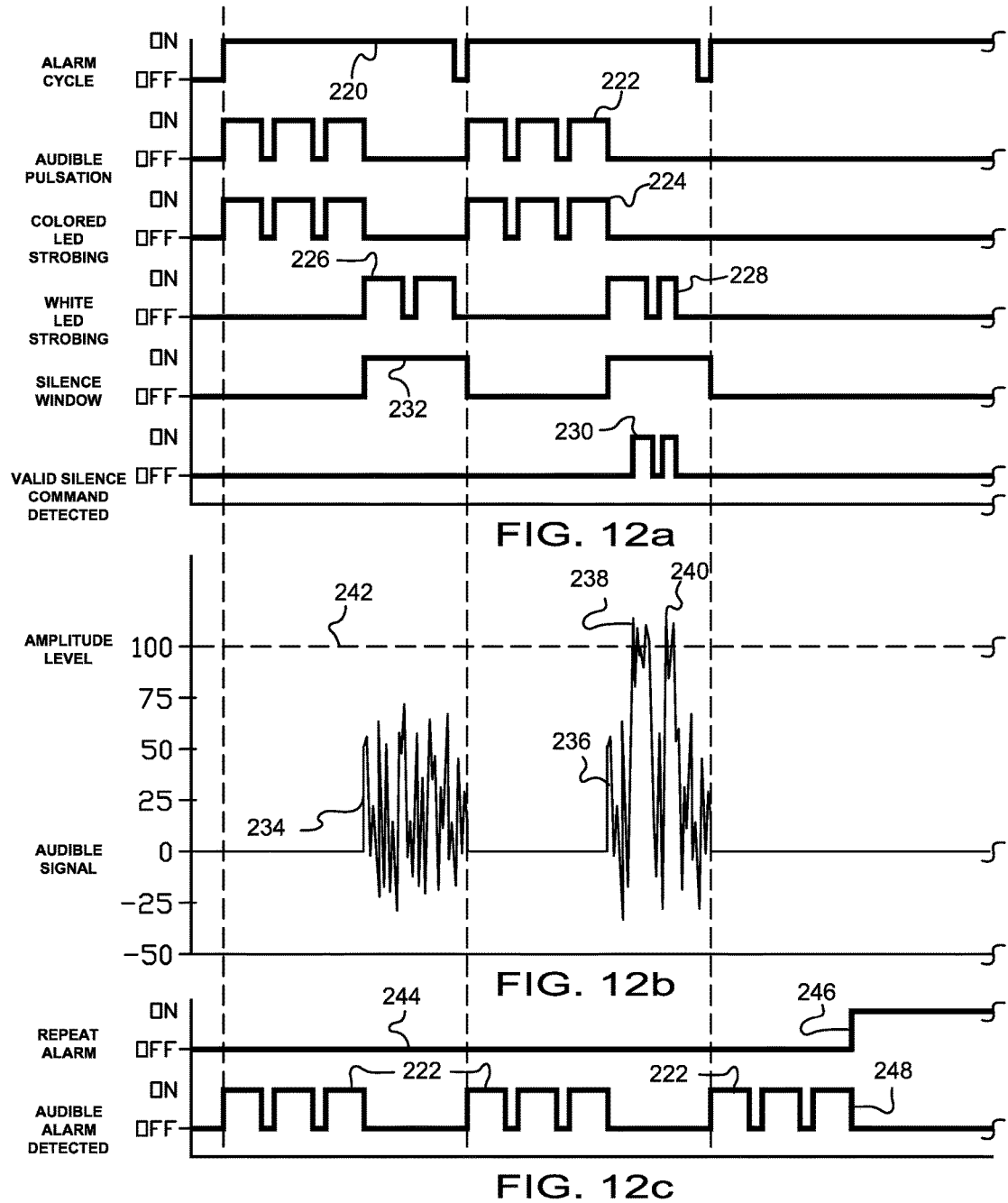

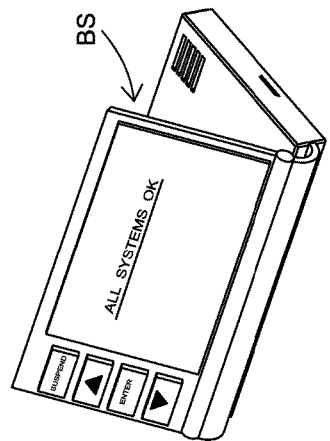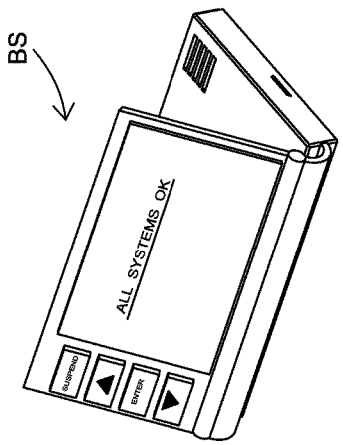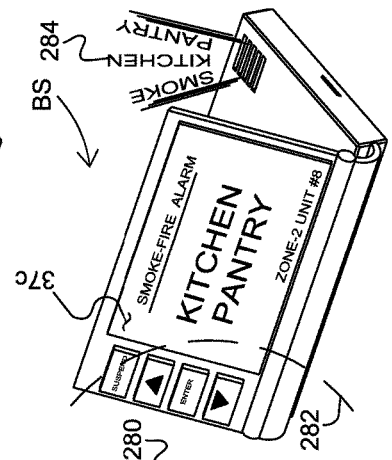
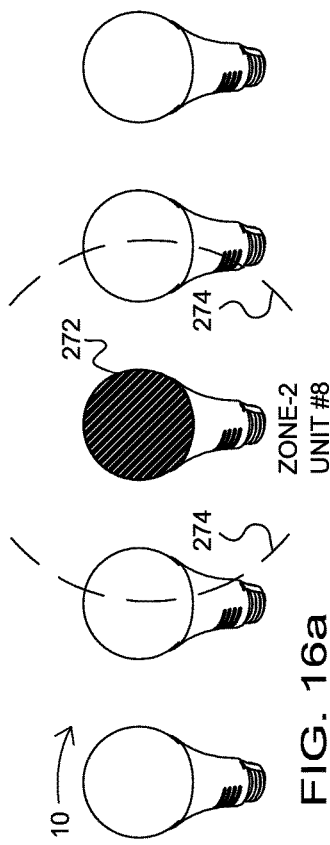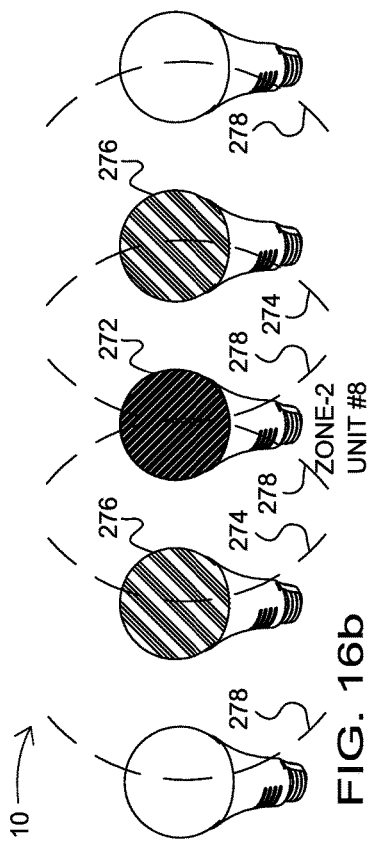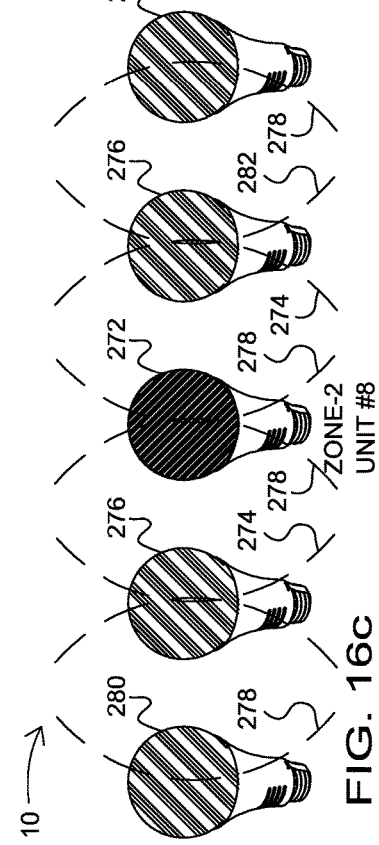
FIG. 16a　　　　　FIG. 16b　　　　　FIG. 16c

NETWORKED AUDIBLE AND VISUAL ALARM LIGHT SYSTEM AND METHOD WITH VOICE COMMAND CONTROL AND BASE STATION HAVING ALARM FOR SMOKE, CARBON MONOXIDE AND GAS

CROSS REFERENCE OF RELATED APPLICATIONS

This application claims the benefits of U.S. provisional application No. 62/397,598, filed Sep. 21, 2016 and entitled LED LIGHT BULB WITH VOICE COMMAND CONTROL, HAVING ALARMING APPARATUS FOR SMOKE, CARBON MONOXIDE & GAS, SYSTEM AND METHOD THEREFORE, which provisional application is incorporated by reference herein in its entirety.

FIELD OF THE INVENTION

The present invention relates generally to a networked visual and audible alarm system and method with voice command control and base station having alarm for smoke, carbon monoxide, and gas. More so, the present invention relates to the field of illuminating light bulbs that also function as an alarming device while enabling a voice command to regulate operation of illumination and audible alarms by the system, and further the detection of smoke, carbon monoxide or gas for signaling alarms of the presence thereof.

The present invention relates to the provisional patent filed as: LED LIGHT BULB WITH VOICE COMMAND CONTROL, HAVING ALARMING APPARATUS FOR SMOKE, CARBON MONOXIDE AND GAS, SYSTEM AND METHOD THEREFORE. And even more specifically, the present invention relates to an alarm system and method that provides a plurality of alarm systems networked through a base station or central control and controllable with a plurality of predetermined voice commands and at least one voice pattern; whereby the alarm systems audibly and visually alerts to at least one event, such as smoke, carbon monoxide, and general gases; whereby the alarm systems are systematically disposed through different sections of a structure; whereby each alarm system independently emits an audible signal, dependent on the type of event detected in the respective section for the alarm system; whereby each alarm system illuminates a high strobe light at a variable color and intensity, dependent on the type of event detected in the respective section of the alarm system; whereby the alarm systems comprises a microphone for listening for a silence alarm command, and for communicating with adjacent alarm systems of lesser functionality system of the inventors earlier patent (sound only), so as to initiate the audible signal and the high strobe light upon detecting an audible signal from an adjacent alarm system; the present patent utilizing a higher function of radio frequency (RF) with coded signals to communicate, having both sound and RF signaling capabilities, assures that all systems (one with lesser functions and those with higher functions) are compatible with base station control; and whereby each alarm system emits an independent audible signal and high strobe light, dependent on the type of event in the specific section of the alarm system; whereby the alarm systems comprise a voice activated control portion for enabling a user to power off the alarm system when in the alarm mode Also, the alarm system may include a unique speech voice recognition controller that is operational in a lighting lamp fixture. In one embodiment, multiple lighting lamp fixtures network with one another, also network with a base station control-center. The voice recognition controller helps tie together all the alarm systems and the base station control-center together; whereby the lighting lamp fixture snaps together to actuate a rechargeable battery active and prepare the system for service. The base station control-center receives and transmits real-time radio frequency (RF) communications both to control all systems system wide and display alarm events as to location and type of danger; whereby the communications means having a unique coded ID representing every aspect of every individual system in the network; whereby an embodiment that utilizes the microphone for voice control commands via speech recognition; whereby the voice speech recognition controller comprises of three parts: an awareness/trigger part, a correlative part, and a directive part; said parts comprising a lighting command such as light-table-dim' that can be spoken in any order.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

In the field of Light Emitting Diode (LED) light bulbs, there exists a need to expand their usefulness. Likewise, in the fields of smoke and/or carbon monoxide/gas detection devices, there exists a need to enlarge their utility. In countless applications of these devices, there is no crossover of functionality, where the placement of an illuminating light bulb could also signal and alarm of a deadly element present in the immediate environment. The signaling that could produce both an audible and visual alarm and be monitored at a base station. The illuminating light bulb accepts voice commands to automate lighting and make a more useful convenience.

LED light bulbs are manufactured in most any style lamp to match older incandescent bulbs, and even newer halogen, florescent, etc. type bulbs, to give illumination. These devices are useful and use just a fraction of energy to operate them over prior art lighting technologies. Most LED lamps are produced using 120 VAC Line power (220/230 VAC depending where in the world they are marketed) as the supply voltage, to provide and easy and convenient direct replacement, and are found more and more homes, offices and industry. Similarly, smoke and carbon monoxide alarming devices, manufactured in their most common configuration for homes, etc., provide a level of self-assurance and are a must to have in any home for safety; while a slightly more sophisticated configuration can be found in every office, institution and industry setting.

While it is obvious that these independent devices have tremendous acceptance around the world, it is their independent character that leads to problematic situations. For example, even though lights are virtually everywhere in a home, should a smoke detector audibly signal an alarm, the lights do not turn on to aid in firstly, a visual signaling of the alarm, and secondly, to illuminate the affected area. Another problem is when a smoke detector signals alarm from a minor mishap; such as someone burning toast. This has virtually happened to everyone, and the results are that the smoke detector is disassembled by removing the battery to silence the 'nuisance' alarm, or if powered by line, disconnecting the line power; just to keep peace. Still another example is when these battery operated smoke and carbon monoxide/gas detecting devises run low on battery power, they emit an audible 'chirp' to indicate their battery needs to be replaced. Although this is good and practical information, many such as elderly or the disabled, can do nothing to stop the constant chirping of a low battery smoke or carbon monoxide detector device. They must simply stay in their homes and endure the annoyance of the audible chirping until an able boded person can change-out the battery. This situation of changing batteries can be a challenge even too many so called normal people; due to lack of being able climb a step ladder or stand on a stool.

Further, there is no convenient monitoring base station or central control for typical homes and buildings; excluding the above mentioned slightly more sophisticated configuration smoke and carbon monoxide detectors that can be found in large office, institution and industry setting, where they are 'hard-wired' together and powered by AC Line power with battery backup systems. These units are found in large facilities and have location identification means, usually at their main entrance, and are meant for the fire department to quickly find a fire-breakout in the building (not the user to ascertain their localized situation other than simply alarming an audible signal). And finally, the conventional LED light bulb must be controlled ON/OFF or DIM via wall switches most commonly, and more unusual, via a 'smart phone' application, designed to control lighting from anywhere such as your home in New York state while in Florida.

Having a light bulb that incorporates a smoke detector, carbon monoxide detector or gas detector (such as natural gas), and, with a rechargeable battery, would greatly reduce or eliminate the aforementioned problems. Such a device would be configured to replace any conventional light bulb in table lamps, recessed ceiling fixtures, furniture lamps, track lighting, nightlights, etc., and operate as usual with respect to lighting. When AC Line power is provided, the light will illuminate. Further the AC Line power will keep the rechargeable battery at full charge, and provide power for the detecting circuits of smoke or carbon monoxide/gas. When the AC Line is OFF, the battery will keep alive necessary circuitry to monitor for smoke or carbon monoxide/gas and would signal alarm if necessary.

The light bulb that incorporates a smoke, carbon monoxide or gas detectors, and, with a rechargeable battery would signal alarm both audibly and visually. The audible signal would be the familiar piercing pulsation of sound, and, the visual signaling would be a strobing alternately of high intensity white and colored LED's. The colored LED's would indicate the 'type' of danger present, such as red for smoke and amber for carbon monoxide and blue for gas (all being a dangerous environment), and, if just repeating the alarm would indicate the alarm in green strobing light; meaning the area does not have the presence of smoke, carbon monoxide or gas; but such danger is nearby (such as in an adjoining room).

In the case of an annoyance signaling of an alarm, such as the earlier mentioning of burning toast, the system further would incorporate a silencing circuit. This silencing circuit would listen, between the audible pulse emissions. If it hears two sharply structured reverberations, such as in someone shouting the words (within its silencing range) "SHUT OFF" within the brief window of time, the device would suspend the alarm state, for example one minute. If the air was not cleared after that period of suspension of time, the alarm would continue. The user could tell it to shut-off again until all air is clear. No one need to remove the battery just to make peace and quiet.

An improved system would also include a testing means of both the audible and visual alarming, such as by turn the system ON/OFF/ON in quick succession, within one second to activate a test mode. In the test mode the alarm state will last for five second, or, be silenced via a silence command response. In a system wide test, the base-station/control center would 'query' the network of system of the present invention, to test both audible and visual strobing, network wide.

In the case of a low battery situation, for example in a room that is rarely used like a guest bedroom, the device would 'chirp' as usual in prior art, if the battery gets too low. But unlike the situation mentioned above, where a helpless individual has had to endure the continued annoyance of the chirping low battery detector, the user of the present invention would simple turn the lamp or fixture ON (providing VAC Line power) for a short period of time. This would sufficiently re-charge the battery and chirping would immediately stop.

Voice activated command control of the lighting function affords great convenience to the user. By simply leaving the wall-switch or lamp on/off switch, in the ON position at all times (or eliminating it altogether), the lighting can be controlled via voice commands to a whole selection of helpful functions. The unit can be preset to modes such as AUTO; offering illumination by one simply walking into an area and having it turn off again when leaving. Or, TIMER; turning the fixture on and off at arbitrary times at pre-set levels of intensity (within a predetermined time range) making it look like occupants are home. Further the lamp accepts several other commands to temporally changing settings simply by requesting such change verbally. Such commands as to DIM, or to BRIGHT, to turn OFF or turn ON; until the next 'mode' schedule or event occurs. When coupled with the base-station/control-center, the convenience is further achieved by controlling the whole house using voice commands.

Such convenience as going to bed with all the usual lights on, and then from the convenience of the master bedroom, commanding the base-station/control-center verbally, to enter NIGHT-MODE or EMERGENCY lighting (especially in a battery mode of operation of just 20% illumination capacity to save battery energy). Such commands could turn off any living illumination through-out the home network while turning on any desired 'security' type lighting as was predetermined when setting-up the mode via the base-station/control-center. A TEST feature allows testing the system functionality at any time, will step-through each LED and sound at the user command. Such functions are too impractical by an application on a smart phone alone (smart phone batteries frequently go dead or the phone goes missing, misplaced, etc.), but, by a dedicated control-center designed specifically to manage lighting, and most importantly, dangerous possibilities such as smoke, carbon monoxide and gas detection. The present invention utilizes a smart phone application, but it is in conjunction with the base-station/control-center that is always present and giving status.

The present patent provides structure to affect a more efficient means to both illuminate rooms in any home or building as well as provide smoke and/or carbon monoxide and/or gas detection to signal alarm; all in one direct replaceable package, configured to any conventional light bulb of any technology. The result of this unique approach, reduces the stressful need to silence annoyance alarms by removing the battery until the air is cleared, and, the painful enduring of low battery chirping. Alarm signaling means are both audible and visual, and work either on AC Line power or its own rechargeable DC battery power. Further, the present patent makes it favorably ease to install. One needs only to replace their current prior art light bulb with the improved LED light bulb system with smoke or carbon monoxide or gas detection and signaling, of the disclosed device. A home or building could have as many of these improved light/smoke detecting (carbon monoxide detection or gas) lamps as there are fixtures, creating a system network of alarm signaling devices; greatly improving the self-assurance of lives.

Further, the undesirable effects of independent lights and smoke/carbon monoxide/gas detections devices of prior art are all eliminated. With the radio frequency (RF) short-range communications connectivity circuit is present in the device, should an alarm be activated by one unit, other similar devices within the defined range can also activate their alarms; giving further rise to a potentially dangerous situation. This networking of these improved lighting/detecting systems would give a possible safer escape route by the colored LED light at each localized alarming device. That is, red indicating smoke is present, amber indicating carbon monoxide is present, blue indicating gas is present, and, green meaning neither smoke nor carbon monoxide or gas is present, but, in a repeat alarm state to give rise of a danger within range (nearby) of another network device that is signaling a danger alarm.

And with great importance, a base-station/control-center, meant to be located in the master bedroom and other centrally located arias such a kitchen or family room or the crossroads of activity, would read these transmitted signals of alarm via coded ID identification and display their exact status and locations. Still further, the base-station/control-center means can read, non-registered 'like' systems, such as in a neighbors dwelling, in an adjacent apartment building or other joining living spaces, to give an early warning alarm of nearby danger.

Importantly the base-station control center, combined with a network of LED lamp/danger detection devices, all affording the convenience of verbal voice commands to control and display, both light living environment, and if a danger is present, indicate in visual and auditable escape means.

Prior to the filing of this application, the subject inventors conducted a patentability investigation in the field light bulbs, LED lighting, smoke, carbon monoxide & gas detectors and related systems. The following patents were uncovered in the search.

| Inventor | Reg. No. | Date |
| --- | --- | --- |
| Prendergast | US 2014/0266747 A1 | Sep. 18, 2014 |
| Lax | U.S. Pat. No. 7,786,879 B2 | Aug. 31, 2010 |
| Bradley, et al. | US 2009/0237260 A1 | Sep. 24, 2009 |
| Lax | US 2007/02852 A1 | Dec. 13, 2007 |
| Scripps | U.S. Pat. No. 4,694,285 | Sep. 15, 1987 |
| Chan | US 2014/0042909 A1 | Feb. 13, 2014 |

Prendergast—In the U.S. Patent Application, 2014/0266747 A1 has paired smoke and carbon monoxide detectors concealed within a light fixture. These paired detection devices are electrically coupled to a light bulb comprising a lighting fixture. They are effectively a smoke detector, a carbon monoxide detector all within a light fixture.

Lax—U.S. Pat. No. 7,786,879 B2 will screw into a 110-volt light socket and uses a rechargeable battery within smoke and carbon monoxide detector. The detector has indicating LED's showing available 110-volt power, or smoke detected, or carbon monoxide detected as well as a speaker. The system will receive a 110-volt light bulb so the socket can continue to be used as a light source.

Bradley, et al. —U.S. Patent Application, 2009/0237260 A1 having a base containing a threaded female socket similar to a standard light bulb, and, a corresponding male threaded connector. The system thus is able to be electrically connected to, as well as physically mounted to, by simply screwing the male threaded connector into the female threaded socket; making the device serviced as easily as changing a light bulb.

Lax—U.S. Patent Application, US 2007/0285262 A1 will screw into a 110-volt light socket and uses a rechargeable battery within smoke and carbon monoxide detector. The detector has indicating LED's showing available 110-volt power, or smoke detected, or carbon monoxide detected as well as a speaker. The system will receive a 110-volt light bulb so the socket can continue to be used as a light source.

Scripps—U.S. Pat. No. 4,694,285 combines an electrical smoke, heat detector and electrical light in a single unit which may be attached to an electrical fixture. Also within the housing is a light socket for reception of a light bulb. The smoke and heat detector can alarm when sensor is activated.

Chan—U.S. Patent Application, US 2014/0042909 A1 is an energy-saving LED illumination device having a drive control unit placed on a detachable and replaceable voice control module, and electrically connected to a voice sensing unit to receive the signal and emit a driving signal, thereby turning on or turning off the light source.

None of the above approaches in the prior art discloses a means for integrating a LED lighting means with smoke, carbon monoxide and gas detection means within a single bulb 'housing' envelope. Also none of the listed prior art can or will directly replace a conventional sized or shaped light bulb, configured to any style or type. They all present housings of some structure that 'fit' between a lighting fixture and a conventional light bulb. And as such, thus making it impossible to be installed practicably into common lighting possibilities in general homes or buildings. While the prior art does detect smoke or carbon monoxide, they do not signal alarm both in audible and visual strobing of high intensity, with alternating different color light. Please note that some prior art listed has an LED 'indicating' an alarm. These LED's cannot be defined from any distance, say across a room, and most certainly cannot in a smoky environment as may be present in the case of a smoke alarm. They simply indicate that an alarm state is active (much like a stereo may have an LED to indicate that it is ON), and have no practicable value as a visual stimulus meaning a danger is present; as would be by strobing high intensity LED's of alternating white and color specific lights, giving urgency to the alarm situation, such as red for smoke, amber for carbon monoxide, blue for gas, and green none of the above in the immediate area, but indicating a danger is nearby.

Further, none of the prior art addresses a silencing of nuisance alarms (as in the case of accidentally burning toast mentioned earlier), to temporarily suspend an alarm state, by someone simply shouting the words "SHUT OFF" (or the alike) within the brief window of time, to silence the alarm. And finally, none of the prior art contemplated an optional feature to communicate via a short range RF coded ID signal to transmit and receive, that an alarm has been activated. While other 'like' improved LED light bulbs, of the present invention, would hear said signal via its listening microphone, and repeat the alarm state. Thus, should an alarm active, due to smoke, carbon monoxide or gas detection in the farthest area of a home, the alarm signal would migrate through the remaining home, warning of a dangerous situation. In the case of the above scenario, only the lighting units physically sensing smoke or carbon monoxide would pulse with the high intensity white and colored LED's (red for smoke, amber for carbon monoxide and blue for gas respectively). All the other lighting units, not physically sensing smoke, carbon monoxide or gas would pulse with the high intensity white LED' and green LED's. This networking, via coded ID signals and read by a base station displaying the exact type, location and urgency, of the improved light bulb of the present invention is intended to give direction as to where the danger is physically in the building. That is, for example, one responding in the middle of the night, to a base-station giving notice of smoke in the laundry room, and if one then exited to the middle of a long hallway such as from a bedroom, and high intensity white and red LED's were strobing at one end (the laundry room), and, high intensity white LED's and green at the other end, the way to exit the building would be to the white and green end. Importantly, the LED light bulb of the present invention not only gives audible and visible alarming, but, through networking via short range communications with other like devices can guide users out of the building in the most practical exiting manner, away for the danger. The base-station control center, ties all system units (lamp/danger detector apparatuses) together, affording immediate and timely updated status of the whole network as dangerous events unfold nearby, and provide useful emerging, escape information.

And lastly, with respect to the LED light bulb illuminating voice command features, the present invention provides convenient control of lighting in several modes (AUTO, TIMER, NIGHT, EMERGENCY, TEST, etc.) of operation including temporary changes simply by verbally commanding a desired light effect; such as DIM, BRIGHT, ON, OFF, PRESET, etc). And when coupled with the base-station/control-center, comprises a home safety/security/lighting/convenience/control system unmatched by any prior art; either individually or when combined.

SUMMARY

Illustrative embodiments of the disclosure are generally directed to a networked visual and audible alarm system for synchronized alerting to smoke, carbon monoxide, and gas by a network of alarm systems that communicate with each other and with a base station that is operable with electronic coding for each alarm. Significantly, the alarm system also utilizes a unique voice recognition to control illumination and audible alerts, and that is operable through a speech voice recognition controller. The speech recognition controller is operationally integrated in a lighting lamp fixture, allowing a user to control various aspects of lighting and powering of the alarm system through a plurality of predetermined voice commands and at least one voice pattern.

In one embodiment, the alarm system serves to provide multiple light fixtures that attach in standard areas of rooms in a building, i.e., master bedroom, living room, kitchen, etc. The alarm system works to audibly and visually alert to at least one event, such as smoke, carbon monoxide, and hazardous gases in general. The alarm system is systematically disposed through different rooms of a house. Each alarm system independently emits an audible signal, dependent on the type of event detected in the respective room of the alarm system. Multiple alarm systems can be in communication to form a network, such that the systems are able to communicate through audible transmission of pulsations. The alarm systems also emit variously colored strobe lights at a variable color and intensity, dependent to indicate to occupants of a structure the type of danger and to highlight exit and entry points in the structure. The signaling from the alarm systems generates both an audible illumination of varying colors and patterns, and an audible alert.

In some embodiments, multiple alarm systems form a network in a house or office. In one embodiment, multiple alarm systems are monitored and controlled from a base-station control-center that facilitates communication between multiple alarm systems in the network. The base-station control-center is operable to program, monitor and display all detection systems in the building network area, such as a home. The base station provides control and information to the user that is unavailable by any other means. The base station is programmed with a unique coding system to establish identification of the device manufacturing iteration, a house code, a unit number and location designator, and an alarm category. Thus, each alarm system has its own, unique code. The base station also enables connectivity with a cellular line, a land-line, and a computer.

The base station control-center may be located in the master bedroom and other centrally located areas such a kitchen or family room; where there are the crossroads of activity, would read these transmitted signals of alarm and display their status and locations. Additionally, the base station means can read, non-registered 'like' systems, such as in neighbors dwelling in an apartment building or other joining living spaces, to give an early warning alarm of nearby danger. A unique electronic coding ID system would tie together the alarm systems with the base station for an efficient communication protocol.

In some embodiments, the alarm system ingrates a unique speech recognition function to regulate the visual illumination an audible alarm. The voice activated version of the alarm system is operationally integrated inside a two-piece housing that contains the components necessary for home safety, security, lighting, convenience, networking control system comprised of an illumination and danger detection of smoke, carbon monoxide, and gas. In this manner, a voice command can be picked up from any room in the house.

In one embodiment of voice recognition functionality, the alarm system comprises a speech voice recognition controller. The speech recognition controller is operational in a lighting lamp fixture. In one embodiment, multiple lighting lamp fixtures network together. In another embodiment, the networked lighting lamp fixtures also network with the base-station control-center. The voice recognition controller helps tie together all the alarm systems and the base station control-center together.

In construction, the lighting lamp fixture resembles a standard light bulb known in the art, while also housing the components of the alarm system. The lighting lamp fixture is modular and snaps together to actuate a rechargeable battery, preparing the alarm system for service. The base-station control-center receives and transmits real-time radio frequency (RF) communications both to control all systems system wide and display alarm events as to location and type of danger. These communications may include a unique coded ID representing every aspect of every individual system in the network.

In one embodiment, the speech voice recognition controller comprises a microphone for voice control commands via speech recognition.

In some embodiments, the speech voice recognition controller comprises three parts: a trigger portion, a correlative portion, and a directive portion. These portions include a lighting command that commands a light to turn on, dim, and turn off. The lighting command may include, without limitation, light-table-dim' that can be spoken in any order (for example; table-light-dim, dim-table-light, etc.

In one embodiment, the trigger portion is a 'LIGHT' prompt.

In another embodiment, the correlative portion is an object to assign any of the alarm system.

In another embodiment, a CEILING command actuates a light, lamp, or fixture on the ceiling such as a recessed, track, flood, etc.

In another embodiment, a FLOOR command actuates a light, lamp, or fixture with the base on the floor such as a floor standing lamp, etc.

In another embodiment, a TABLE command actuates a light, lamp or fixture on a table.

In another embodiment, a WALL command actuates a light, lamp or fixture on a wall, or light shining a wall, such as from wall projection lighting, art lighting, wall sconces, nightlight, etc.

In another embodiment, the directive portion is an instruction that is used to command a function ON, OFF, DIM, BRIGHT, NIGHT, PRESET, and EMERGENCY.

In another embodiment, the alarm system comprises a plurality of modes of operation responding to voice commands. The voice commands being: AUTO, TIMER, RESET (NONE), TEST, and the modes being a manner of operation.

In another embodiment, a CHANGE-AUTO command is operable to enable the alarm system to behave by turning lighting ON and OFF when a motion is sensed and present in the immediate area range of the system.

In another embodiment, a CHANGE-TIMER command actuates the alarm system to power on and off lighting in a timed interval. The time interval automatically scales to increase and decrease length of interval giving an appearance that someone is physically causing the lights to turn on and off in a daily routine.

In another embodiment, a CHANGE-RESET command allows the alarm system to return to a 'no-mode' or 'none' state, e.g., neither AUTO or TIMED or TEST mode of operation.

In another embodiment, a CHANGE-TEST command actuates the alarm system to 'step-through' and alarm state with both audible sounding the alarm and visually strobing the various colored LED lights as the unit may be equipped.

In another embodiment, the alarm system provides a plurality of functional voice commands, including: ON, OFF, DIM, BRIGHT, PRESET, NIGHT, and EMERGENCY. These functions are an action of a task.

In another embodiment, an improved alarm system is operational to control lighting. This makes a conventional 'on/off switch' virtually obsolete. Thus, the alarm system is voice controlled via speech recognition commands. In one embodiment, the on/off switching of a light, lamp or fixture can be present but left in the 'ON' position (as is the case of replacing prior art lighting). Or, the switch can be removed completely (as in the case of a new building construction).

In another embodiment, the voice commands of 'DIM' actuates the light to dim at increments of 20% illumination, and a command of 'BRIGHT' actuates the light to increase increments of 10%.

For example, a voice command of 'ON' to illuminate the system 100%. The voice command of 'OFF' the light, returning the system to 0% of full illumination.

The system also provides a voice command of 'DIM' to decrease the light by 20% for each dim command.

The system also provides a voice command of 'BRIGHT' would increase the system by 10% for each command, The system also provides a voice command of 'NIGHT' to change the level of illumination from the range of 0% to 100%, as desired for night security.

The system also provides a voice command of 'PRESET' to change the level of illumination from the range of 0% to 100%, as desired for living environment lighting, The system also provides a voice command of 'EMERGENCY' to actuate one of two emergency lighting states. One emergency lighting state occurs when 120/230 VAC line power is available, whereby the light flashes full ON and OFF to give a 'panic' alert state. The other emergency lighting (non panic) state occurs when 120/230 VAC line power is not available. This illuminates about 20% via battery power, for an emergency lighting (non panic) state.

The system and apparatus also provides a voice command to suspend alarm state when verbal commanded of SHUT OFF alarming is articulated. The alarming state may then continue at end of suspension period of time, if alarm conditions were not cleared.

In correlation with the above mentioned voice commands, the base-station control-center networks with all the 'alarm' systems, identifying each individual alarm system and its state of quiescence or alarm as the case may be, the battery level, the functionality (to include query and test), and the alarming systems that are 'out-of-network' but within communications range; and thereby giving early warning of a danger in a nearby structure. Further, the base station control-center also enables fast and easy assignment to each individual light fixture in the network.

Other objectives of the present invention for an improved LED light bulb system is incorporating a smoke detector means into the bulb envelope housing, while maintaining substantially the standard style and shape of the conventional light bulb housing.

Another object of the present invention for an improved LED light bulb system is incorporating a carbon monoxide detector means into the bulb envelope housing, while maintaining substantially the standard style and shape of conventional light bulb housing.

A further object of the present invention for an improved LED light bulb system is incorporating a gas, such as natural gas or propane, detector means into the bulb envelope housing, while maintaining substantially the standard style and shape of conventional light bulb housing.

An object of the present invention for an improved LED light bulb system is incorporating both a smoke, a carbon monoxide and a gas detector means into the same bulb envelope housing, while maintaining substantially the standard style and shape of conventional light bulb housing.

Another objective is to incorporate the present invention into any style/type/shape housing of conventional light bulbs, lighting fixtures or lamps; making the improved system disclosed herein, easily a direct replacement for any prior art devices preexisting.

One further object in said housings will have partitions, separating areas of the internal space. Typically, there are three such spaces; a LED light interior, an electronics chamber and a detector/audible horn/microphone space.

Still another object of the powering circuits is configured to any particular design need that can use a transformer-less layout, or, the use of step-down transforms. The design needs being a consideration for the end use of the present invention in any given application.

Yet another objective of the present invention for an improved LED light bulb system is having an audible pulse emission means that in an alarm state would pulsate. Such pulsation can be rhythmic, for example 3 beats ON and 1 beat OFF. This audible pattern is intended to give urgency.

Another objective of the present invention for an improved LED light bulb system is to have high intensity white, and, high intensity color (such as RED for smoke & fire, amber for carbon monoxide, blue for gas, and green for a repeat alarm) LED's that strobe alternately ON while in an alarm state. Such strobing makes a visible alarm that matches the pulsation of the audible alarming and is intended to give urgency.

Still another object of the present invention is to have a 'silencer circuit'. This silencing circuit would listen, between the audible pulse emissions. If it hears two sharply structured reverberations, such as in someone shouting the words "SHUT OFF" (or the alike) within a brief window of time, the device would suspend the alarm state, for example one minute. If the air was not cleared after that period of suspension of time, the alarm would continue. The user could tell it to shut-off again until all air is clear.

An objective, is to us both the audible and visual alarming means to test, by turn the system ON/OFF/ON in quick succession, within one second to activate a test mode. In the test mode the alarm state will last for five second, or, be silenced via a silence command response. A further test feature can be accomplished via a 'query' command by a base station to cycle through each alarm element of an audible and LED strobing means.

Another objective is for the same microphone listening device mentioned above, would listen for audible alarm detected pattern of sound, and if detected would repeat the alarm; thereby creating a network of two or more like systems of the present invention (like in function, not housing type or style). This is in addition to a conventional RF communication means if the system is so equipped.

A further objective is a non-removable, rechargeable battery power source. The battery source having a dormant state until the end user would cause a 'one-time' activating means initialized at instillation. The rechargeable battery, to keep alive all necessary circuitry during periods when VAC Line power is not available. The battery is always kept at peak capacity when the line voltage is present, and therefore is ready to cover periods when the VAC line voltage is off.

One other object is a microprocessor or ASIC (application-specific integrated circuit) mean to control universally all aspects of operation of the present invention.

Another object is to restrict circuitry by selectively powering the system of the present invention, while it is in a 'quiescent' state. That is, a state where the system is not in an alarm state, and therefore can power-down unneeded drains on battery operation.

One further objective, of the present invention for an improved LED light bulb system is to give audible notice when there is a low battery situation, the device would 'chirp' as conventional, usually in battery operated devices if the battery gets too low. That is, emit a very short duration pulse of sound, for example once per minute. To correct this low battery situation, the user would simply turn the present invention system, lamp or fixture, ON (providing AC Line power) for a short period of time. This would sufficiently re-charge the battery and chirping would immediately stop.

One other objective of the present invention for an improved LED light bulb system, is to communicate via RF short range signaling, or, listen via the on-board microphone, that an alarm event was activated. The present unit, detecting the alarm situation, would alternate pulsing of audible and high intensity white and red (amber or blue) LED's for the visual signal of an event. While, any other like (in function) improved LED light bulb within range of the present unit, but not in the smoke, carbon monoxide or gas environment, would repeat the audible signaling and visual signaling of the alarm, but would not present the red, amber or blue LED pulsating, instead use a green high intensity LED's; until or when it also detected the smoke or carbon monoxide or gas. The green LED's pulsing with the white here would indicate a possible 'safer' escaping route. Thus, such a system would give direction as to possible exiting away from the danger. Further, during a silence window (period of time in each alarm cycle), the repeat system would listen for any sound meeting an amplitude threshold, and, if hearing none would stop the repeat alarming both audibly and strobing white and green LED's.

Another object of the present invention is a base station means to program, monitor and display all detection systems in the building network area (such as a home); giving control and information to the user that is unavailable by any other means. Such base station programming means utilizing a unique coding system to establish identification of the device manufacturing iteration, a house code, a unit number and location designator, and, an alarm category. Said base station also to provide connectivity with cellular, land-line and computer means.

One more objective of the present invention is a repeat feature, strobing green LED's that indicate a danger in nearby but not immediately present such as a neighbor alarming device, give warning for occupants to exit to safety; away from any red, amber or blue strobing LED system, which indicate immediate danger at its location.

There is an objective to have a means to register and assign a 'coded ID' to each individual system in the network (Personal House Code, Zone-#, Location Description, Type of Fixture, Unit-#, Type of Alarm Category, etc.) making unique, and immediately identifying, which unit(s) are alarming. This is to include any near-by neighbor with a like system & system, which will show-up as an un-register alarming unit; but still giving rise to a danger nearby in another apartment or dwelling.

In considering a second alternate embodiment, other objectives are to utilize the devices microphone for a voice control, to recognize commands. Commands that establish a unique pattern of speech having three elements; 1—an awareness/trigger part, 2—a correlative part, and 3—a directive part. An example of such an objective command is . . . "light-table-dim" spoken in any combination ("dim-table-light," or "table-dim-light"). Meaning, the light(s)' (awareness/trigger) on the 'table' (correlative) object in a room full of different lights such as ceiling, floor, wall, etc., and, go to 'dimmer' setting (directive).

Said second alternate embodiment has another objective to have an initialization and change routines, that would easily set-up or change modes of operation. Such modes as AUTO mode, TIMER mode or RESET (no or 'none' mode), and TEST to set-through the system's functionality; that allow added convenience for the user. These modes can make illumination of a home or structure to turn lights on (with pre-set dimming levels) and off with a number of useful features. The routines would flash white LED's (once or twice) indicating entering a program means, and, flashing green LED's (once or twice) indicating a change of modes is successful when leaving the program routine.

An objective is also to have temporary commands to the above preset modes. Such commands as ON, OFF, DIM, BRIGHT, NIGHT, PRESET and EMERGENCY, would cause lighting to alter the preset as verbally commanded. The directive would maintain until the next preset event was to happen and lighting goes back to a schedule predetermined.

The objective for each 'directive' command is defined as follows:
 a) ON=system LED illumination too full 'on',
 b) OFF=system full off,
 c) DIM=if system is 'off', illuminate to 80%, if system is 'on' decrease illumination by 20% for each DIM command,
 d) BRIGHT=increase illumination by 10% for the first-of commands, then by 20% for each additional BRIGHT command,
 e) NIGHT=system to go-to predetermined setting (ON, OFF or DIM), PRESET=system to go-to predetermined setting (ON or DIM)
 f) EMERGENCY=system LED illumination in two actions; too full 'on' flashing if 120/230 VAC line power is available, or else use 20% illumination for battery operation, in the case of a power failure.
 g) In the case for the dim or bright objective, the lights would dim or brighten by 20% for example, for each command. In this scenario, if a ceiling light was preset to an intensity of 80%, a DIM command would cause the fixture to temporarily dim down to 60% until the next scheduled lighting event.

The objective for an alarm state, is to listen for the verbal command to SHUT-OFF, where the device would suspend alarming for 1-minute. During this minute of suspension, the device is attentive for other verbal commands to give illumination. If the smoke, carbon monoxide or gas has not cleared the detector within the minute of suspension, the device would alarm again.

One further objective of the present invention of the second alternate embodiment is to, construct the housings in two parts; a LED/processor electronics housing Part-A, and, a microphone/voice recognition/sensor/horn housing Part-B. The second part having a means to insert the rechargeable battery. When the two parts are 'snapped' together, they become electrically active and ready for service when installed into a fixture; prepared to give illumination, and, detect smoke, carbon monoxide or gas, as the device may be equipped for such detection means. Said activation, would immediately communicate its presence to the available base-station control-center in the network.

Another objective is also for the improved system LED light bulb in this second alternate embodiment, to receive commands from a base-station control-center; where all the commands and feature listed above in other objectives, can cause lighting effects remotely, for example from the master bedroom via RF communications; such as blue-tooth or ZigBee. In this case, the user would verbally command the base-station control-center and each LED light bulb detector would respond appropriately, giving full control of all units in the network. It is explicitly understood that each individual LED light bulb/detector unit still can communicate back to the base-station control-center when an alarm situation exists, giving notice of a danger (as well as its repeat alarm functions).

Finally, an object of an improved light bulb (light, lamp or fixture), is making obsolete the use of an on/off switch; as is conventionally conceived. Such feature is particularly useful when the present invention is installed as part of a hard-wired device required by law in installations in proximity to furnaces, where a smoke and carbon monoxide detection system becomes paramount to safety.

The present invention takes advantage of all these objectives by directly replacing a conventional light bulb, configured in any conventional style or shape, with an improved LED light bulb incorporating a smoke detector, carbon monoxide detector or gas detector; by having a non-removable (as in the first embodiments) or removable (as in the case of the second alternative embodiment) rechargeable battery always available and ready to alert in both audible and visual strobing pulsations, and, can be silenced by simply telling it verbally via speech to SHUT OFF (when alarming); using any two sharply structured reverberations (words/syllables) in a sequence of speech sounds. The improved device would be constructed to all existing lighting lamp configurations, making them easy to replace existing conventional lighting and thus make it easy to up-grade the home or building to a higher level of self-assurance by having base station(s) in or around the main places a user would find convenient (such as the master bedroom, kitchen or family room, or crossroads of activity) and would display exact locations and type/category of alarms that became activated.

The disadvantages of prior art listed earlier are all overcome and the user of the present invention can remove older independent smoke and carbon monoxide alarming devices that require constant replacing of batteries, and are subject to annoying false triggering of the alarm, that cannot be silenced conveniently, e.g., they need to remove the battery to silence, and, do not alarm with visible means. The improved LED light bulb system of the present invention, having voice commands (in the case of an alternate embodiment) further afford verbally telling lights, in various categories, to DIM, to BRIGHT to turn OFF or ON, or to a PRESET, to enter NIGHT mode or EMERGENCY mode(s), to predetermined settings, all uniquely solves problems that are not addressed by the prior art.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

FIG. 3a is a perspective view with cut-away showing the inner chambers and components of a common 'Edison' style, type A19 light bulb envelop housing;

FIG. 3b is a perspective view with cut-away showing the inner chambers of a common 'flood' style, type BR-30 light bulb envelop housing;

FIG. 3c is a perspective view with cut-away showing the inner chambers of a common 'track' style, light housing;

FIG. 3d is a perspective view with cut-away showing the inner chambers of a common 'recessed' style, light housing;

FIG. 3e is a perspective view with cut-away showing the inner chambers of a common 'nightlight' style, light housing;

FIG. 4a is an illustration of the present invention of FIG. 2a showing an exploded view of one possible layout of components;

FIG. 4b is an assembled detail of the present invention as it would fit into the Edison style A-19 housing of FIG. 2a;

FIG. 6 discloses a schematic sketch circuitry for a DCV power regulator Block 16, recharge circuit Block 18 and battery 20 in FIGS. 1a and 1b;

FIG. 7a is microprocessor based illustration of Block 28 providing central control of all aspects of the present invention;

FIG. 7b illustrates a discrete components Block 66 version of 7a;

FIG. 12a, FIG. 12b, and FIG. 12c all depicts waveforms mapping the various states shown in FIG. 11, and that generated via the circuits of FIGS. 7, 9 and 10;

FIG. 16a is an illustration of the present invention network, where a single unit detects smoke and alarms;

FIG. 16b is an illustration of the present invention network, where the close in-range units receive and repeat transmits detects smoke of first said unit alarm;

FIG. 16c is an illustration of the present invention network, where the close second in-range units receive and repeat transmits detects smoke of first said unit alarm, and, is received by base station;

FIG. 18a shows a screen highlighting a Neighbor Active Alarm, and FIG. 18b is pair of alarms coordinating together to trigger the screen alarm;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1a. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A networked visual and audible alarm system 10 and method with voice command control and base station having alarm for smoke, carbon monoxide, and gas, is referenced in FIGS. 1a-27.

Figure 1A:
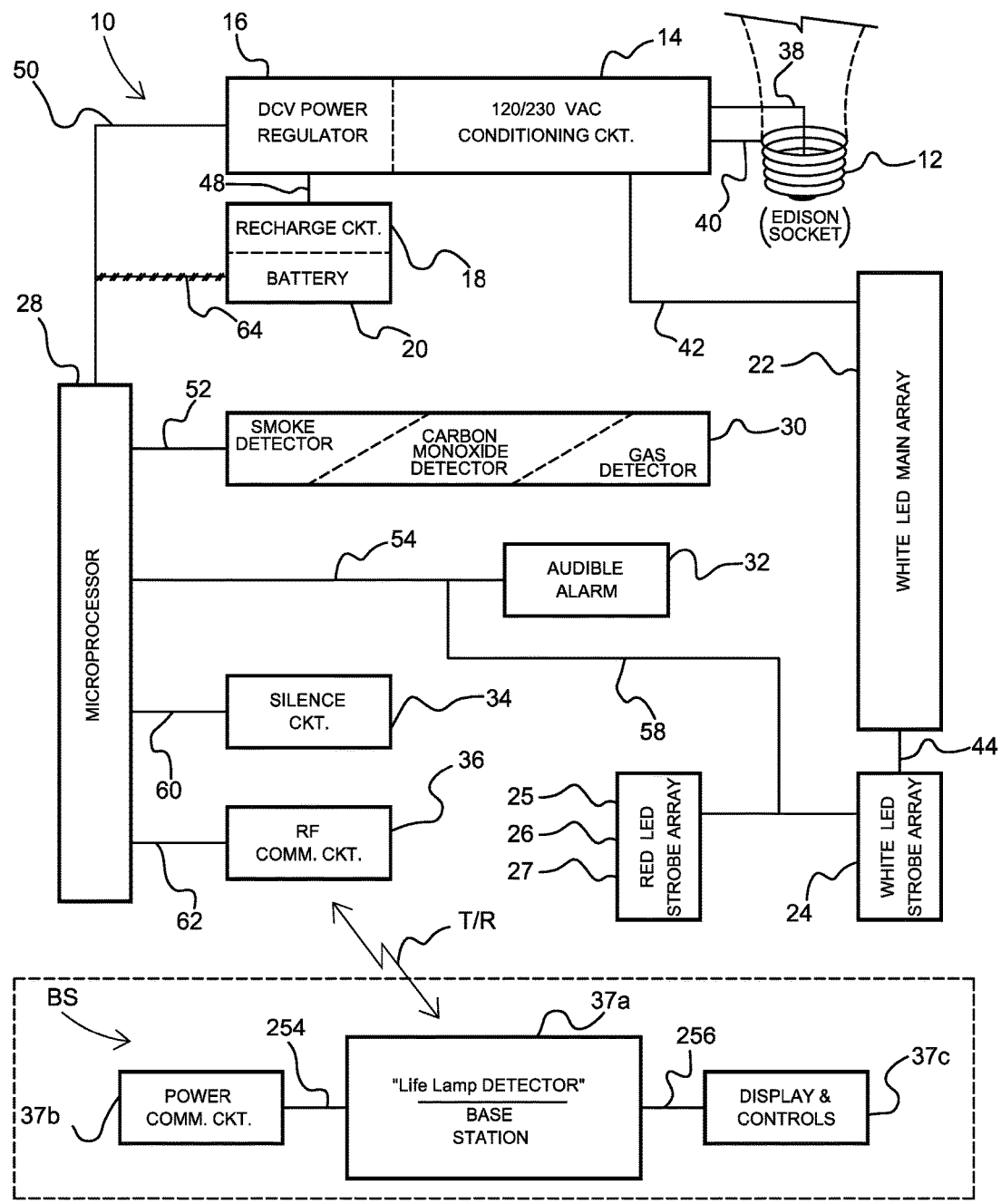
FIG. 1a is a block diagram of the present invention using microprocessor based components.
Figure 1B:
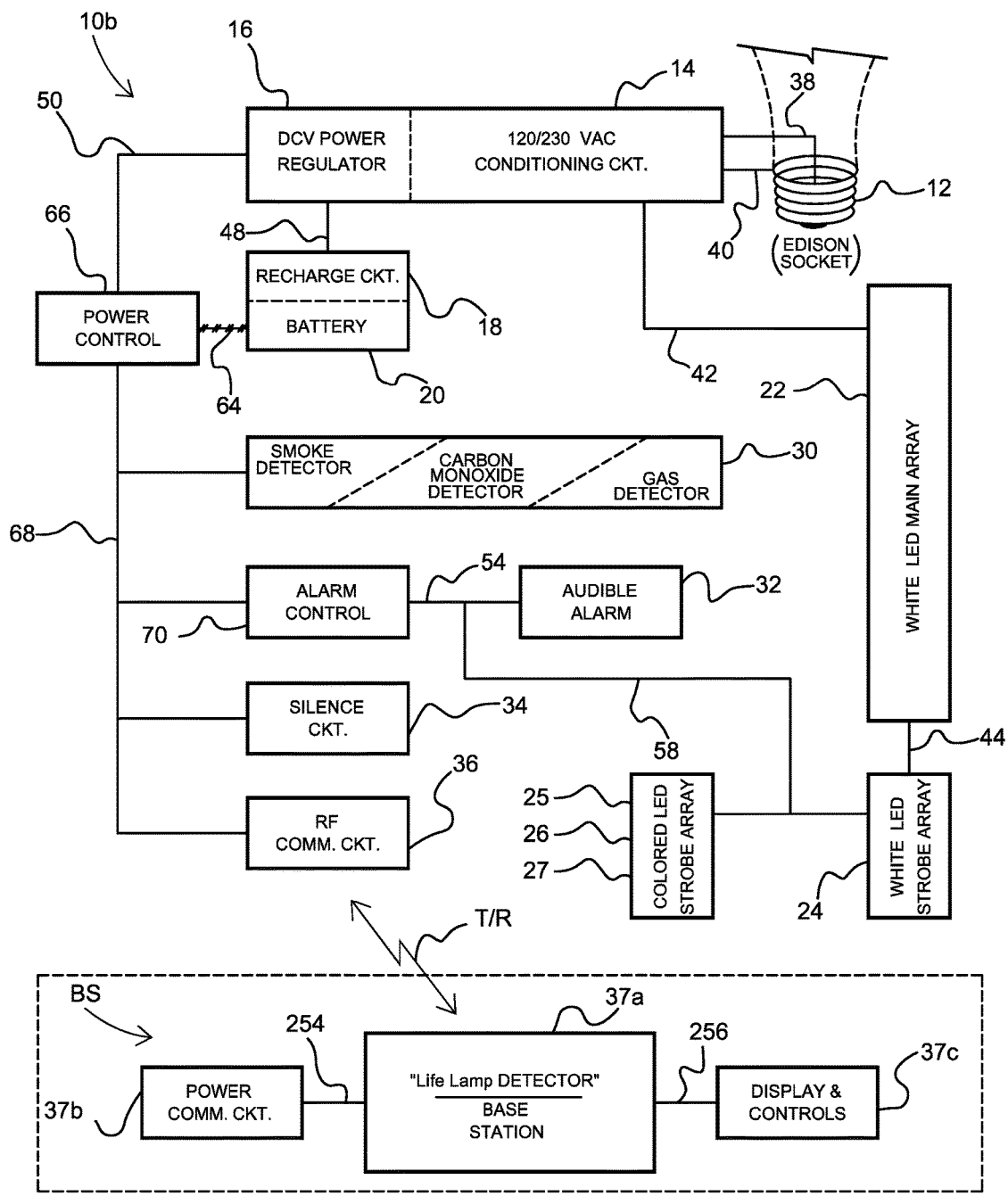
FIG. 1b is a block diagram of an alternate embodiment of the present invention using discrete components.

As referenced in FIGS. 1a and 1b, the alarm system 10 provides multiple systems, 10, 10b arranged in a network throughout a house or office that are synchronized to alerting to smoke, carbon monoxide, and gas through both visual illumination alerts in various colors, intensities, and patterns, and an audible alert. Multiple alarm systems 10, 10b are tied together through a base-station control-center BS; whereby the alarm systems 10 and base station BS communicate with each other to coordinate the visual illumination and the audible alerts independently for each room. The alarm system 10 also provides voice recognition functionality to control the power and intensity and pattern of the visual illumination and audible alerts. This is operable through a speech voice recognition controller. The speech recognition controller is operationally integrated in a lighting lamp fixture, allowing a user to control various aspects of lighting and powering of the alarm system through a plurality of predetermined voice commands and at least one voice pattern. Easy to remember voice commands, such as "on", "off", "dim", and "bright" are picked up by a microphone and acted upon to facilitate operation of the alarm system 10.

As referenced in FIG. 1a, the alarm system 10 provides illuminating LEDs, audible alerts, a base control, and a voice command control. The alarm system 10 detects and alerts to smoke, carbon monoxide, and gas. Illuminating LED's alert. The voice command regulates operation of the illumination and audible alarms when detecting the smoke, carbon monoxide or harmful gases. Multiple light fixtures audibly and visually alert to at least one event, such as smoke, carbon monoxide, and gases. Each alarm system 10 in each room independently emits an audible and illuminating signal, dependent on the type of event detected. A network of multiple alarm systems 10, 10b are monitored and controlled from a base station BS that facilitates communication between the networks of systems. The base station BS is programmable based on a code assigned to each system. Additionally, the system 10 provides speech recognition for powering on and off, dimming, brightening, and adjusting the lighting and audible alarm.

In one embodiment, the alarm system 10 provides an improved LED light bulb that incorporates a smoke detector, a carbon monoxide detector or a gas detector or any combination, and constructed in a single or two part 'snap-together' housing with rechargeable battery always available and ready to alert in both audible and visual strobing pulsations, give a sense of urgency. The strobing LED's identify the type of alarm danger (smoke 'red' or carbon monoxide 'amber' or gas 'blue'), and a repeat 'green' alarm in a net-work of units; giving the user a sense of direction to escape the area of danger.

In yet another unique adaptation, the improved alarm system 10 incorporates voice recognition command and control of all lighting choices, and, can silence/suspend an alarm-state by simply telling it verbally to "SHUT OFF." Along with a base station control center, to fully monitor, and aid in programming individual LED and detecting devices. This creates a network within a home or structure to manage lighting and security.

In FIG. 1a is shown a block diagram of the preferred embodiment of the alarm system 10. In this embodiment, alarm system 10 includes an electrical connector 12. In this example, the connection 12 is an Edison, 'A-19' style socket. Though in other embodiments, other types of light socket designs may be used. A 120/230 VAC conditioning circuit 14, a DCV power regulator circuit 16, a recharge circuit 18 and a rechargeable battery 20.

Furthermore, FIG. 1a references a white LED main array 22, a white LED strobe array 24 and a colored LED strobe array green 25, red 26, and amber/blue 27 as they relate to the conditioning circuit 14, and, a control microprocessor 28, as it relates to the DCV power regulator 16. The control microprocessor 28 directly controls a smoke/carbon monoxide/gas detector(s) 30a and 30b, an audible alarm circuit 32, a silence circuit 34 and a communication circuit 36. The present invention can be of a simpler configuration without the communication circuit, or, the communication circuit can be present to incorporate networking features that will be disclosed in a later section. A series of lines 38, 40, 42, 44, 46, 48, 50, 52, 54, 56, 58, 60, 62 and 64 are shown providing interconnection to the various blocks or the diagram.

In some embodiments, a conditioning circuit 14 supplies 120/230 VAC power to DCV regulator 16 and white LED main array 22, white LED strobe array 24 and a colored LED strobe array green 25, red 26, and amber/blue 27. The DCV power regulator provide commercial power for charging the battery 20 by the recharge circuit 18, and all of the other control components 28, 30, 32, 34, 36. In operation, when 120/230 VAC (Line Voltage) is available and present at the electrical connector 12, the system functions as follows: Conditioning circuit 14 steps-down and rectifies the VAC Line Voltage first, to the high intensity light emitting diodes (LED's) in the arrays 22 and 24, providing illuminances in the emission of visible light, and second, provide power to the DCV regulator 16 that supplies control power and the recharging of the battery as needed.

Thus, if the Line Voltage is OFF, or not present, the battery 20 will supply all necessary power to circuits 28, 30, 32, 34, 36 and the two LED strobe arrays 25, 26, 27, 24 when in the alarm state. It is important to understand that the white LED's in the strobe array 24 function with, and exactly the same as, white LED's in the main array 22. Only when in battery mode of operating, do the white LED's strobe the array 24, should there be an alarm. A more detailed description of all these functions will be disclosed later.

Moving to a first alternate embodiment having discrete components in FIG. 1b, where it is shown a block diagram of the present invention 10b, discrete components, having an electrical connector 12 (depicted here as the familiar Edison, 'A-19' style socket). A 120/230 VAC conditioning circuit 14, a DCV power regulator circuit 16, a recharge circuit 18 and a rechargeable battery 20. Further is shown, a white LED main array 22, a white LED strobe array 24 and a colored LED strobe array green 25, red 26, and amber/blue 27, as they relate to the conditioning circuit 14, and, a monitor circuit 66, as it relates to the DCV power regulator 16.

The monitor circuit 66 oversees a smoke/carbon monoxide/gas detector(s) 30, an alarm control 70 (with audible alarm circuit 32), a silence circuit 34 and a communication circuit 36. The present invention can be of a simpler configuration without the communication circuit, or, the communication circuit can be present to incorporate networking features that will be disclosed in a later section. A series of lines 38, 40, 42, 44, 46, 48, 50, 54, 56, 58, 64 and 68 are shown providing interconnection to the various blocks or the diagram.

Conditioning circuit 14 supplies 120/230 VAC power to DCV regulator 16 and white LED main array 22, white LED strobe array 24 and a colored LED strobe array 26. The DCV power regulator provide commercial power for charging the battery 20 by the recharge circuit 18, and all of the other control components 66, 30, 70, 32, 34, 36.

In operation, when 120/230 VAC (Line Voltage) is available and present at the electrical connector 12, the system functions as follows: Conditioning circuit 14 steps-down and rectifies the VAC Line Voltage first, to the high intensity light emitting diodes (LED's) in the arrays 22 and 24, providing illumination in the emission of visible light, and second, provide power to the DCV regulator 16 that supplies control power and the recharging of the battery as needed. Should the Line Voltage be OFF, or not present, the battery 20 will supply all necessary power to circuits 66, 30, 70, 32, 34, 36 and the two LED strobe arrays 25, 26, 27 and 24 when in the alarm state. It is important to understand that the white LED's in the strobe array 24 function with, and exactly the same as, white LED's in the main array 22. Only when in battery mode of operating, do the white LED's strobe the array 24, should there be an alarm. A more detailed description of all these functions will be disclosed later.

The base-station BS shown in both FIGS. 1a & 1b, (as will be discussed later and comprising 37a, 37b, 37c) can, either along with or be incorporated via software into, other 'conveniences' electronic devices. These devices, such as Amazon Corporation's Alexa/Echo system, or Google's Home system, etc., can further augment the base-station control-center of the present invention; making them even more useful.

Figure 2A:
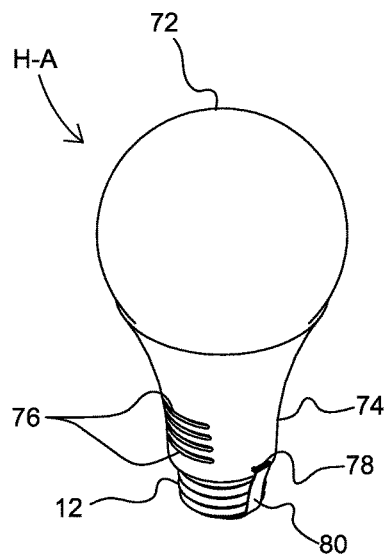
FIG. 2a is a perspective view showing the outside of a common 'Edison' style, type A19 light bulb envelop housing.

Turning now to FIG. 2a is shown a perspective view of the outside of a common 'Edison' style, type A19 light bulb 'envelop', housing H-A. The housing H-A having electrical connector 12, as depicted in FIGS. 1a & 1b earlier. A light-defusing reflector 72, an electronics casing 74, a series of vents 76, an activating pin 78 and pull ribbon 80 are also shown. The light-defusing reflector 72 allows an even emission of illumination when the LED's of the main array 22, strobe arrays 24, 25, 26 or 27 are turned ON. The electronics casing 74 holds the operating components of the present invention and has vents 76 to allow smoke and/or carbon monoxide and/or gas to enter and exit the housing H-A. The vent 76 also allows sound to enter and exit the housing H-A.

The activating pin 78 with ribbon 80, when removed from housing H-A, will actuate an internal means (as will be disclosed later), to initiate operations. Since the ribbon 80, intentionally covers a portion of the electrical connector 12, the system H-A cannot be installed into a lamp until the pin 78 is removed, thus bringing to life the battery system and the electronics. This is important to understand, because the pin 78 will keep the battery from being depleted prior to the system is brought into service.

Figure 2B:
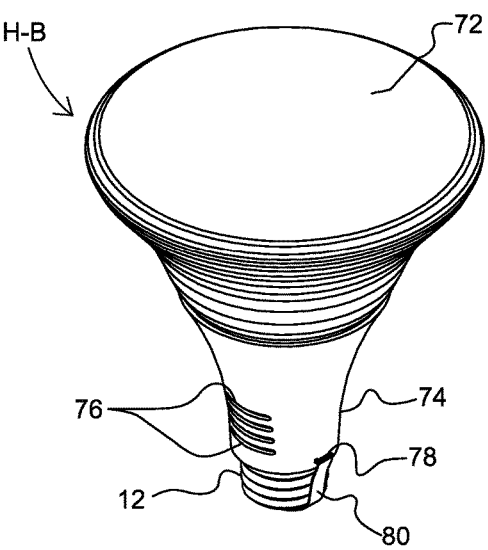
FIG. 2b is a perspective view showing the outside of a common 'flood' style, type BR-30 light bulb envelop housing.
Figure 2C:
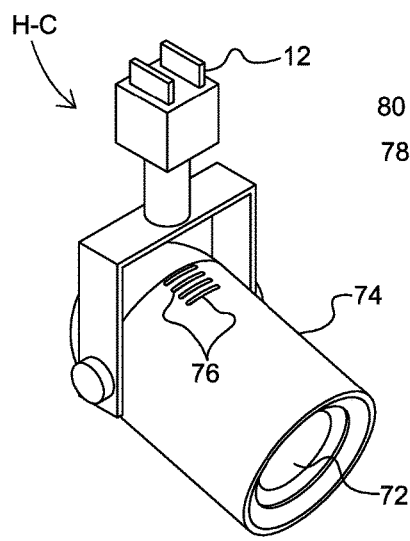
FIG. 2c is a perspective view showing the outside of a common 'track' style, light housing.
Figure 2E:
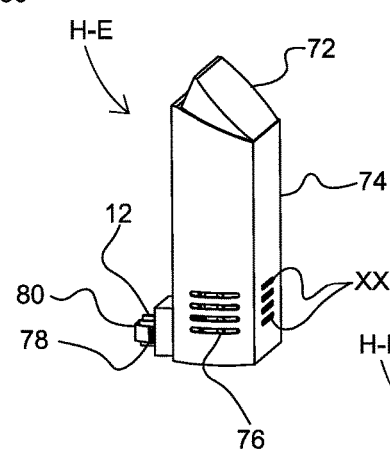
FIG. 2e is a perspective view showing the outside of a common 'nightlight' style, light housing.
Figure 2D:
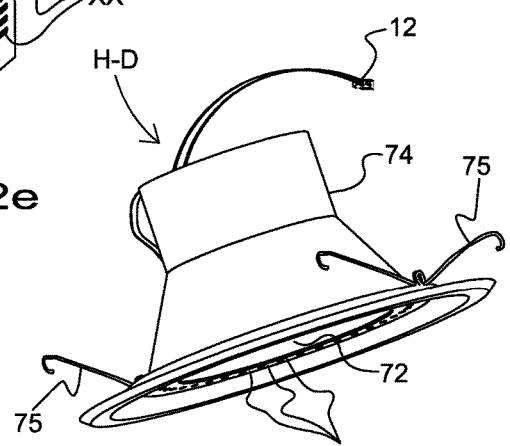
FIG. 2d is a perspective view showing the outside of a common 'recessed' style, light housing.

FIGS. 2b, 2c, 2d, and 2e are similar in function and operation as disclosed in FIG. 2a; only the form has changed as follows. FIG. 2b being a perspective view showing the outside of a common 'flood' style, type BR-30 light bulb envelop housing H-B; FIG. 2c is a perspective view showing the outside of a common 'track' style, light housing H-C; FIG. 2d is a perspective view showing the outside of a common 'recessed' style, light housing H-D; and, FIG. 2e is a perspective view showing the outside of a common 'nightlight' style, light housing H-E. Each housing H-B, H-C, H-D and H-E respectively, holding the present invention 10 (as will be seen in FIG. 3) and operating as disclosed in FIG. 1a or 1b.

Moving to FIG. 3a is a perspective view with cut-away showing the inner chambers and components of a common 'Edison' style, type A19 light bulb envelop, housing H-A. A LED light interior 82, an electronics chamber 84 and a detector and microphone space 86 are shown, and created by, a LED mounting plate 88 and a partition 90. The LED mounting plate 88 also is a heat-sink to dissipate any heat generated by the LED's when they are turned ON. The partition 90 keeps smoke and or carbon monoxide and or gas that may enter the vents 76, isolated only to the detector, horn and microphone space 86. Again with FIG. 3b through FIG. 3e, all the same in function and operation as disclosed in FIG. 3a; only the form has changed as follows. FIG. 3b is a perspective view with cut-away showing the inner chambers of a common 'flood' style, type BR-30 light bulb envelop housing H-B.

FIG. 3c is a perspective view with cut-away showing the inner chambers of a common 'track' style, light housing H-C; FIG. 3d is a perspective view with cut-away showing the inner chambers of a common 'recessed' style, light housing H-D, and FIG. 3e is a perspective view with cut-away showing the inner chambers of a common 'nightlight' style, light housing H-E. Each housing H-B, H-C, H-D and H-E respectively, holding the present invention 10 (as will be seen in FIG. 3) and operating as disclosed in FIG. 1a or 1b.

Although the inventors have disclosed five (5) styles of light bulbs and lamp fixtures, it is explicitly understood that the present invention 10 can be fitted into any light/lamp housing style or type of fixture. For example, a few other standard 'series' types are: A-Series, B-Series, C7/F Series, CA-Series, S-Series, F-Series, RP, MB, BT Series, R-Series, MR-Series, PS Series, AR-Series, ALR-Series, BR-Series PAR-Series, T-Series, BT-Series, ED-Series. Further there are the European Base E-Series, the Bayonet Series, the high voltage series as well as the low voltage pin series, and the G-Series including fluorescent tube.

Still there are more, but the inventors have clearly shown an improved LED light bulb with alarming system for smoke, carbon monoxide detection and gas, in five different configurations of commonly found lighting devices that are shown here are sufficient enough, for anyone skilled in the art, to understand the invention, and, were only limited by the practical need to keep this disclosure shorter in length.

FIG. 4a is a perspective view illustration of the present invention of the H-A housing in FIG. 2a, showing an exploded view of one possible layout of components. The partially cut-away light-defusing reflector 72, revealing the LED light interior 82 space and the LED mounting plate (with heat sink) 88. The LED mounting plate 88 has disposed on it, the high intensity white LED main array 22, the high intensity white LED strobe array 24 and the high intensity colored LED strobe array, green 25, red 26 and amber and blue 27. The colored LED's strobing would give the visual alarm and will be further discussed later.

The electronics chamber 84 'space' has within, a print circuit board (PCB) 92. Disposed on the PCB 92, are the rechargeable battery 20, smoke/carbon monoxide/gas detectors 30, the audible alarm 32 horn/siren, and the silence circuit 34 microphone. RF communications circuit 36 also disposed in this section of PCB 92, will be discussed later. The lower portion of the PCB 92 is isolated via partition 90; which is positioned just above audible siren/horn 32 and smoke/carbon monoxide/gas detector 30, and, thereby creates the detector, horn & microphone space 86. FIG. 4b will better detail this section of the assembly in greater clarity.

Finally, the electronics casing 74 provides cover for the above assembly, including 88, 92 20, 30, 32, 34, 36 and 90 just mentioned. Note the lower section, at the detector and microphone space 86 area, has the vents 76 to allow smoke and/or carbon monoxide and/or gas to flow into and out of space 86, as well as, to allow sound to emanate therefrom via the audible siren/horn 32, and, hear external sound via silence circuit 34 microphone. The vents 76, in the preferred embodiment, have disposed on the inner surface of electronics casing 74, a screen (not shown for clarity of presentation) to prevent objects from entering the casing 74 vent holes; only smoke, gas or sound can freely enter and exit the space 86 as disclosed.

Look now at FIG. 4b to see a detail of the present invention 10, showing the improved LED light bulb with alarming system for smoke, carbon monoxide and gas detection assembly as it would fit into the Edison style A-19 housing of the exploded view of FIG. 4a. Here is shown LED arrays 22, 24 and 25, 26 and 27 disposed atop LED mounting plate 88. The mounting plate 88 is conventionally constructed with circuit current flow patterns on the LED top-side, and with a heat sink (such as aluminum) on the bottom-side. The number of high intensity LED's, in both the main 22 and strobe 24 and 25, 26 and 27 arrays, are defined by the amount of luminescence desired. In this example of the A-19 style bulb, H-A of FIG. 2a, are twelve of the white LED's in the main 22 and strobing 24 arrays, during normal lighting functions. While there are four of the colored LED's strobing 25, 26, and 27 'alarm state'. It should be understood that any number of LED's, either greater or less, can be implemented on to LED mounting plate 88 to facilitate any given housing configuration and desired lumens.

The PCB 92 having the partition 90 shown in dashed line for clarity of presentation. The PCB 92 and the LED mounting plate 88 are electrically connected (not shown) using simple conventional 'pin' connection devices meant for mating two printed circuit boards; at the top edge of 92 and the bottom surface of 88. Operating current and signals flow over said connecting pins. A variety of electronic, surface mount electronic components 94, integrated circuits 96 such as microprocessor and RF communications means, and step-down (means) transformer 100 are disposed on PCB 92. These components will be detailed in a later section.

Furthermore, along the underside of the partition 90, at the lower end of PCB 92, is disposed the audible alarm siren/horn 32, silence circuit 34 microphone and smoke/carbon monoxide/gas detector(s) 30. Further is disposed an activation means 98 (which is engaged with activation pin 78). In the preferred embodiment the activation means 98 is a switch that is positioned during manufacturing. The switch, activation means 98, isolates the rechargeable battery 20, so none of the circuits are powered, until and when, the activation pin 78 is removed via the pull ribbon 80 during installation of the device into service. It is important to understand that once the activating pin 78 is removed, and the switch, activation means 98 is toggled, the switch cannot be toggled back to an OFF position again. Thus the device is fully functional for its service life. A further disclosure of these functions will be detail later.

Further disclosures are seen in FIGS. 5 through 10, where there is shown typical circuitry to make functional the blocks in FIGS. 1a and 1b. The inventors use the words 'typical circuitry' here, specifically to emphasize that there are many ways to achieve the form and function described in the blocks of FIGS. 1a and 1b, and, although there is a preferred way, it should not be construed that it is the present invention. But rather that the descriptions in FIGS. 1a & 1b, comprising the form and function, as well as what is disclosed in these teaching, are the present invention. Also, please note that the circuits are shown with only the main components, omitting support components for simplicity of presentation and clarity.

Figure 5A:
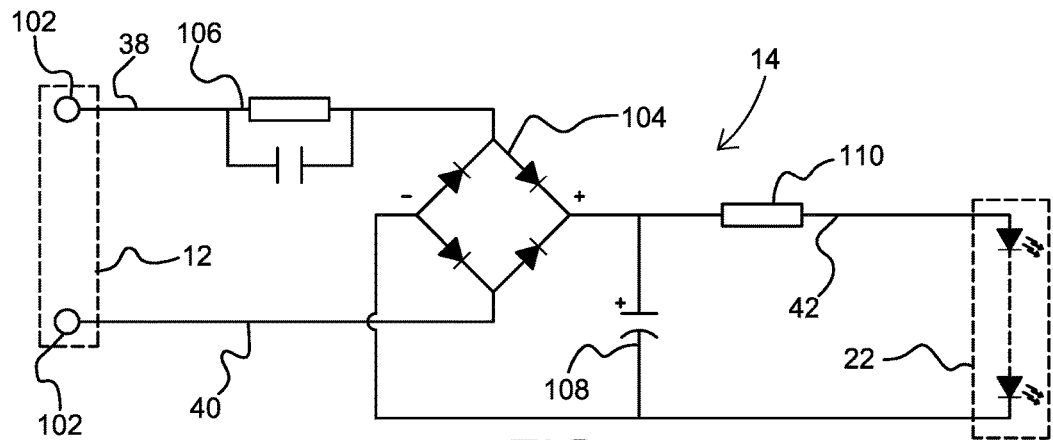
FIG. 5a is a schematic sketch of one possible configuration of the 230/120 VAC conditioning circuit 14 in FIGS. 1a & 1b, using a limiting resistor to control current.
Figure 5B:
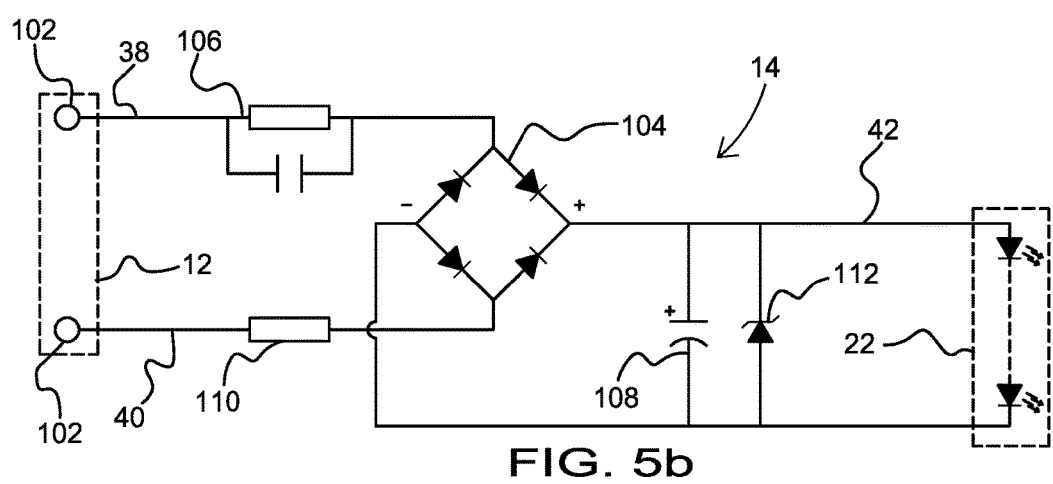
FIG. 5b is another a schematic sketch arrangement of FIG. 5a, configured with a Zener diode to control voltage.

Now referring to FIG. 5a, it is shown a typical 'transformer-less' 120/230 VAC conditioning circuit 14, having a full bridge circuit 104 and a limiting resistor/capacitor network 106 on the VAC side of the bridge, a filtering capacitor 108 and a limiting resistor 110 on the DCV side. The conditioning circuit functions to convert alternating current to direct current, and provides a suitable power supply to the (main 22 and strobing 24 & 25, 26 & 27) LED arrays. FIG. 5b is shown the addition of a Zener diode 112. In this configuration, the Zener diode 112 would limit the voltage, for example, to 69 volts, which is one way to 'step-down' and achieve the power supply required by the physical number of LED diodes in the lighting circuit 22, 24 & 25, 26, and 27.

Figure 5C:
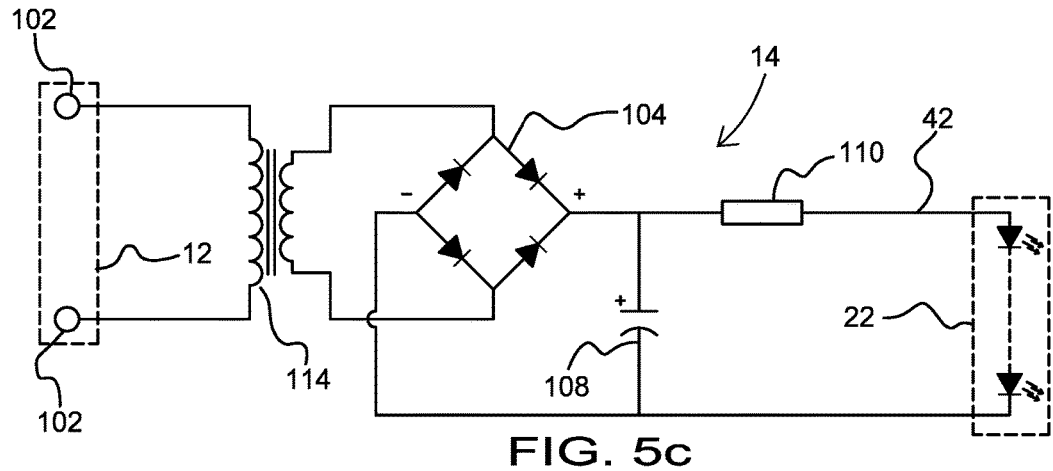
FIG. 5c is one more schematic sketch of a configuration of the 230/120 VAC conditioning circuit Block 14 in FIGS. 1a and 1b, using a step-down transformer.

Alternatively, FIG. 5c shows the same means as shown the FIGS. 5a and 5b, but with the use of a step-down transformer 114. Here the step-down transformer 114 would present to the bridge 104 a lower voltage before rectifying it to a DCV. Any of these 120/230 VAC conditioning circuits are suitable, but the present patent is not limited to just these examples, and that there are other configurations that would work equally as well.

FIG. 6 shows a similar function of FIG. 5c to suppling power, but here it is specifically to regulate the DCV for the systems electronic controls. In this example, it is shown that a step-down transformer 116, a full bridge 118, a fixed voltage regulator 120 (LM7812 Series), an isolation diodes 122a & 122b (1N4007 type), and a limiting resistor 124, all provide suitable regulation to; 1.) recharge circuit 18 for the battery 20, and 2.) supply operation DCV to drive the electronics 16. When line VAC is available, regulated DCV is supplied to positive terminal 126 via diode 122*a*, and is charging battery via limiting resistor 124. When the line VAC is not present, the battery 20, without any interruption, supplies the DCV via diode 122*b* to positive terminal 126.

The battery 20 has a battery monitoring circuit 130. The battery monitoring would activate the chirp signal in the event the battery 20 should drop below a minimum threshold. Although the step-down transformer 116, DCV regulator 120 and battery 20 can be of any suitable operating voltage, the preferred embodiment of the present invention it is in the 12 volts DC range, and, the battery is a rechargeable lithium ion battery. Please note that other voltages may be needed to function the system 10. Such voltages may be 3 or 5 volts for some electronics. These voltages would be generated by a similar circuit that is disclosed here in FIG. 6.

In FIG. 7*a*, the microprocessor control 28 would use the 3 or 5 volts as indicated in the previous paragraph and control most aspects of the system 10 via receiving input from an input 132 'read process', and, drive control output from an output 134' write process'; utilizing program code specifically for these functions listed in FIG. 7*a*. A suitable microprocessor would be one of the Microchip Corporation, PIC series, such as their 8-pin, 14-pin or 20-pin models. Preferably one with built-in program memory, non-volatile memory and peripheral select ability, even one with communication means. Each of these models can be programed, by any one skilled in the art, to produce the function describe throughout this disclosure referencing the system of the present invention 10, controlling the various circuits as indicated in FIG. 1*a*.

In FIG. 7*b*, the results are similar to the results described in FIG. 7*a*, but using discrete electronic components operating in logical manner. Here the power control 66, operating on system DCV power (see FIG. 6) via terminal 126 & 128 to receive an input 138 and drive an output 140. The power control would produce the function describe throughout this disclosure referencing the system of the present invention 10, controlling the various circuits as indicated in FIG. 1*b*. Those skilled in electronics would be able to assemble such discrete components configured to operate and function as described. It is highly desirable to miniaturize all said circuits indicated in both FIGS. 7*a* and 7*b*, and as such the use of an ASIC (Application Specific Integrated Circuit) is most useful. The inventers would employ such ASIC technology into the present invention system 10, substantially reducing the component count, when designing a particular end use device. This would further reduce power consumption extending operating time when VAC Line power is not available.

Figure 8A:
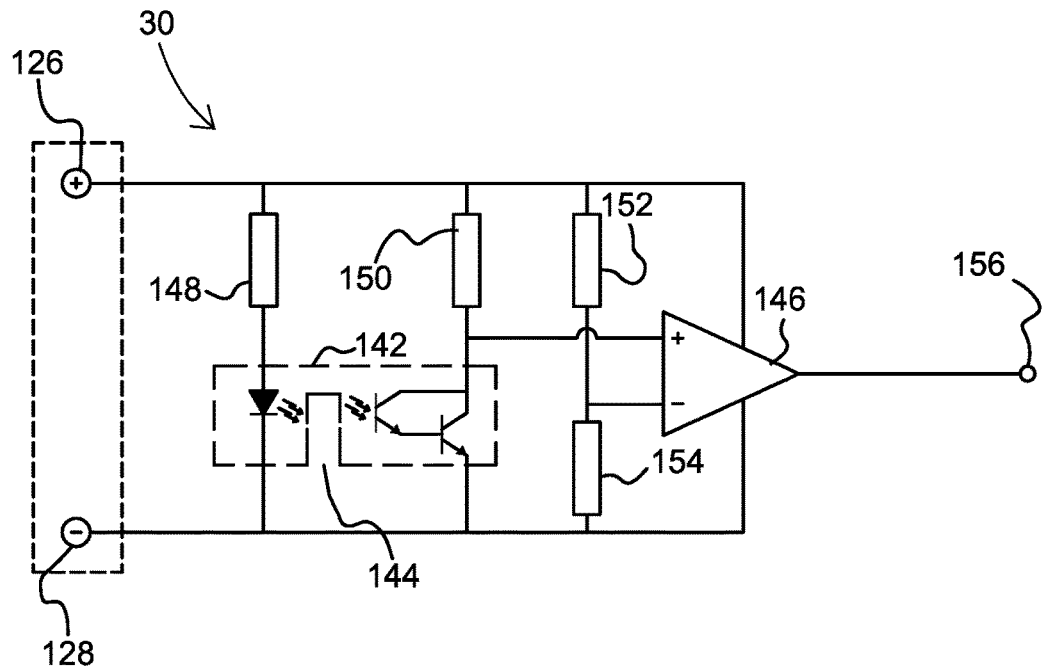
FIG. 8a is a schematic sketch showing electrically the smoke detection process.

Turning next to FIG. 8*a*, where it is disclosed a schematic sketch showing electrical side of the smoke/carbon monoxide/gas detector 30 sensing elements of the present invention. A photo-interrupter 142, a signal condition means 146, a current limiting resistors 148 and 150, and a signal balancing resistors 152 and 154. The photo interrupter 142 smoke detecting sensor, having a smoke entry port 144, for the entry of smoke when it is present. The limiting resistor 148 restricts current flow in the infrared emitting diode within the sensor 142, likewise, the limiting resistor 150 restricts current flow within the 'darlington' photo transistors of the isolated output of the device 142.

The sensor 142 can be of any smoke detecting means, either reflective or transmissive, but the preferred embodiment is a Sharp Microelectronics, PN# GP1L52VJ000F transmissive device. When smoke is detected the amplified darlington output of the sensor 142 changes the current flow to the plus input of the signal conditioning means 146. In this example of a detecting circuit, operational amplifier is a conventional LM741 type amplifier, that can then go directly the audible and LED strobing circuits (that will be described later) via 156. If a microprocessor is use, as it in FIG. 1*a*, the darlington output of the sensor could directly be seen as a peripheral, and have no need for the amplifier circuit 146 device.

Figure 8B:
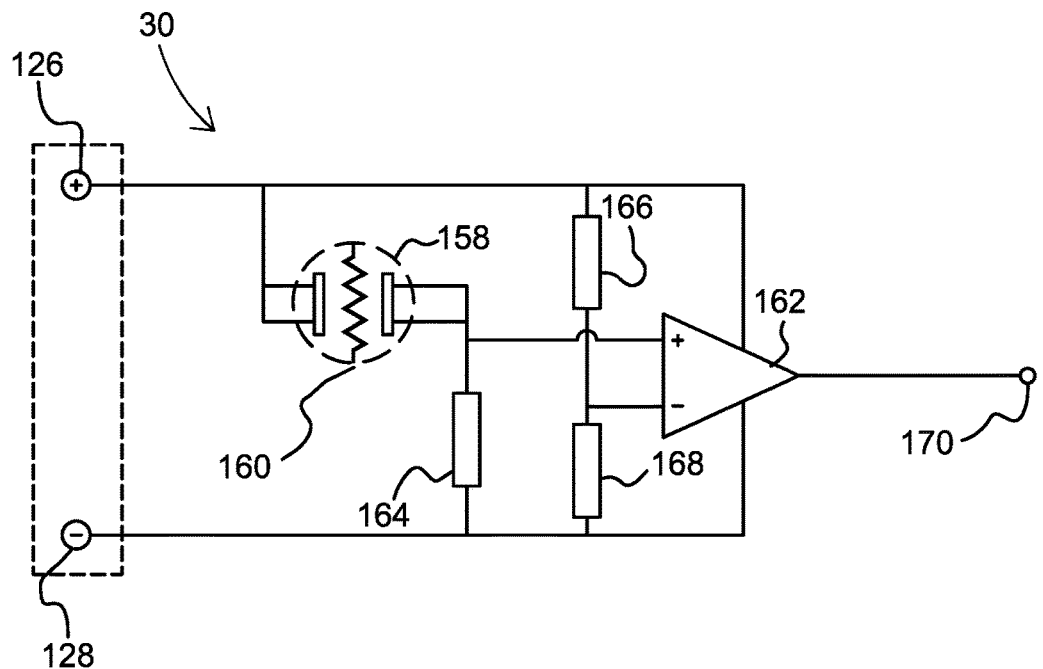
FIG. 8b is a schematic sketch showing electrically the carbon monoxide detection process.

Similar to FIG. 8*a* circuitry, in FIG. 8*b* a carbon monoxide/gas sensor 158 having a measuring resistance surface 160, a signal conditioning means 162, a limiting resistor 164 and a signal balancing resistors 166 and 168 are connected electrically for such purpose of detecting CO & gases, and, having an output 170. Again, any CO, ionization gas sensor would work but the preferred device would be the MQ-7 Gas Sensor manufactured by Hanwei Electronics Co., LTD. An electro-chemical means can be utilized to specific target for gas types, in a more exotic application of the present invention.

It is explicitly understood that the present invention 10, can have either one of the smoke, carbon monoxide or gas sensors, or, any combination or all such sensors incorporated into a single device of the system 10. Also, the components shown in the FIGS. 8*a* and 8*b* are just representative to show intent of the main components, and, other supporting circuitry is intentionally not show for the clarity of presentation. Any one skilled in the art of electronics could appreciate the inventor's disclosure of the present invention and understand its meaning.

Figure 9:
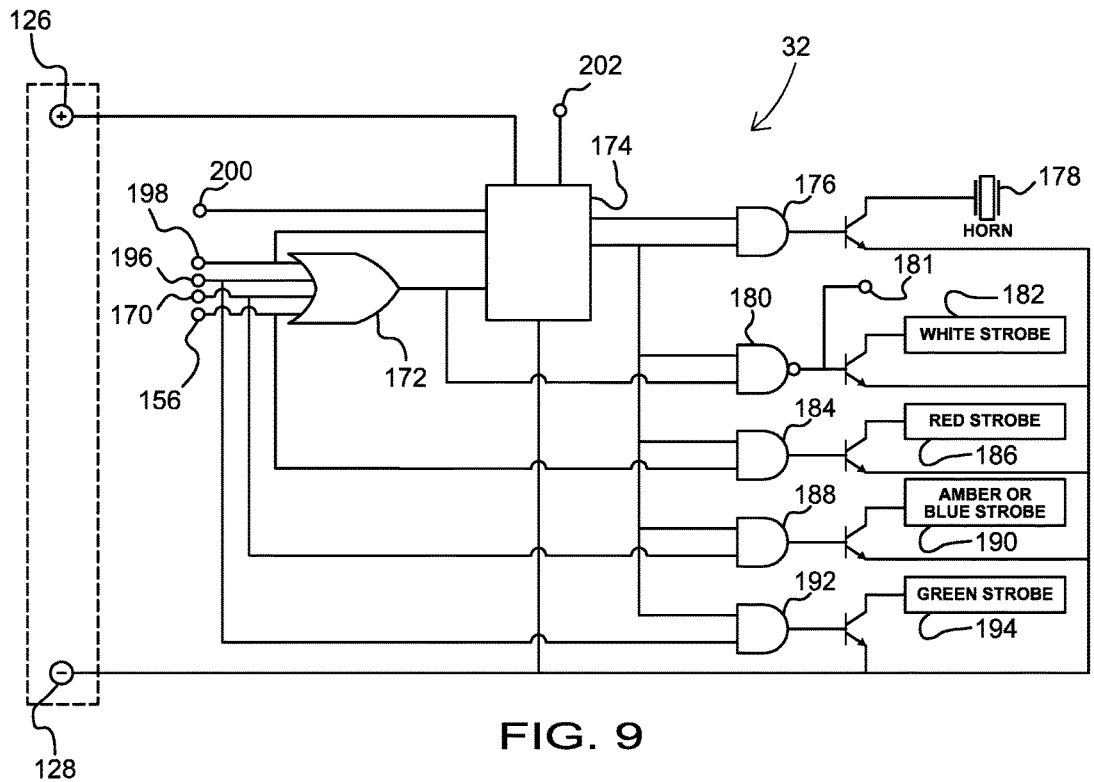
FIG. 9 is a schematic sketch showing electrically the timing management of various signals that create the controlling waveforms of the present invention including the out driving circuits of sound and strobing LED's.

Now in FIG. 9 is shown the audible/visual alarm 32 control. An 'OR' logic gate 172, a timer/counter circuits 174, an 'AND' logic driver circuit 176, a piezo electric horn 178, a 'NAND' logic driver gate 180, an 'AND' logic driver gates 184, 188, and 192, a high intensity white LED's 182, a high intensity red LED's 186, a high intensity amber or blue LED's 190, and a high intensity green LED's 194. The 'OR' gate receives signals: smoke detected signal active 156, carbon monoxide/gas detected signal active 170, repeat alarm signal active 196, and low battery signal active 198. Any of the four signals presented to the 'OR' gate 172, would output a logical high to activate the timer/counter circuit 174, which in turn would signal the driver circuits 176, 180, 184, 188 and 192. The driver circuit 176 would output to the piezo electrical horn 178, while the other driver circuits would strobe the LED's 182, 186, 190 and 194 (referred to a blocks 24, 26, 27, and 25 respectively in FIGS. 1*a* and 1*b*).

The color of the LED circuits would depend on which of the signals received at the 'OR' gate 172. That is, smoke detected signal active 156 would also be at the red 'AND' driver circuit 184, carbon monoxide or gas detected signal active 170 would also be at the amber or blue 'AND' driver circuit 188, and the repeat alarm signal active 196 would also be at the green 'AND' driver circuit 192. The white 'NAND' driver circuit 180 would be inverted from the other colored LED 'AND' driver circuits, creating a pattern of white lighted strobing LED's, in between a colored strobing LED's. This pattern will be fully detailed later in a waveform section of this disclosure. The white 'NAND' driver circuit also outputs a main array strobe signal 181.

As will be disclosed is FIG. 13, the main array strobe signal (connected to the gate of an SCR switching device) will interrupt the lighted main array 22 if powered; causing it to strobe in unison with the colored arrays described earlier. An activate microphone signal 202 is generated via timer/counter circuit 174 and sets the timing in which the microphone will listen for the silence command as is referenced on FIG. 10 (also see waveforms of such timing in FIG. 12). The low battery signal active 198 is generated from the battery monitoring circuit 130 referenced on FIG. 6, and when is active, the horn 178, with white strobe LED's will 'chirp', or be ON for a very short amount of time to indicated a low battery state.

Figure 10:
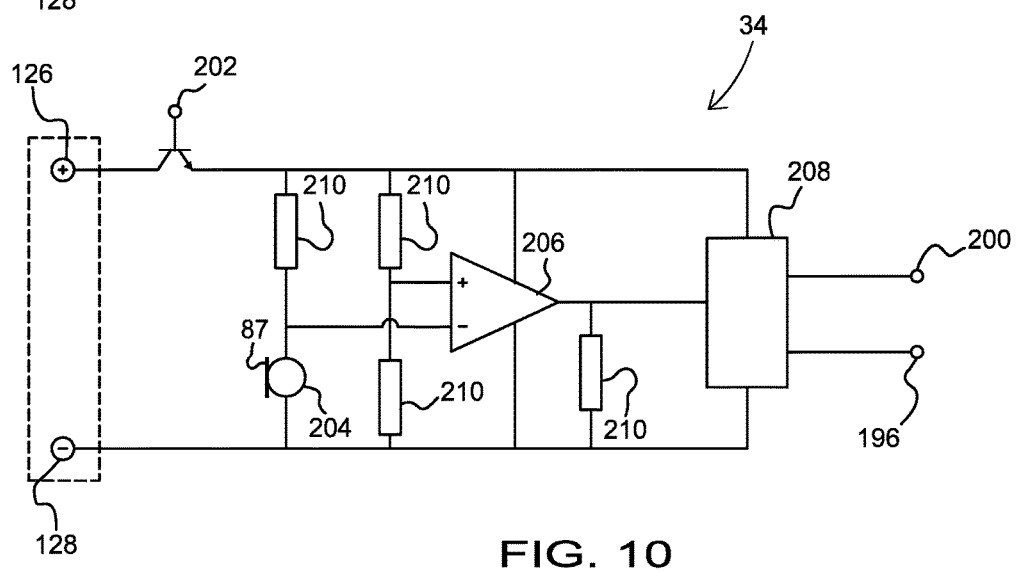
FIG. 10 is a schematic sketch showing electrically the silence circuit and the microphone control.

FIG. 10 is the silence circuit 34 having an activate microphone signal 202, a condenser microphone 204, an operational amplifier circuit 206, a counter/divider circuit 208, a supporting circuit resistors 210, a silence alarm signal active 200, and a repeat alarm signal active 196. When a signal is present at switching device; activate microphone signal 202, will power the listen capability of the silence circuit 34. Any audible sound within range of the condenser microphone 204 is present to the operational amplifier 206. When the signals, from the microphone, meet the predetermined amplitude level as is set forth via the supporting circuit resistors 210, the operational amplifier would output such a signal, for the duration of the said signal above predetermined amplitude level; to the counter/divider circuits 208. If there are two such predetermined amplitude level signals, generated within the window of time presented by the activate microphone signal 202, then, the counter/divider circuits 208 would output a valid silence alarm signal active 200.

Referring to FIG. 9, the silence alarm signal active 200 is seen via the timer/counter circuit 174, whereby the alarm state is suspended, for example one minute. Referring back to counter/divider circuits 208, a repeat alarm signal active 196 is generated when operational amplifier circuit 206 sees a pattern of meeting the predetermined amplitude level in three consecutive beats in three alarm cycles. When the system 10 of the present invention is in a quite or quiescent state, the timer/counter circuits generate a very short activation of microphone signal 202. If no predetermined amplitude level is seen by the counter/divider circuit 208, the activate microphone 202 is immediately shut OFF. But if a single predetermined amplitude level is present at 208, then the circuit 202 stays active and will listen for the aforementioned three consecutive beats in three alarm cycles.

This would have indicated that a nearby, other system 10 within range, was alarming, and, the repeat alarm signal would be generated via counter/divider circuits 208 at output 196 repeat alarm signal active. This activation would drive the green LED's 194, on FIG. 9. These functions described in FIGS. 9 and 10 will be better appreciated and be more fully detailed in the following state and waveform sections of this disclosure.

A suitable counter/divider 208 would be a CD4017 and operational amplifier 206 would be a LM741 and are both manufactured by Texas Instruments. A suitable condenser microphone 204 would be a CME-5042PF-AC, manufactured by CUI, Inc.

Again it is important to remember, if a microprocessor 28 is employed (as is described in FIG. 1a), then many of these discrete circuits are handled in software; reducing the component count and operating power consumption.

Figure 11:
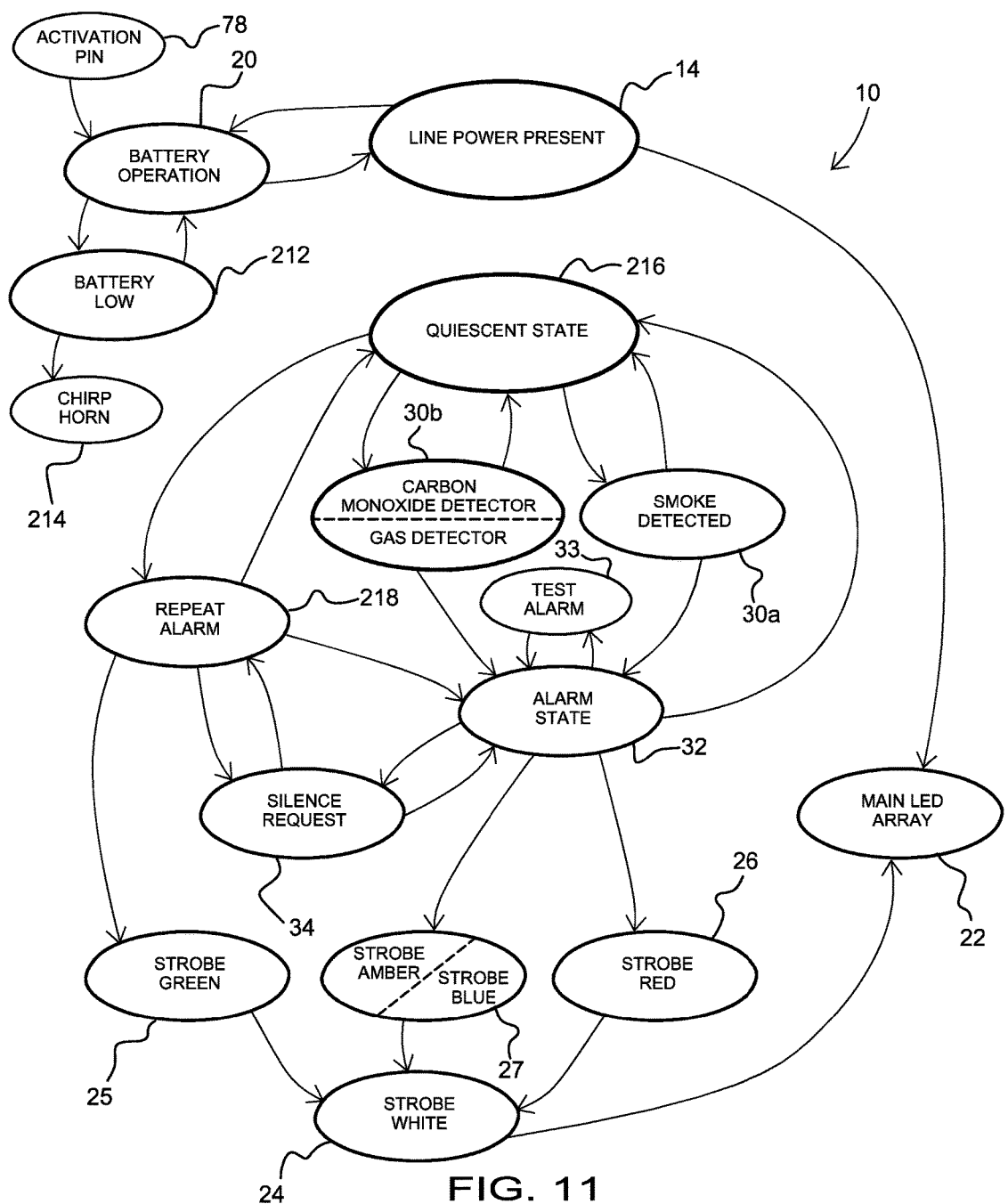
FIG. 11 is a state table, illustrating the various possible operating modes the system can be in, and how it navigates between states.

FIG. 11 is a state table, disclosing the operation of the present invention, where the activation pin oval 78 (as referenced in FIGS. 3 & 4) is disengaged from activation means 98, and, bringing to life the system via the rechargeable battery 20. Activation means 98 in the preferred embodiment is a surface mounted switch that will toggle ON when the pin is removed. The activation is depicted by the arrow flowing from oval 78 to oval 20. It is important to understand that the pin 78 cannot be re-engaged to deactivate the battery powering of the system 10.

Referring again to FIGS. 3 and 4, the ribbon 80, physically attached to pin 78 and mostly covering the electrical connector 12, prevent the system 10 from being installed for its purpose, without first removing the pin 78. And thus, system 10 is always activated via battery 20 before going into service. Should the battery 20 be low in stored energy, the system 10 will enter a battery low state 212, and issue a 'chirp' signal 214 that will be delivered to the audible alarm oval 32 (as referenced in FIGS. 1a and 1b). The arrows flowing to and from the battery operation 20 and battery low 212 are indications that this state is constantly monitored via battery monitoring circuit 130 in FIG. 6. The arrow flowing to the chirp oval 214 is an indication that the battery is low.

When system 10 is installed into service, (such as the Edison socket configuration, electrical connector 12, being screwed in a lamp—see H-A in FIG. 2a), and the lamp is turned ON, the 230/120 VAC conditioning circuit 14 would enter a line power present state as depicted in oval 14. The system would be now powered via VAC line current as arrows indicate flowing to and from the line power present oval and the battery operating oval 20. Further, the LED's on in the main LED array will illuminate; as depicted by the flow arrow to the main LED array oval 22. The LED's in the main array 22 will stay illuminated as long as there is available 230/120 VAC line power present.

The electronics is active and is monitoring all states of operations as follows. A quiescent state 216 oval is the 'normal' state. If the system 10 is not in a normal quiescent state, it would be in an alarm state by smoke detected and/or carbon monoxide and/or gas detected (ovals 30a and 30b) or a repeat alarm state 218. The flow arrows to and from said ovals indicate the system 10 being in such states respectively, and would deliver to the alarm state oval 32 that an event occurred and would sound the audible horn.

Further, the strobe red LED's 26 and/or strobe amber or blue LED's 27 ovals, are intermittent with strobe white LED's (24 oval). The red LED's 26 are a visual alarm that smoke is present, while the amber or blue LED's 27 indicates carbon monoxide (blue for gas) was detected. The intermitting of the red or amber or blue with the white LED's 24 strobing, give rise to exactly the type of danger that is present and causing the alarm. As was discussed earlier in FIG. 9 (and will be further detailed in FIG. 13), when VAC line power is available, the strobe white LED's (oval 24) signal the main array 22 to strobe as well; as indicated by the flow arrow between ovals 24 and 22.

The repeat alarm state oval 218 can also activate the alarm state oval 32. This is achieved in one of two ways: 1) with RF communications circuit 36 (as referenced in FIGS. 1a and 1b) is present, or 2) listening via the on board microphone 87/204 (see FIG. 10) for an audible alarm pattern. The audible alarm pattern will be more clearly understood in the waveform disclosed in FIG. 12. Either way, via electronic RF communications 36, or, of the listening for an audible alarm pattern, the repeat alarm state on oval 218 will trigger the alarm state 32 and strobe green LED's (green oval 25) intermittent with white strobing LED's (oval 24).

The significance of the red and amber or blue strobing LED's, or, the green strobing LED's are important to understand. When either the red, amber or blue are strobing, that means extreme danger of the smoke or carbon monoxide or gas was detected local to that system 10, and, when these red, amber or blue visual alarms (LED's 26 and 27) are seen, a user should exit in the opposite direction from the unit being that a high degree of danger is present.

The repeat alarm (oval 218) unit, being a second system 10 within either communications or listing range but not physically in smoke or carbon monoxide or gas environment, gives green strobing LED's 25 to indicate a possible safer exiting route, e.g., sound the audible alarm to give rise to the emergency, and, the green visual strobing indicates that no smoke or carbon monoxide or gas is present at said second repeat alarm location. Should smoke or carbon monoxide or gas migrate to the second system 10 location, the green LED's would turn to red or amber or blue, as the case may be as detected by its own on-board detector(s) 30 (30a, 30b or 30c respectively).

In some embodiments, a test alarm 33, mode is entered via oval 33. This is accomplished by turn the system ON/OFF/ON (switch the available 120/230 VAC line power) in quick succession, within one second to activate a test alarm mode. Both the audible and visual alarming means will activate in the test alarm state and will last for five second, for example, or, be silenced via a silence command response via oval 34. There is a system wide network 'query' test procedure that will be discussed later in the base-station disclosure of the present invention.

Looking now at FIG. 12a, where it is shown a waveform mapping a possible results generated from various states of operation in FIG. 11, there is an alarm cycle waveform 220, an audible pulsation waveform 222, a colored LED strobing waveform 224, a white LED strobing waveform 226, a silence window waveform 232, and a valid silence commend detected waveform 230.

Referring now to FIG. 11, when entering either the smoke detected or carbon monoxide/gas detected ovals 30a or 30b, triggers alarm state 32; represented here as 220 waveform. In the audible pulsation 222 waveform of the horn, there are three pulses (beats) for each alarm cycle 220, as well as three strobing of colored (red 26 for smoke or amber/blue 27 for carbon monoxide or gas, or, green 25 for no smoke, no carbon monoxide or no gas detected), or, green 25) LED waveform 224. The alarm cycle 220 also has two strobing white LED waveform 226 of-set with the colored waveform 224. In such a manner, there is an alternating patter to the colored and white LED's arrays 24 and, red 26, or, amber or blue 27 for danger; green LED's 25 for repeat mode, as indicated in FIGS. 1a & 1b.

The silence window waveform 232 shows the interval of time between the horn in the alarm 32 being silenced, so the microphone 87/204 can listen. The valid silence command detected waveform 230 shows that a command to SHUT OFF has been generated and recognized (this function will be discussed in FIG. 12b). Note that the audible pulsation 222, and colored and white strobing LED's 224 and 226 have ceased at the exact moment the trailing edge of the second valid silence command detected waveform 230. This moment the alarm turns OFF, time-OFF 228 will suspend the alarm state, for example one minute (as seen in FIG. 11, ovals 32 and 34). If the detected smoke or carbon monoxide or gas has not cleared the detectors 30a or 30b, then the alarm state will re-establish alarming again as indicated above.

Moving to FIG. 12b an audible signal generated within the silence window 232, shows what a spurious noise (background) detected waveform 234 looks like. In the next silence window 232, a possible real command signal waveform 236 shows a first silence recognition waveform 238, and, a second silence recognition waveform 240; both signals being above the required amplitude threshold 242 predetermined amplitude level. Two separate signals, represented as references 238 and 240, must occur within the time that a silence window 232 is open and listening. It is the two distinct signals that form the required 238 and 240 waveforms, that produce the valid silence command detected waveform 230 (via input to amplifier circuit 206 in FIG. 10 meeting required threshold level established by the resistors 210).

It should be understood that the user of the present invention of system 10, would verbally command using speech "SHUT OFF" within the listing range of the microphone 87/204. Further it is understood that any like command having two sharply formed words, such as BE-STILL, QUI-ET, SHUT-UP, etc., or even two 'snapping' of one's fingers sharply could produce the required valid silence signals 238 and 240, resulting in the command pulses 230 to be silent. If there are just one pulse, or if there are three or more pulses, achieving the amplitude threshold 242 level, within a silence window 232 (as determined via counter/divider circuit 208 in FIG. 10 would not output silence signal 200), it would be considered invalid and the alarm would not turn off. These timing waveforms are all generated via the circuits in FIGS. 9 and 10, initiated via the smoke and/or carbon monoxide and/or gas detectors in block 30 of FIGS. 1a and 1b.

In FIG. 12c, it is shown a repeat alarm waveform 244, a time-ON 246 moment alarm is detected waveform, and an audible alarm detected pattern waveform 248. The following scheme is used in the sound only embodiment, i.e., the embodiment does not include RF communication means. Referring to FIG. 11, the repeat alarm 218 oval constantly listens for the pattern in waveform 248. It accomplishes this by briefly turning ON the microphone 87. Should there be just spurious background noise, like is seen on waveform 234, then the microphone would turn back OFF (saving energy) until the next time to listen is programed.

Thus, if there is a sound that has sufficient signal amplitude to meet the threshold 242 predetermined amplitude level, the microphone 87 would stay ON and listen. If a pattern persists of alarm pulsation waveform 222 three times consecutively, then the system 10 would enter an alarm state 32 at time-ON 248. The repeat alarm being activated, means that another system, within listening range, has alarmed and in an alarm state.

The repeat alarm function (referring to FIGS. 9 and 11), would strobe green oval 25 with white oval 24. It is in this way that all such systems 10 can network throughout a structure, such as a home, in just seconds. Further the microphone 87 would continue to listen, in the periods of the silence window 232. If there are no further sounds meeting the threshold amplitude level 242, then the repeat alarm signaling of audible 222 and green strobing 25 alternating with white strobing 24 LED's would automatically stop. As was earlier mentioned, and referring to FIG. 1, if the system 10 is equipped with the manufacturing option of the RF communication circuit 36, then the system 10 would transmit and receive T/R its state and status via RF signaling; and not just rely on the microphone 87/204. The sound means is useful for networking between lesser functional apparatuses 10 that would not have the RF communications means installed.

Figure 13A:
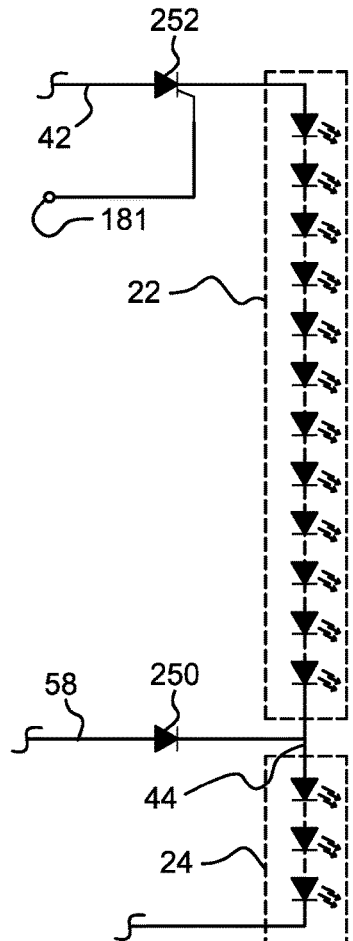
FIG. 13a. is possible LED array circuit diagram showing Blocks 22 & 24 from FIG. 1a and configured in a serial arrangement layout.
Figure 13B:
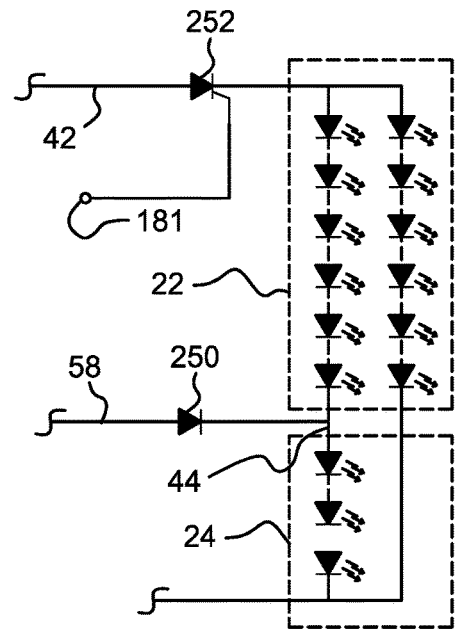
FIG. 13b is another possible LED array circuit diagram showing Blocks 22 and 24 from FIG. 1a configured in a serial and parallel arrangement layout.
Figure 13C:
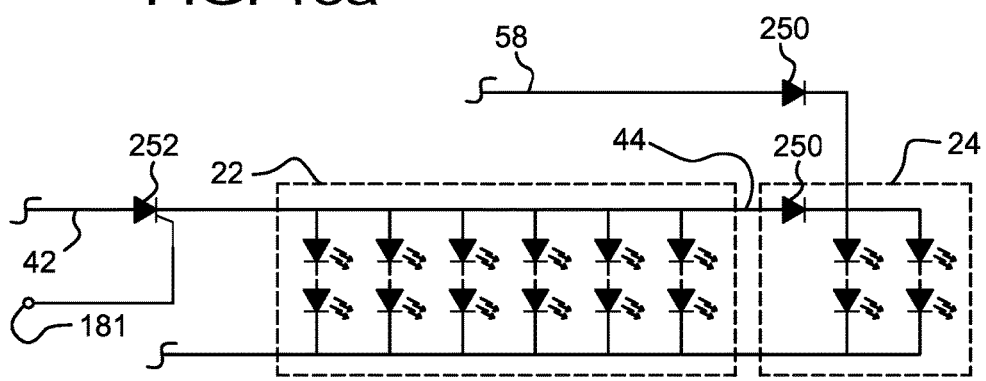
FIG. 13c is yet another possible LED array circuit diagram showing Blocks 22 and 24 from FIG. 1a configured in a serial and parallel arrangement layout.

FIGS. 13a, 13b, and 13c illustrate three conventional layouts of LED arrays. FIG. 13a shows a serial arrangement of the main white LED array 22 (referring to FIGS. 1a and 1b), and, FIG. 13b and FIG. 13c show a combination of serial and parallel design of main array 22. The white LED's in the strobing LED array 24, in the present invention, have a dual purpose. 1) when powered by line 42, the array 24 operates as a normal light, e.g., steady ON giving illumination, and 2) used as a strobing white light during an alarm state if on battery power. This is achieved via power provided on line 58.

In some embodiments, a steering diode 250 prevents voltages present on line 44 back through the diode 250, thus when power is available on line 42, no other circuits are effected. Likewise, when the strobing power is present on line 58, the LED array 22 is not effected or illuminated; by the unidirectional nature of diodes only allowing current to flow in one direction, isolation between these arrays are achieved.

When the system 10 has VAC line power available, and the main array 22 is ON, a silicon controlled rectifier (SCR) 252, would interrupt the steady-state ON of the main array 22. The effect of the SCR 252, being controlled by the main array strobe signal 181 (as referenced in FIG. 9) would cause the main array 22 to strobe in unison with the white and colored LED arrays as mentioned earlier when the system 10 is in an alarm state. It is important to understand that the main white LED array 22 will strobe only when VAC line power is available, along with the white strobing array 24, and, the smaller white strobing LED array 24 is only strobing during battery operation; when VAC line power is not available. This conserves energy while still giving a visual alarm during an alarm state.

It is noteworthy to say that the layouts in FIGS. 13a, 13b, and 13c are just examples, both in configuration and number of LED's in any of the circuits. There are too many variables in the manufacturing to list them all. Therefore, the inventors explicitly underscore the actual number of LED's used, and their layouts are dependent on the engineer's choice of available LED's, the form of VAC conditioning (as is shown in FIGS. 5a, 5b, and 5c), and, the end use of the present invention 10, i.e., the Edison A-19 lamp housing (H-A) in FIG. 2a, the recessed housing (H-D) fixture in FIG. 2d, the nightlight housing (H-E) in FIG. 2e.

Each of these housing types would use different considerations in the number of LED's, the layout of LED's and the circuit's form as shown in FIGS. 5a, 5b, and 5c. There are many suitable manufactures of both the white and colored LED's, (such as Cree, Lumileds, Osram, Vishay and Avago to name a few) offering hundreds of varieties. Anyone skilled in the art, could select a quantity of LED's and a circuit layout, along with VAC power conditioning that is ideal for any given LED choice; to result in a functioning system 10 of the present invention.

In operation, the present invention for an improved LED light bulb system 10 incorporating a smoke detector means, a carbon monoxide detector means, a gas detector means (any one or all such means) 30, into a bulb envelope housing H-A, H-B, H-C, H-D or H-E, while maintaining substantially the standard style and shape or form of the conventional light bulb housing. The housing, of any style/type/shape of conventional light bulbs, lighting fixtures or lamps; making the improved system 10 disclosed herein, easily a direct replacement for any prior art devices preexisting. Said housings will have partitions 88 and 90, separating areas of the internal spaces. Typically, there are three such spaces; a LED light interior 82, an electronics chamber 84 and a detector/microphone/horn space 86.

The powering circuits can be configured to any particular design need that can use a transformer-less layout as in FIGS. 5a and 5b, or, the use of step-down transforms as in FIG. 5c. The design needs being a consideration for the end use of the present invention in any given application.

The improved LED light bulb system 10 having an audible pulse emissions 222 means, that in an alarm state would pulsate. Such pulsation can be rhythmic, for example 3 beats ON and 1 beat OFF for an alarm cycle 220. This audible pattern is intended to give urgency. Further the audible/visual alarm circuit 32 has high intensity white 24, and, high intensity color (such as RED 26) LED's that strobe alternately ON while in an alarm state 220. Such strobing makes a visible alarm 224 that matches the pulsation of the audible alarming.

A 'silencer circuit' 34 would listen (via microphone 87), between the audible pulse emissions (silence window 232). If it hears two sharply structured reverberations 238 & 240, such as in someone shouting the words "SHUT OFF" (or the alike) within a brief window of time 232, the device would suspend the alarm state 228, for example one minute. If the air was not cleared after that period of suspension of time, the alarm would continue. The user could tell it to shut-off again until all air is clear.

The same microphone 87 listening device 204 mentioned above, would listen for audible alarm patterns of sound 222, and if detected three consecutive times (222) in three alarm cycles 220 would repeat the alarm 246; thereby creating a network of two or more like systems 10 of the present invention (like in function, not housing type or style).

In the manufacturing of the system 10, the non-removable, rechargeable battery 20 power is shipped in a dormant state until the end user would cause a 'one-time' activating means 98 (by removing pin 78) to initialize the electronics at instillation. The system' electrical connections 12 are partially cover with ribbon 80, making it impossible to install the device without first removing the pin and ribbon. The rechargeable battery, will keep alive all necessary circuitry during periods when VAC Line power is not available. The battery 20 is always kept at peak capacity when the line voltage is present, and therefore is ready to cover periods when the VAC line voltage is OFF.

Battery operation is restricted via circuitry 66 by selectively powering the system of the present invention while it is in a 'quiescent' state 216. That is, a state where the system is not in an alarm state 32, and therefore can power-down unneeded drains on battery 20. If the battery does experience a drop in stored energy, a low battery is sensed via monitor 130 and would enter a low battery state. Appropriate notification via a pulse to the horn 178 would 'chirp' 214. That is, emit a very short duration pulse of sound, for example once per minute.

To correct this low battery situation, the user would simply 'turn-ON' the light system 10 by making the VAC line power present to the system and recharge the battery 20 via circuits in FIG. 6. This would sufficiently re-charge the battery and chirping would immediately stop. It is understood that the microprocessor 28 could better control universally all aspects of operation of the present invention with respect to managing power consumption. Also that an ASIC (Application Specific Integrated Circuit) would greatly help in miniaturization of the electronics, as well as the efficiency of power use.

The present invention for an improved LED light bulb system 10, can communicate 36 via short range radio frequency (RF) signaling, that an alarm was activated. The present unit, detecting the alarm situation via 30, would alternate pulsing of high intensity white and red (or amber or blue) LED's for the visual signal, and the audible pulsation mentioned above. While, any other like (in function) improved LED light bulb 10, within range of the present unit, but not in the smoke or carbon monoxide or gas environment, would repeat alarm (waveform 246) with an audible and visual signaling of its alarm. In this case however would not present the red, amber or blue LED pulsating, but use the green high intensity LED's; until or when it also detected the smoke, carbon monoxide or gas. The green LED's pulsing with the white here would indicate a possible 'safer' escaping route for the user of the system. Thus, such a system 10 would give direction as to possible safer exiting away from the danger. During silence window 232, the repeat system 10 would listen for any sound meeting the amplitude threshold 242, and, if hearing none would stop the repeat alarming both audibly and strobing white and green LED's.

In a scenario of how a home, with the present invention of an improved system 10, is installed in every room may unfold: A user occupant in a center room of a long hallway and having a base-station in it, with laundry room and garage at one end, and kitchen and living room at the other; is awakened in the middle of the night via the base-station alarming that there is smoke in the laundry room. With the sound of the detectors blasting from every direction (because of the repeat feature of the systems 10), the occupant opens the door and seeing in the hallway, a 'nightlight' flashing green and white strobing light, would enters the hallway. Looking to the laundry room/garage end direction, sees flashing red and white strobing light. The occupant turning to the other direction, at the kitchen/living room end of the hallway, sees flash green & white strobing light, and would know that a fire (red light) was at the garage end of the house, and would appropriately exit the home in the direction of the green strobing light (safer environment) end. In a case of a 'false' alarm, as would be if something burning on the kitchen stove; and the kitchen system 10 alarms appropriately signal with red & white strobing.

The other systems 10 throughout the home soon triggers with a 'repeat', green and white strobing alarm state. The occupant simply would remove the burning pot from the stove (open a window) and verbally command the kitchen system 10 to "SHUT-OFF." The unit immediately stops sounding the alarm (at the recognizing the command); following soon, the other units throughout the home, that are in their repeat state of alarm, would also stop alarming. The suspended alarm state in the kitchen unit would alarm again if the smoke was not cleared.

The system 10 of the present invention takes advantage of all these objectives by directly replacing a conventional light bulb, configured in any conventional style or shape, with an improved LED light bulb incorporating a smoke detector, carbon monoxide detector or gas detector, and, transmitting/receiving RF signals with an annunciating base-station (that will be fully disclosed later) that always gives the current state of the network of apparatuses in the structure; by having a non-removable rechargeable battery always available and ready to alert in both audible and visual strobing pulsations, and, can be silenced by simply telling it verbally to SHUT OFF; using any two sharply structured reverberations (words/syllables) in a sequence of speech sounds.

The improved device would be configured to all existing lighting lamp configurations, making them easy to replace existing conventional lighting and thus make it easy to up-grade the home or building to a higher level of self-assurance. The disadvantages of prior art listed earlier are all overcome and the user of the present invention can remove older independent smoke, carbon monoxide and gas alarming devices that require constant replacing of batteries, and are subject to annoying false triggering of the alarm, that cannot be silenced conveniently, e.g., removing of the its battery. The improved LED light bulb system of the present invention uniquely solves problems that prior art cannot.

Figure 14:
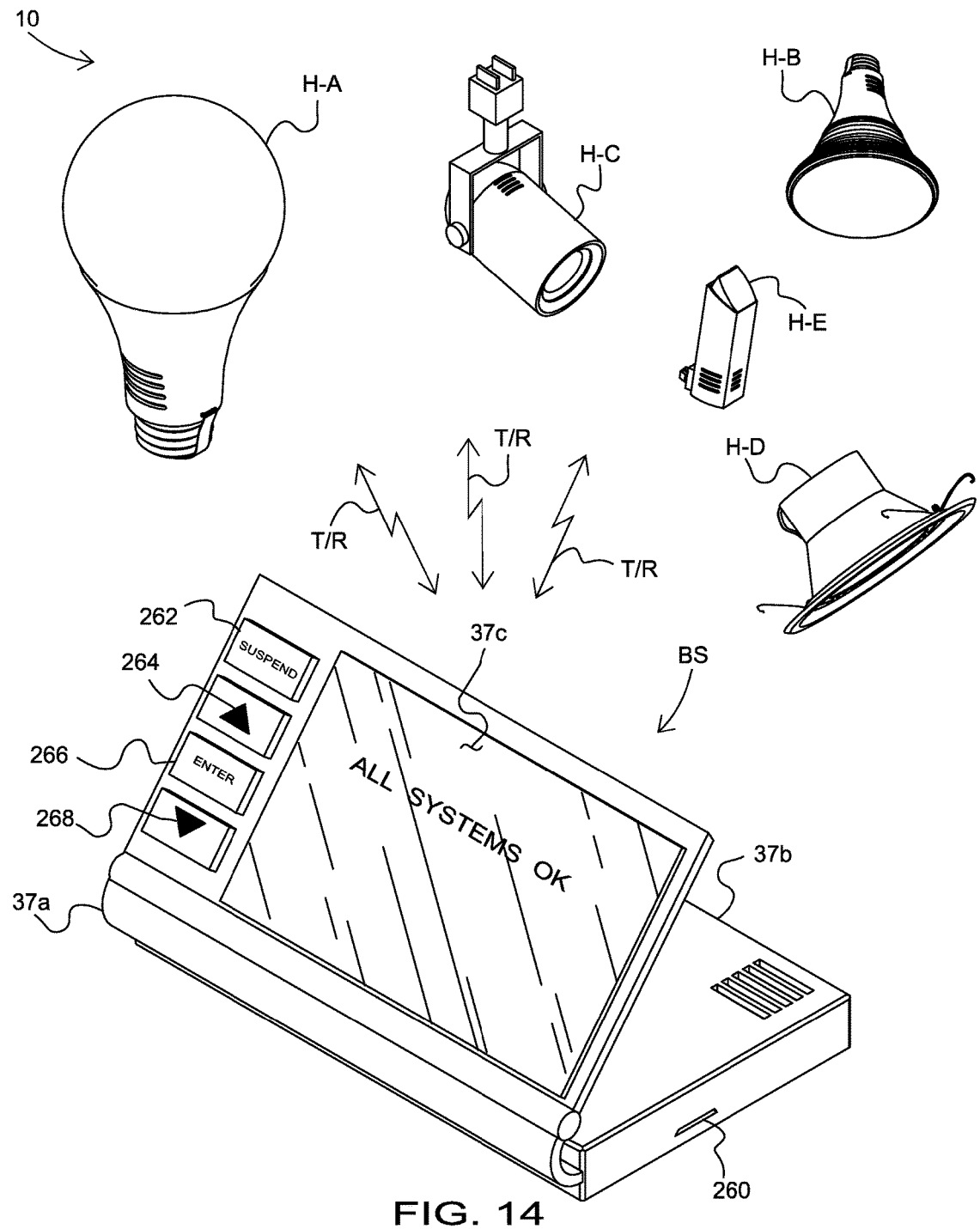
FIG. 14 is an illustration of the base station features, and, connectivity means with individual improved LED light bulb alarming systems.

Turning next to FIG. 14 where it is illustrated, a base station BS for the present invention to communicate with the individual, improved LED light bulb alarming systems 10, in comprising a network. Base station BS features a base station electronics 37*a* section, a base station power circuit 37*b* section, and a base station display and control 37*c* section. The base station electronics 37*a* has a speaker 258 and a USB Comm. Port connections 260 means. The base station electronics 37*a*, has base station power circuit 37*b* incorporated within (not shown in FIG. 14), comprising of a rechargeable battery and VAC line power to DCV via a transformer module connection (also not shown).

The battery operations of the base station BS, makes it portable, and thus, be carried about the home/building for programing purposes which will be discussed later. The base station electronics 37*a* further has short-range RF communications means. In the preferred embodiment, the base station communication means is of the blue-tooth technology and compatible with all system 10 devices. It should be understood that other RF means, such as ZigBee or 'smart' appliance communication techniques could work equally as well. This communication is indicated by the transmit/receive signal arrows T/R referenced in the FIG. 14, and, are shown to be with the listed H-A, H-B, H-C, H-D, and H-E systems 10, comprising a network of the present invention devices.

Also, the base station BS can 'listen' via a microphone for an alarming pattern waveform of sounds disclosed earlier, and are manufactured into a lesser sophisticated model of the system 10, not having incorporated into it, a communication circuit 36, (as referenced in FIGS. 1*a* & 1*b* of co-patents by the inventors).

In some embodiments, the base station display and control 37*c* section may have a 'suspend' pushbutton 262, a menu 'up' scroll arrow pushbutton 264, an enter/select pushbutton 266, and a menu 'down' scroll pushbutton 268. Using the scroll 'up' and 'down' arrow pushbuttons 264 and 268, along with the enter/select pushbuttons 266, will allow navigation through the base station BS various menus (a more detailed description of the menu system will be disclosed in FIG. 17). The 'suspend' pushbutton 262 will immediately suspend any alarming system of the audible alarm, for example, one minute; giving a chance to 'clear the air' before the alarm will re-instate alarming, if not cleared.

That is, if the danger is still present after the suspended period of time, the system will sound again. The base station microphone can also listen for verbal commands, such as SHUT-OFF when spoken to it within close range, as was disclosed in the 'silence command' discussion of the system 10, earlier in the patent. Both the 'suspend' pushbutton 262 and the silence command feature (verbally spoken by speech) via the listening of the base station microphone built-in to the base station electronics 37*a*, are useful when encountering a false alarm situation.

Figure 15:
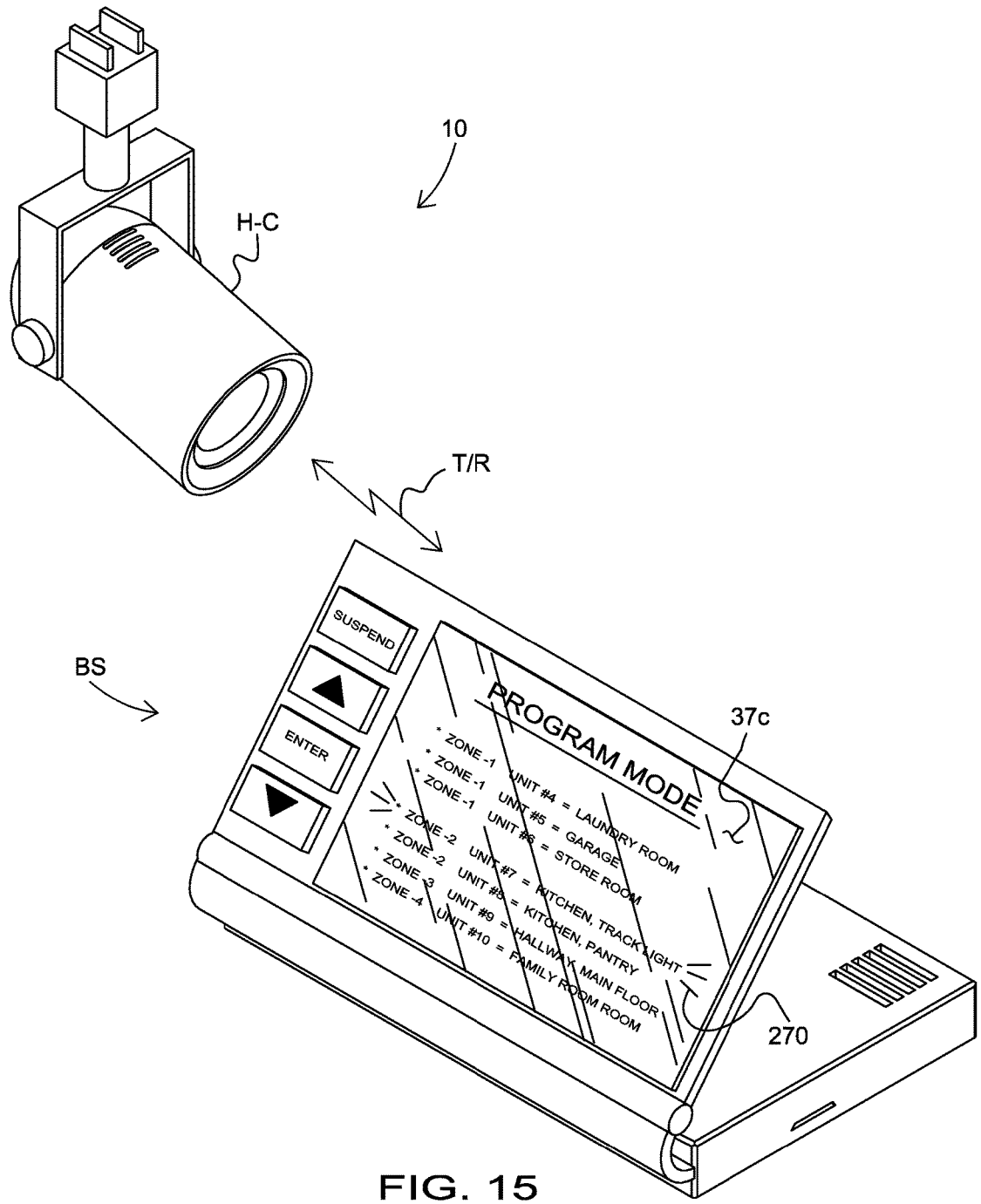
FIG. 15 is an illustration of the base station in program mode.

The FIG. 15 is an illustration of the base station BS in program mode. The display screen 37*c* shows an example of listed, improved LED light bulb systems 10, identified by ZONE-# & UNIT-#, TYPE of lamp/fixture, and assigned locations. Each new system 10 added to the network, must be registered with the base station BS through this menu. Registration of a system is accomplished, with the base station BS in close proximity and in program mode, by toggling VAC line power of the system 10 ON/OFF/ON, within one second (for example). The base station will recognize the system 10 and down-load via. T/R, a unit ID code 270; making it part of the base station BS network. The base station BS must be in the program mode and ready to acknowledge the signal produced by system 10 at the ON/OFF/ON procedure. If the system 10 was move to a new location, it can be re-programmed in the same manner, to up-date the network.

The following is a discussion of the unit ID code 270, in an example. Each system 10 (manufactured with a microprocessor as in FIG. 1a) has an eight-character code. The first two hex digits are identifying it as a manufacturing iteration and model (M-ID). When being programed, via a base station BS, the base station assigns a HOUSE code of three hex digits and a UNIT ID of two hex digits. There is also a single hex digit, in the eight-character hex code, as an ALARM CATEGORY code. Below is an ID Code Communications Table-1 for illustrating of the system 10, eight hex character unit ID code 270, and its permutations possibilities.

ID Code Communications Table-1

|  | M-ID code | HOUSE code | UNIT code | ALARM CATEGORY code |
|---|---|---|---|---|
| # CHARACTERS: | XX | XXX | XX | X |
| POSSIBLE VARIATIONS: | 256 | 4096 | 256 | 16 |

With every communication event between a base station BS and any system 10, the unit ID code 270 immediately identifies it with the manufacturing model, the home it is assigned to, the type/style of lamp/fixture it is, and when alarming, the alarm category. For example, and referencing FIG. 15, if the system 10 was only a smoke detector type device (not incorporating a carbon monoxide or gas detectors) would be identified in the first two hex digits, the M-ID code. While assigned into ZONE-2 as being the kitchen area, and UNIT-#7 of the track lighting variety. The last character stating the unit was in a 'functionally working' and 'quiescent', quit state.

The base-station BS is uniquely an important 'center' of information as part of the present invention network of devices. The inventors have detailed an identifying protocol (270) to communicate between each other. But it is explicitly understood that other protocols, and particularly the BACnet (Building Automation and Control Network) standard. as one that would work well. Further, the inventors know that mobile phone APPs (applications), could duplicate the workings of the base station, and therefore some may feel it unnecessary. Indeed the alarm system 10 works with the base station, not instead of it.

But, giving the importance of the base-station, within the network of smoke, carbon monoxide and gas detection systems, and, the seriousness of an event happening; just having a mobile phone to do the base station's job is NOT enough. Over time, mobile phones are OFF, their battery go dead because of their multiple use, they go missing (such as mom goes to the store with the mobile phone and no other mobile phone with the app. is in the house, etc). So the inventors have plainly made clear, that a base-station 'need' well outweighs any argument that a mobile phone can perform the same function. However, it is explicitly understood, that the base station (BS, 37a, 37b, 37c) can, either along with or be incorporated via software into, other 'conveniences' electronic devices. These devices, such as Amazon Corporation's Alexa/Echo system, or Google's Home system, etc., and can further augment the base-station/control center of the present invention; making them even more useful.

FIGS. 16a, 16b, and 16c are an illustrations of the present invention networking, where a single unit detects smoke and alarms; and how the systems 10 works in conjunction with each other and the base station comprising the network and system of the present invention. FIG. 16a shows a system 10, alarming-smoke 272 (which would be red and white strobing LED's), with its transmitting range indicated by alarming unit range 274. If the base station is within the range of the alarming unit (in this case ZONE-2, UNIT-#8), the base station would immediately indicate the exact system 10 alarming danger of smoke. If not in range, as is seen the FIG. 16b, illustrates how the network would relay the alarming unit 272, to repeat alarm units 276 (being within the range 274 of the alarming unit 272). The $1^{st}$ repeat alarm 276 would strobe green & white and re-transmit the event that unit 272 detecting smoke. And now referring to FIG. 16c it is further shown, the $2^{nd}$ repeat alarm 280, being in the $1^{st}$ repeating unit's range 278, would also strobe green and white LED's and re-transmit the original detecting unit 272 alarming smoke.

The base station BS in the scenario, also being in one of the $2^{nd}$ repeat unit's 280 range would verbally announce via speaker 258, speech 284; that smoke was detected in the kitchen pantry, while displaying on the screen 37c the exact details of the category of alarm, where it is and which units it is. It is important to understand the all this 'hand-shaking' via ID code within the network of systems 10 and base station BS, are synchronized and accomplished in just a few moments of time, making the system highly useful and practical no matter how large and spread-out a structure is containing the present invention of network-registered devices.

Figure 17:
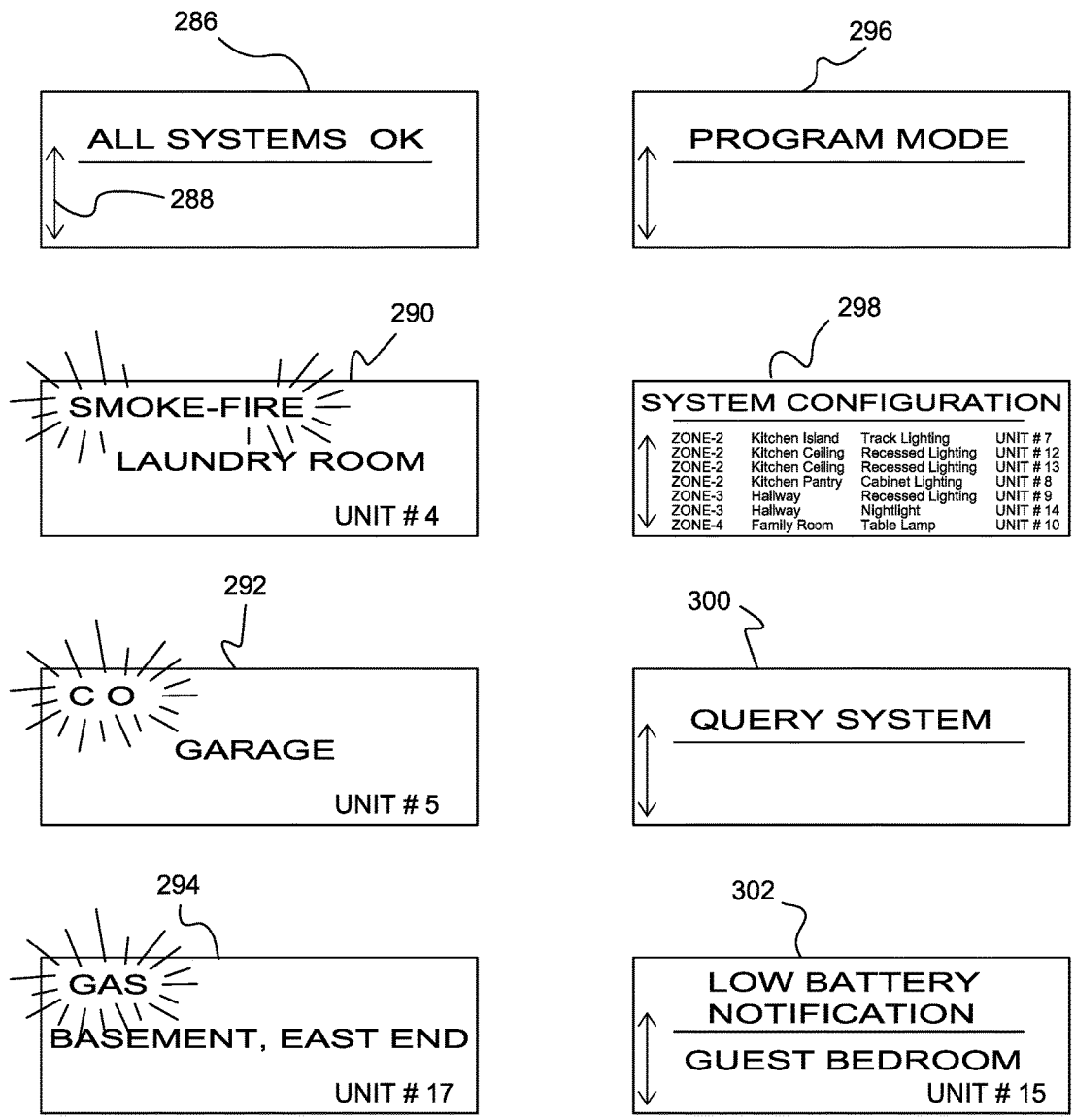
FIG. 17 are examples of various screens, menus and displays of the base station of the present invention.

In FIG. 17 are examples of various screens, menus and displays on the base station BS, of the present invention, screen 37c. When every system 10 is in a quiescent state 216 (referencing FIG. 11), then display screen 286 appears with an 'ALL SYSTEMS OK' message. Certain display screens have a screen scroll indicator 288, which indicated that the base station BS 'up' and 'down' pushbuttons 264 and 268 are accessible and the user may scroll to other screens; such as 'PROGRAM MODE 296, SYSTEM CONFIGURATION 298 and QUERY SYSTEM 300, etc. Should there be a low battery in the network (any system 10 or the base station BS) a LOW BATTERY NOTIFICATION 302 screen appears. The message in screen 302 also indicates the exact unit number and location so corrective action can be taken, e.g., turn VAC line power ON to recharge the battery of the device giving notice.

The program mode 296 was disclosed in detail in FIGS. 14 and 15. The system configuration screen 298 shows all the systems 10 in the network; giving which zone, what location, type of system and unit number information. With the query system screen 300, enters a test function menu that brings up each individual system 10 registered in the network. The query system then can command the system 10 to give a single audible burst follow by a single white strobe, a single green strobe, and, alarm colors of a single red strobe, a single amber strobe, and a single blue strobe of the LED's (if said unit is equipped with all three detecting features, else it would only strobe the color of the particular sensor type, i.e., red smoke, amber carbon monoxide and blue gas).

The display screen 300 shows the exact model of the system being queried via the unit ID code 270 earlier mentioned. The query system screen 300 display, automatically scrolls through all units within a designated zone number, to fully test the networks functionality, as described above with 'pinging' each system 10 to do a single burst and strobe of light. Any unit not giving an audible burst or expected LED strobe (as indicated in the display on the base station screen 300) could be immediately seen as defective, and can be replaced. Other 'testing' schemes can certainly be implemented, to include the silence commands, and be within the scope of the query system 300 of the present invention.

The three alarm screens, SMOKE/FIRE 290, CO (carbon monoxide) 292, and GAS 294 are all the important indicators of the system. When any system 10, either directly received via T/R signals (referencing FIGS. 15 and 15), or repeat relayed T/R signals, would activate one of these screens in their respective categories. The screens 290, 292 and 294 also indicate the exact location and unit number, and, the speaker 258 would annunciate the message 284 in exact detailed speech. That is . . . "SMOKE-FIRE, LAUNDRY ROOM."

Figure 18A:
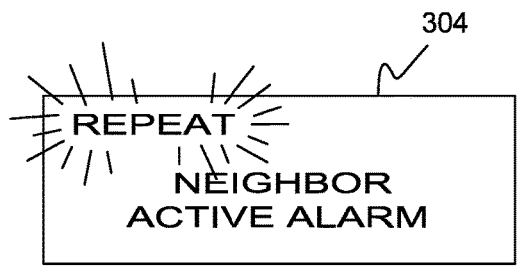
FIGS. 18a and 18b are illustrations of the repeat features of the present invention in a close proximity setting (such as an apartment complex), showing a neighboring, non-registered system, triggers an early warning alarm, where
Figure 18B:
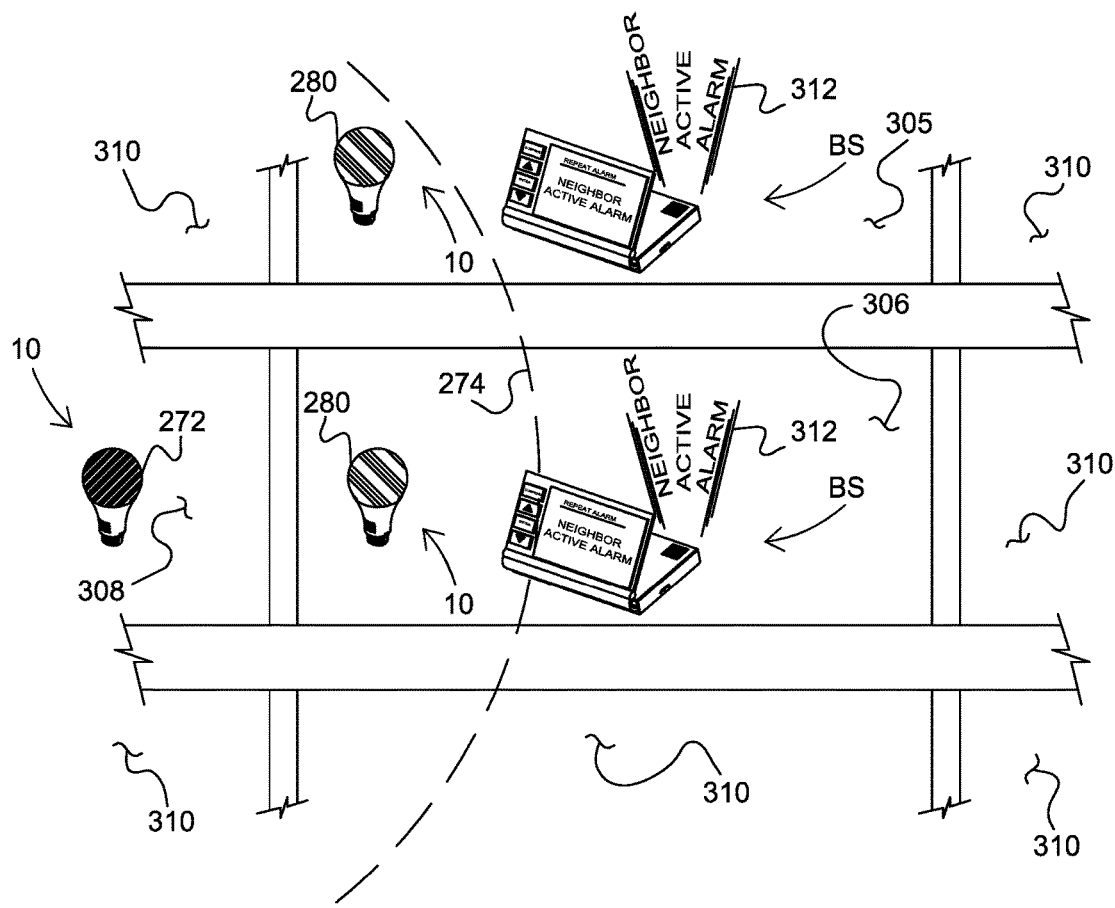

The FIGS. 18a and 18b are illustrations of a second feature of the repeat function of the present invention, in a close proximity setting (such as an apartment complex), showing a neighboring, non-registered system 10; triggers an early warning alarm. FIG. 18a shows the base station BS message 304, if a neighboring system 10 device was alarming in any category. The message 304 would alarm in the repeat (green strobing LED's) mode, and give early warning that a potential danger event exists nearby.

FIG. 18b shows an illustration scenario of a multi-floor complex (such as an apartment building or high-rise building), having a plurality of individual dwellings 305, 306, 308 and 310. The system 10 in dwelling 308 is alarming 272 (as referenced in FIG. 16). The nearby dwellings 305 and 306, with the present invention, and within range 274, triggers a repeat alarm 280 respectively in their exclusive network. The alarming 280 systems 10 would strobe with the white and green LED's as usual and the base stations BS would respond in their respective networks. But this time, since the unit ID code 270 (as referenced in FIG. 15), is not one of the registered networks of 305 or 306 systems 10, would display the message 304 and the annunciate 312 verbally; indicating a nearby neighbor has an alarm event.

Discussing the FIGS. 14 through 18 in operation with the base station BS of the present invention, and, the relationship with the present invention system 10, comprising an improved LED light bulb with alarming for smoke, carbon monoxide and gas in a system network is as follows. System 10 being programed with a unique unit ID code 270, via a base station BS, becomes a component of a network of light devices having detecting means for dangerous smoke, carbon monoxide or gas, within a dwelling/structure. Any number of devices, (system 10 in any style/type housing configurations) can be programed into the network and registered by its unique unit ID code 270. If any individual unit triggers an alarm event (either smoke, carbon monoxide or gas). The base-station displays visually and annunciates the exact alarming unit location and category of alarm.

The system 10 having a repeat feature, strobing green LED's that indicate a danger is nearby but not immediately present, give warning for occupants to exit to safety; away from any red, amber or blue strobing LED system 10 which indicate immediate danger at its location. In the case of a false alarm, the alarm can be silenced by simply telling it (base station BS or system 10) verbally to SHUT OFF; using any two sharply structured reverberations (words/syllables) in a sequence of speech sounds.

There can be as many base-stations BS within the network as desired, all sharing the same information and registry information via unit ID code 270. For example, a base stations for each floor of a dwelling/home, might be one in the basement, one on the first floor and one on second floor. Or, base stations could be statically located in main areas, such as the kitchen, family room and master bedroom, where occupants gather most and are the cross-paths of activity. The intent is that occupants can very quickly ascertain the exact level of danger, its location and a best route to escape, by its visual and audible announcing the exact danger, and by the system 10 visual and audible alarming of pulsations of sound and colored high intensity strobing of LED lights indicating the exact danger, or possible path to escape the building.

Figure 19:
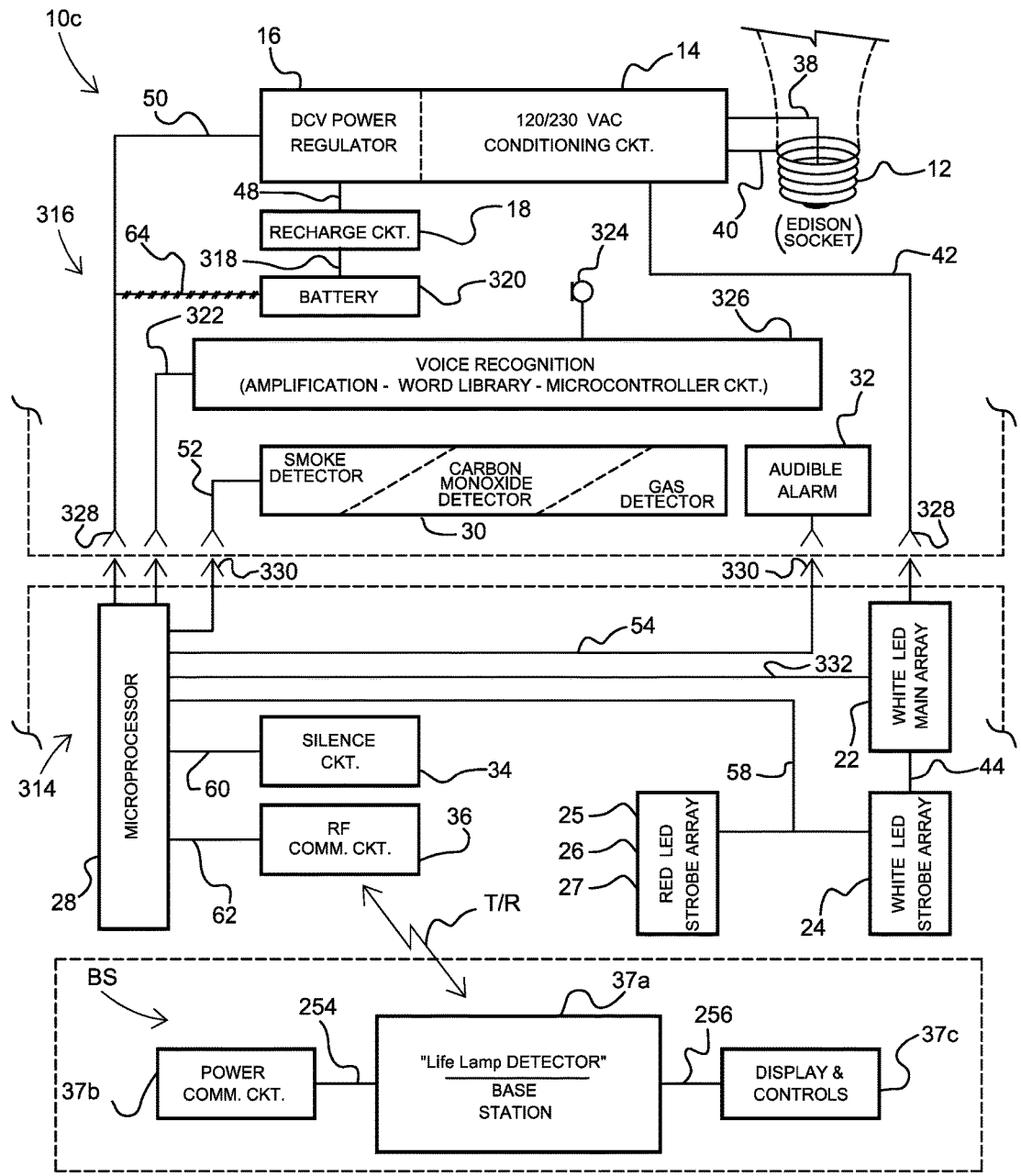
FIG. 19 is a block diagram of second alternate embodiment of the present invention with a two-piece design, and, having voice recognition commands and controls.
Figure 20:
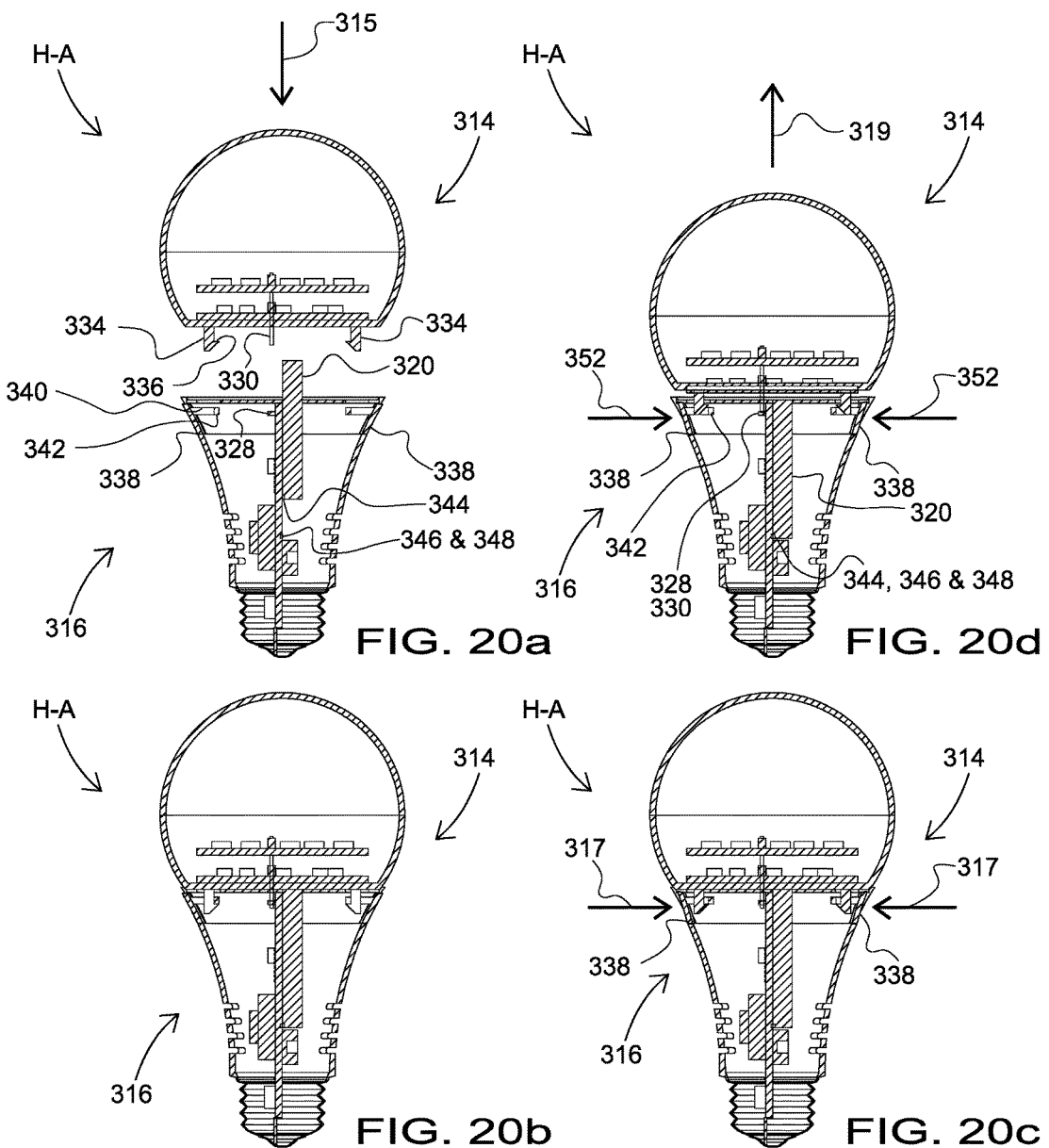
FIG. 20a is a cross-sectional illustration of an Edison style light bulb housing, showing the two-piece design separated, and with battery partially inserted, in accordance with an embodiment of the present invention.
FIG. 20b is a cross-sectional illustration of the Edison style light bulb housing of FIG. 20a, showing the two-piece design fully assembled, in accordance with an embodiment of the present invention.
FIG. 20c is a cross-sectional illustration of the Edison style light bulb housing of FIG. 20b, showing the release mechanism of the two-piece design, getting ready to separated, in accordance with an embodiment of the present invention.
FIG. 20d is a cross-sectional illustration of the Edison style light bulb housing of FIG. 20c, showing the two-piece design in the process of being separated after the release, in accordance with an embodiment of the present invention.

Turning now to another alternate embodiment (specific to voice recognition command and control), with a system and network of the FIG. 19 through FIG. 27, showing an improved LED light bulb with smoke, carbon monoxide and gas detection means, and responding to voice commands and controls in a 'two-part assembly'. FIG. 19 is a block diagram 10c of the present invention having a two-part design housing structure; LED/communications/processing Part-A 314, and, a sensor/alarm/voice recognition Part-B 316. This configuration of two parts allow a rechargeable battery 320 to be inserted into the assembly before Part-A 314 and Part-B 316 are coupled. Part-B 316 having additional components, a voice recognition circuit 326 with a voice microphone 324. Appropriately, interconnecting lines 318 and 322 connect these functions to other circuitry respectively.

The voice recognition circuit 326, comprising of a multistage amplification means, a word (vocabulary) library means and a microcontroller means, will be discussed in more detail later. Part-B 316 further comprises a connector means 328 with female receiver connections. Part-A 314, having intra-part connector (male) pins 330, which will align with Part-B 316 connector 328, when the two parts are coupled making electrical union possible. The other blocks in FIG. 19, showing diagram 10c function as previously described in earlier embodiments of this disclosure, with the exception that now, voice recognition commands and controls are possible, allowing advanced user abilities in lighting, along with the detection means.

Before leaving FIG. 19, the inventors have identified a number of suitable manufacturers of the voice recognition 326 circuitry. Philips Semiconductor, Texas Instruments, Microchip Electronics, to name a few. Although there is no easy 'drop-in' integrated circuit that would exactly meet the needs of the present invention (especially considering the small space to fit all the electronics), it is anticipated that an 'application specific integrated circuit' (ASIC) would best suit. In such an ASIC, there could be multi-stage (for example three) amplification, appropriate analog-to-digital conversion, memory word reference library (containing about 20-word vocabulary) and microcontroller; all in one 'small' package. This would allow very few input/output pins from/to the ASIC (from the microphone and to the system microprocessor 28, etc.), greatly reducing printed circuit board space and power consideration. Since the quantities in manufacturing the present invention are in the high numbers, and the desire to keep the purchase price of the system low, would make the ASIC scheme practicable and affordable.

FIGS. 20a, 20b, 20c and 20d are all cross-sectional illustrations of an Edison style light bulb housing H-A; showing a two-part design. In FIG. 20a is shown Part-A 314 and Part-B 316 assemblies separated, and with battery 320 partially inserted into Part-B 316 section. Part-A having a Part-A alignment pegs 334, protruding from the underside of housing Part-A 314, and, having a Part-A catch 336 surface near the edge of the alignment pegs 334. Part-B 316 has a Part-B push-tab 338, a Part-B retainer clip 340, and a Part-B latch holder 342. When the Part-A 314 is aligned with Part-B 316 to couple the two parts (as indicated via directional arrow 315), the battery 320 would first be inserted appropriately and by pushing the battery down into space provided and making electrical contact possible.

The Part-A alignment pegs 334 would engage with Part-B retainer clip 340 before the intra-part connector pins 330 wound couple with connector 328 on the Part-B 316 section. The retainer clip 340 of Part-B would 'bend' inward to accommodate the Part-A alignment pegs 334 until fully seated, when retainer clip 340 would 'spring' back to its original position and capture the alignment pegs 334 of Part-A on the catch 336 surface, with the Part-B latch holder 342 surface.

At this point, the two assemblies, Part-A 314 and Part-B 316, are 'snapped together' and fully coupled, secure and electrically unioned. It is also at this point that battery 320, having +/− electrical contacts 344 mate with printed circuit board, (+) contact 346 and (−) contact 348. See FIG. 20d, showing the battery fully seated and contacts 344, 346 and 348 matted. There will be more discussion on these +/− electrical contact later in this disclosure.

FIG. 20b shows the light bulb of the two separate housings (314 & 316) of FIG. 20a, assembled to complete the system H-A. No other references are depicted in this figure so a clear cross sectional view can be better seen, exactly how the parts engage with one-another allowing them to snap together and be detachable.

The cross-sectional illustration in FIG. 20c is of the Edison style light bulb housing H-A of FIG. 20b, showing the release mechanism of the two-part design, getting ready to separated. The Part-B 316 push-tabs 338, when pushed-inward, as indicated by directional arrows 317, would release the latch holder 342 (of retainer clip 340) to the surface on Part-A catch 336 of Part-A alignment pegs 334.

Now in FIG. 20d is illustrated the housing Part-A 314 and Part-B 316 being separated after the release shown in FIG. 20c, as indicated by directional arrow 319. At this point the units can be separated. This feature can be useful should maintenance be necessary, or for example, to change a Part-B assemble with a new one; perhaps one with a different language library set for voice recognition.

Figures 21, 22:
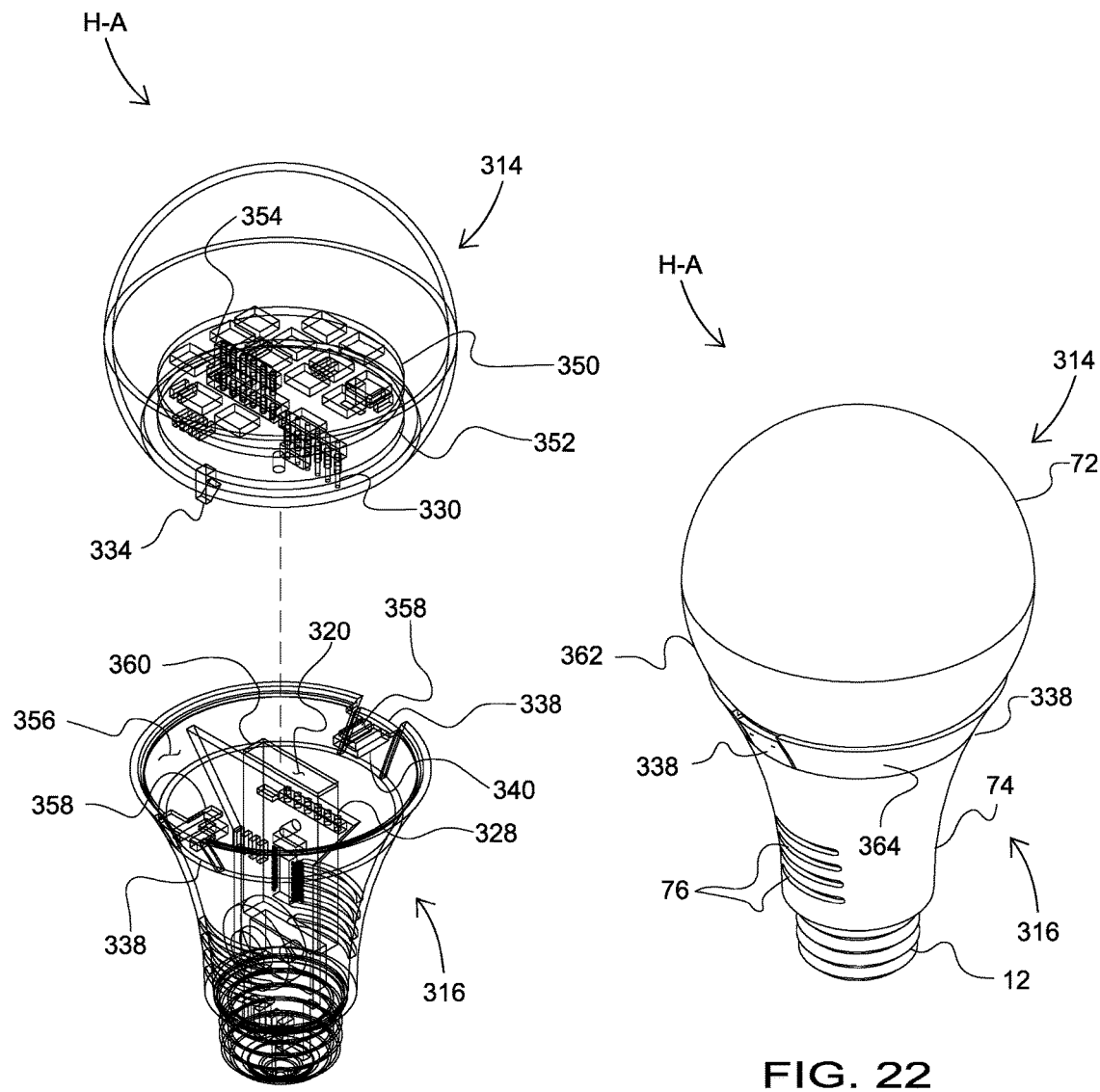
FIG. 21 is a wire-frame isometric view, visually detailing internal structures of the modular design of the present invention with the two-pieces separated, in accordance with an embodiment of the present invention.
FIG. 22 is a perspective view of the present invention in its second alternate embodiment, fully assembled and ready for installation.

FIG. 21 is a wire-frame isometric view, visually detailing internal structures of the two-part design in this second alternate embodiment of the present invention. Disclosed, are the printed circuit boards (PCB) in the Part-A 314 section, a LED PCB & heat sink 350, and, a Part-A processor electronics PCB 352. The two PCB's 350 and 352 are electrically connected via an intra-PCB connector 354. Part-B 316 has a Part-B housing cover 356, a cover slots 358, and a cover hole 360.

The Part-B housing cover 356 provides containment to the Part-B 316 assembly, with having cover slots 358 to accommodate the Part-A alignment pegs 334 (when inserted) through to the Part-B retainer clip 340. Also, the Part-B housing cover allows the intra-part connector pins 330 (of Part-A 314) to pass through to mat with the female connector receiver 328, making possible electrical union between the two parts 314 and 316. The cover hole 360 (in Part-B housing cover 356) allows the battery 320 to be inserted into the Part-B 316 housing; as was disclosed in an earlier discussion.

FIG. 22 is a perspective view of the present invention in 'two-part assembly' alternate embodiment, fully assembled (the two parts, 314 & 316, snapped together) and ready for installation into a lighting fixture, disposed for service as a lighting device, and, a danger detection device; with voice command and control. In FIG. 22 is shown a Part-A electrical housing base 362 and a Par-B retainer housing 364. These housings (362 & 364) facilitate the two part assemblies Part-A 314 and Part-B 316 to be coupled together; via the workings of 334 and 340.

Figure 23:
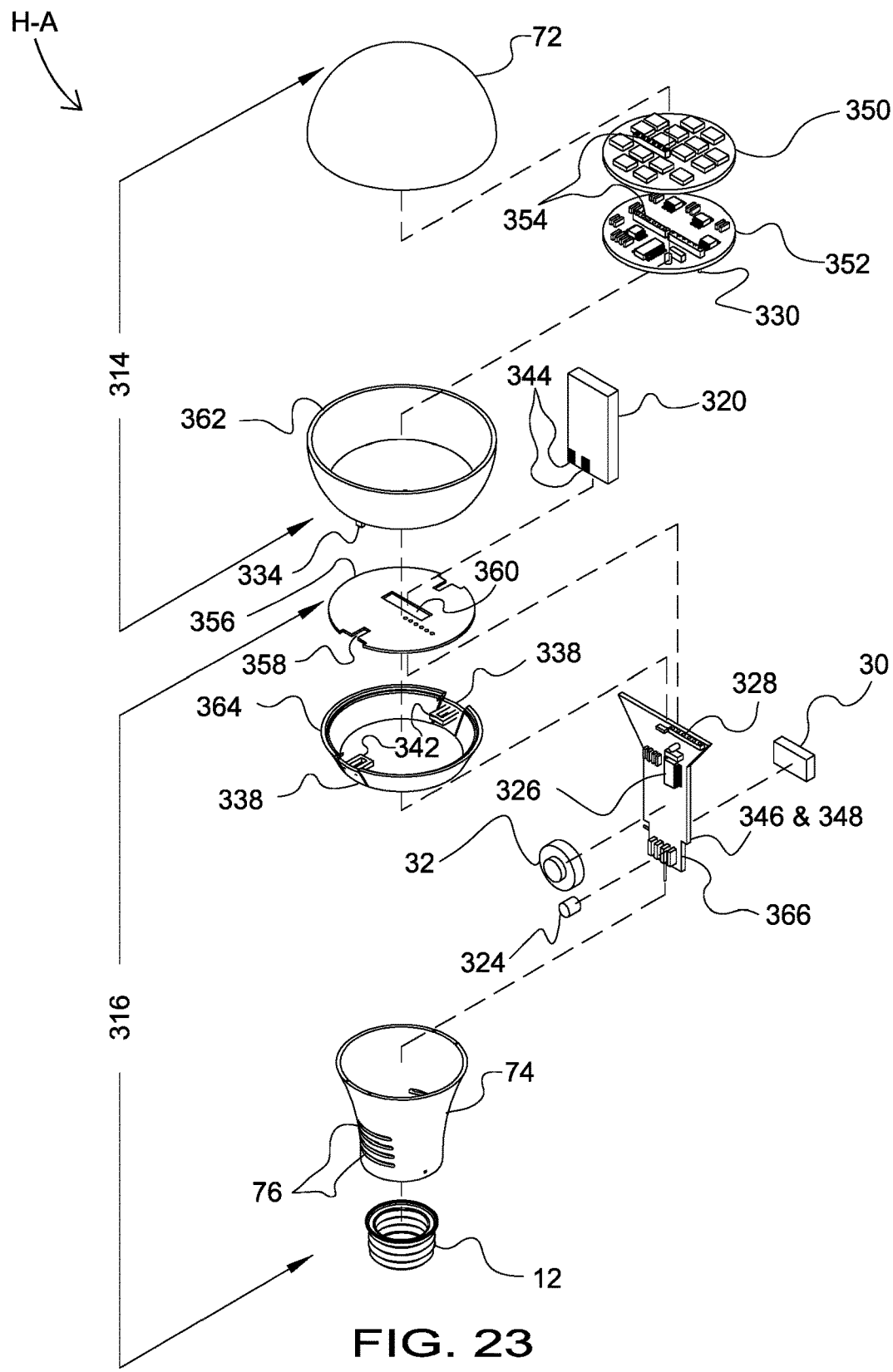
FIG. 23 is an exploded, perspective view of FIG. 22 showing all major components and their relationship to one another, in accordance with an embodiment of the present invention.

In FIG. 23 is seen an exploded, perspective view of FIG. 22, showing all major components and their relationship to one another. The LED PCB & heat sink 350 is electrically coupled to the Part-A processor electronics PCB 352 (via intra-PCB connector 354) and fit into the Part-A electronics housing base 362, with intra-part connector 330 pins sticking through the base. The light-defusing reflector 72 dome is permanently affixed to the Part-A electronics housing base after the above mentioned components are inserted at time of manufacture, and, when assembled, becomes the LED, communications and processing Part-A 314 assembly.

The sensor, alarm and voice recognition Part-B 316 assembly, consist of electrical connector 12, attached to the electronics casing 74. A Part-B controller electronics PCB 366 is electrically connected to the connector 12 and provided 120 VAC power to the unit when available. The Part-B controller electronics PCB, having disposed on the upper edge, the female receiver connector 328 (to receive the matting pins of intra-part connector 330 of the Part-A 314 assembly). Further disposed on the 366 PCB, are the voice recognition circuitry 326, sensor(s) 30, horn 32 microphone 324 and the (+) contact 346, and (−) contact 348 to electrically couple with the rechargeable battery 320, +/− electrical contacts 344.

It is significant to note that there is incidental structure to hold the battery in place within the Part-B 316 assembly, which is not shown in this illustration so as to provide a clearer presentation of the main components. After the Part-B controller electronics PCB 366 is installed into the electronics casing 74, the Part-B retainer housing 364 (with Part-B housing cover 356) is permanently attached to one another. The rechargeable battery 320 is intended to be inserted into Part-B cover hole 360, before the two assemblies 314 and 316 are attached by snapping together as above described.

As was disclosed before, the unit will be packaged and shipped with these three components (Part-A 314, Part-B 316 and battery 320) not attached. The used will insert the battery and complete the assembly of the two parts (314 & 316) before installing the improved LED light bulb with detector means and voice recognition 10c, into a lamp or fixture. The 'snapping' together, will activate the electronics and the system becomes alive. Although this describes the preferred activation means of the present invention, for end user installation, other means can certainly be implemented. For example, the Part-A 314, Part-B 316 and battery 320 can be fully assembled at the factory and electrical activation can be achieved by adding an isolation tape/ribbon 'pulling-out-means' at time of installation. The tape or ribbon, of course, would isolate the battery 320 +/− electrical contacts 344 from the PCS 366 assembly (+) contact 346 and (−) contact 348 until the device is ready to be installed. Removing the isolation tape or ribbon would electrically activate the system to be available for service.

One other note in the battery consideration needs to be emphasized. The preferred battery technology, at the time of the present invention disclosure, is a lithium battery. However, newer battery technologies are just one the forefront for use. These technologies promise greater live, less time to charge and more safety in their use. The inventors fully recognize the potential of such new battery technologies, and will incorporate said newer battery advances when they become available for common use.

Figure 24:
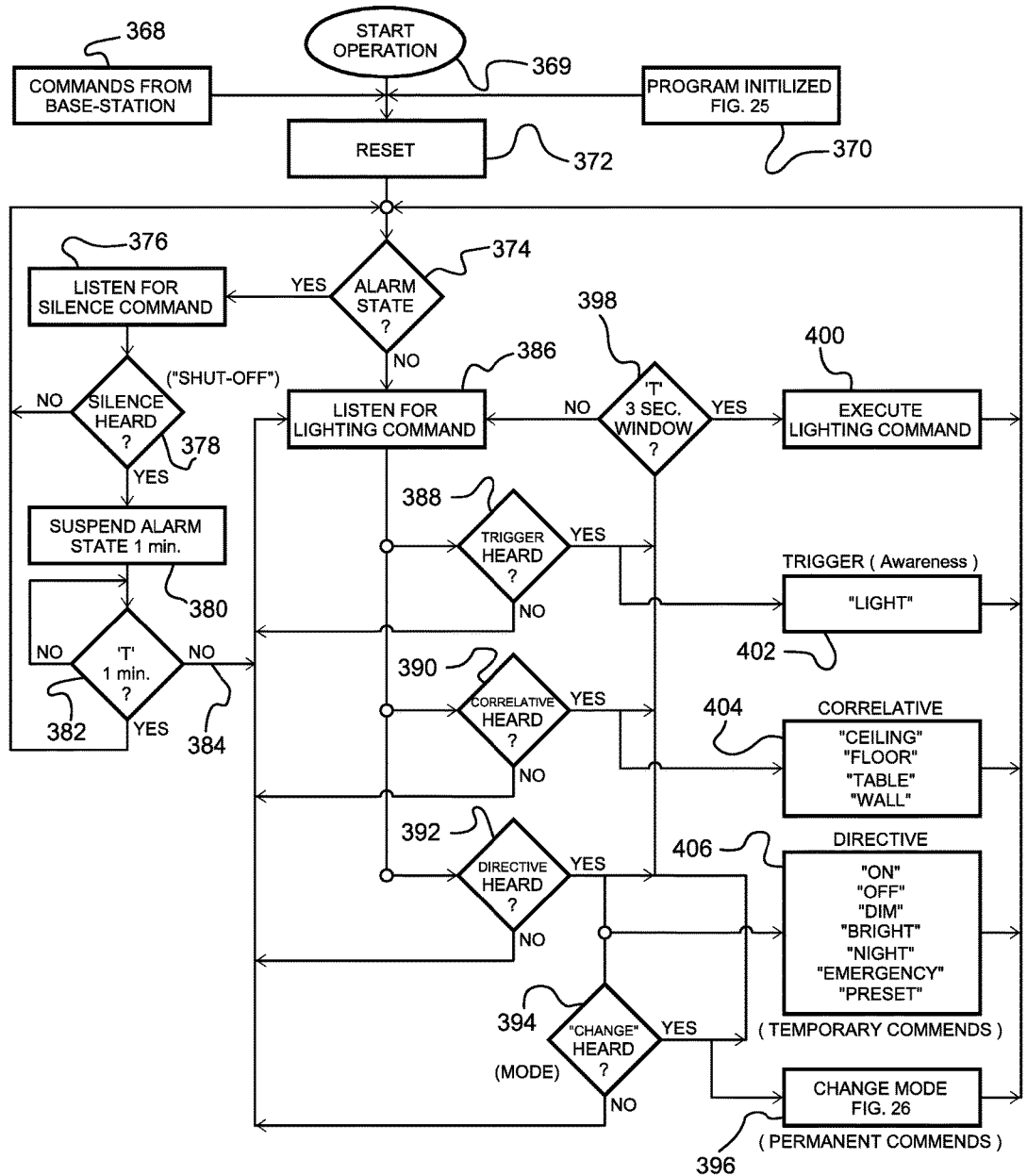
FIG. 24 is a flow-chart detailing the OPERATIONS process of the second alternate embodiment of the present invention.

FIG. 24 is a flow-chart detailing the OPERATIONS process of 'two a part assembly' alternate embodiment of the present invention (10c). Once the system becomes 'alive', as described in the previous paragraph, the process starts at oval 369. A command from base station 368 process, or, a program initiation 370 process are always ready to input the start operations 369. The processes 368 and 370 will be more detailed later. The operations start with a reset 372 process, and then checks for an alarm state-? 374.

If an alarm (as detected by a smoke, or carbon monoxide, or gas sensor, as may be equipped in any given unit 10c), exists with a 'YES', the system would activate audible and visual alarms (as was disclosed earlier in this patent), and then listen for 'silence' command 376 process. If a silence heard 378 (command to "SHUT-OFF") is 'NO'; the process cycles back to alarm state 374. If a silence heard 378 to "SHUT-OFF" is 'YES', a suspend alarm state 1-minute process is entered, and, 'T' 1-min. 382 is active. The timer 382 counts down and re-cycles upon itself during such suspension of alarm state. The audible alarm and visual strobing LED's (white, colored depending on alarm type, or green in the case of a repeat alarm) are suspended during this period of time. The 'NO' process (from 382) further is entered to the listen for lighting command 386 process during the 'T' 1-min. 382 timer period, so the user can order lights to function, if desired. When the 'T' 1-min. 382 is timed-out, the 'YES' is entered and the process is reverted back to check for an alarm state-? 374. At this juncture, should the conditions for an alarm still exists, e.g., smoke, carbon monoxide or gas, or, repeat alarm, the system will again alarm and the processes would reiterate itself.

Returning now to the alarm state-? 374, in the case of a 'NO' is determined. The process would advance to listen for lighting command 386. The process 386 would listen for three possible command fields, a trigger heard 388, a correlative heard 390, or a directive heard 392. The voice recognition library in memory is limited to about twenty 'word' commands. They are listed in the word-table by fields below:

| VOCABULARY WORD TABLE: | | | |
| --- | --- | --- | --- |
| OTHER | TRIGGER | CORRELATIVE | DIRECTIVE |
| SHUT-OFF | | | |
| | LIGHT | CEILING | ON |
| | | FLOOR | OFF |
| | | TABLE | DIM |
| | | WALL | BRIGHT |
| | | | NIGHT |
| | | | EMERGENCY |
| | | | PRESET |
| CHANGE | | | AUTO |
| | | | TIMER |
| | | | RESET |
| | | | TEST |

There vocabulary of word voice commands (listed in the Vocabulary Word Table), can be further 'learned' by the base-station BS, of any inflection unique to an owner of the system, and, recorded to memory. This will be more fully discussed later.

In the case of trigger heard 388 is "YES", only one word is acceptable: LIGHT 402. The process would start timer 'T' 3-sec. 398 for three seconds. The other two fields (correlative heard 390 and directive heard 392) must be accomplished with the 'T' 3-sec. 398 window of time, and, if "YES", the command is executed in execute lighting command 400 process. If the full three-part command is not accomplished within the timing window 'T' 3-sec. 398, the process reverts back to listen for lighting command 386 via the 'NO' process.

It is significant to note that the commands establish a unique pattern of dialogue, with the system 10c, having three elements; 1) an awareness/trigger (prompt) part, 2) a correlative (object) part, and 3) a directive (instruction) part. An example of a command could be "light-table-dim" spoken in any combination ("dim-table-light," or "table-dim-light", etc.). Meaning, the light(s)' (awareness/trigger) on the 'table' (correlative/object) in a room full of different lights such as ceiling, floor, wall, etc., and, go to 'dimmer' setting (directive/instruction).

It is further significant that all lighting lamp styles and shapes (as is disclosed earlier in this document and specifically the H-A, H-B, H-C, H-D, and H-E configurations) all 'fit' into one of the four, easy to understand, correlatives; ceiling, floor, table and wall. One example of this simplification is the "nightlight" (H-E configuration) would be identified as a wall unit. Similarly, an oil painting on a wall, lit either from a focused track light, recessed canister light from the ceiling, or wall sconce light, could all be identified as a 'wall' light, as the object, to the preference of the user of the present invention 10c. The identifying process of individual units, will be disclosed in FIG. 25.

The correlative heard 390 will respond 'YES' to only one of the four words in a correlative 404 field (ceiling, floor, table or wall). Likewise, the directive heard 392 is 'YES' to only one of the seven words in a directive 406 field (on, off, dim, bright, night, emergency or preset). The command responses for 404 and 406 will be further discussed below. If the directive change (mode) heard 394 is "YES", the process enters the change mode 396 process. The change mode will setup the basic operation of the device to one of three possible scenarios; AUTO mode, TIMER mode, or NO mode (that will be disclosed in FIG. 26).

Figure 25:
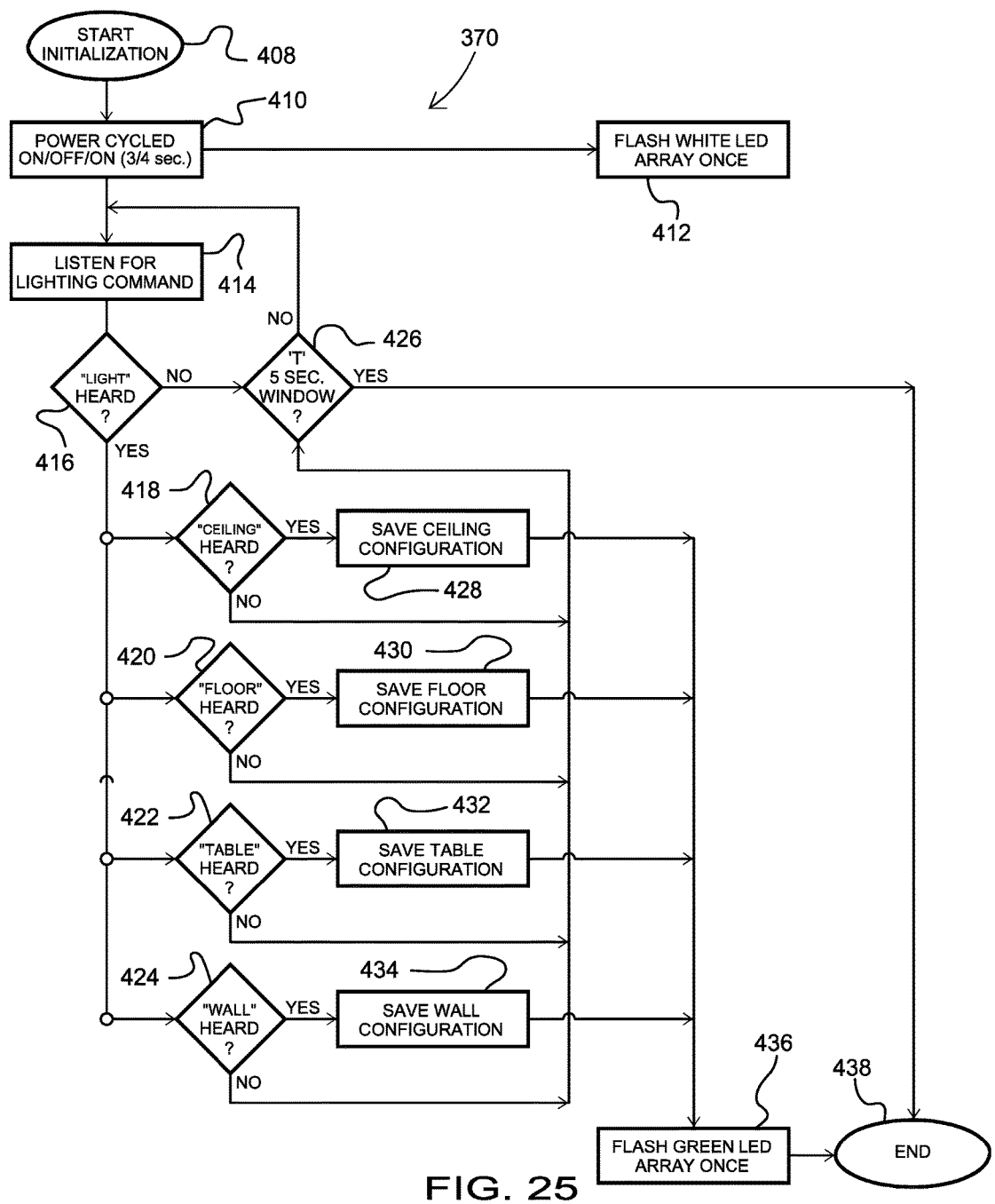
FIG. 25 is a flow-chart of the program INITIALIZATION process of FIG. 24, in accordance with an embodiment of the present invention.

FIG. 25 references a flowchart of the program INITIALIZATION 370 process, of FIG. 24. A start initialization 408 oval can be entered automatically upon the system first coming alive (battery inserted and unit assembled, 'snapped-together,' as was discussed earlier), or, upon commands from a base station in program mode. Or manually, via a power cycled 410 process (of the light fixture's switch being turned ON, then OFF, then back ON, within a short period of time, such as ¾ of one second, for example).

A flash white LED array once 412 process (white LED strobing array 24 in FIG. 19) will occur if successful ON/OFF/ON engagement of processed, to let the user know the unit is now in the initialization program mode. A listen for lighting command 414 process is entered, and if "LIGHT" heard-? 416 is successful (YES), the correlative object will next define the unit's identity; a "CEILING" heard-? 418, a "FLOOR" heard-? 420, a "TABLE" heard-? 422, or a "WALL" heard-? 424.

If any 'one' (that is the first one), of these objects is successful with the YES response, the process will enter; a save ceiling configuration 428, a save floor configuration 430, a save table configuration 432, or a save wall configuration 434 respectively. Upon any one of these executions (428, 430, 432 or 434) will save the unit's identity respectively and all future operations will respond only to such identity indicated in (328, 430, 432 or 434); until or when that particular unit is re-programmed to a different identity. After the identity process is saved, a flash green LED array once 436 process will occur (via green LED strobing array 25 of FIG. 19). And, the initialization program 370 is exited at the end 438 process; and returning back to operation routine in FIG. 24.

Referring back to the "LIGHT" heard-? 416, if process is 'NO', a "T" 5-sec. window 426 timer is started. During the 5 second time period, the process will revert back to the listen for lighting command 414 until a proper command is heard, or, will exit via the 'YES' upon completion of the time period, to the end 438 routine. Likewise if any of the objects 418, 420, 422, or, 424, is a 'NO' (that is NOT heard properly such as in a muddled speech command), the 'NO' process would return to the 'T' 5-sec. window 426; and either revert back to listen again or exit depending on any time remaining in the window.

Figure 26:
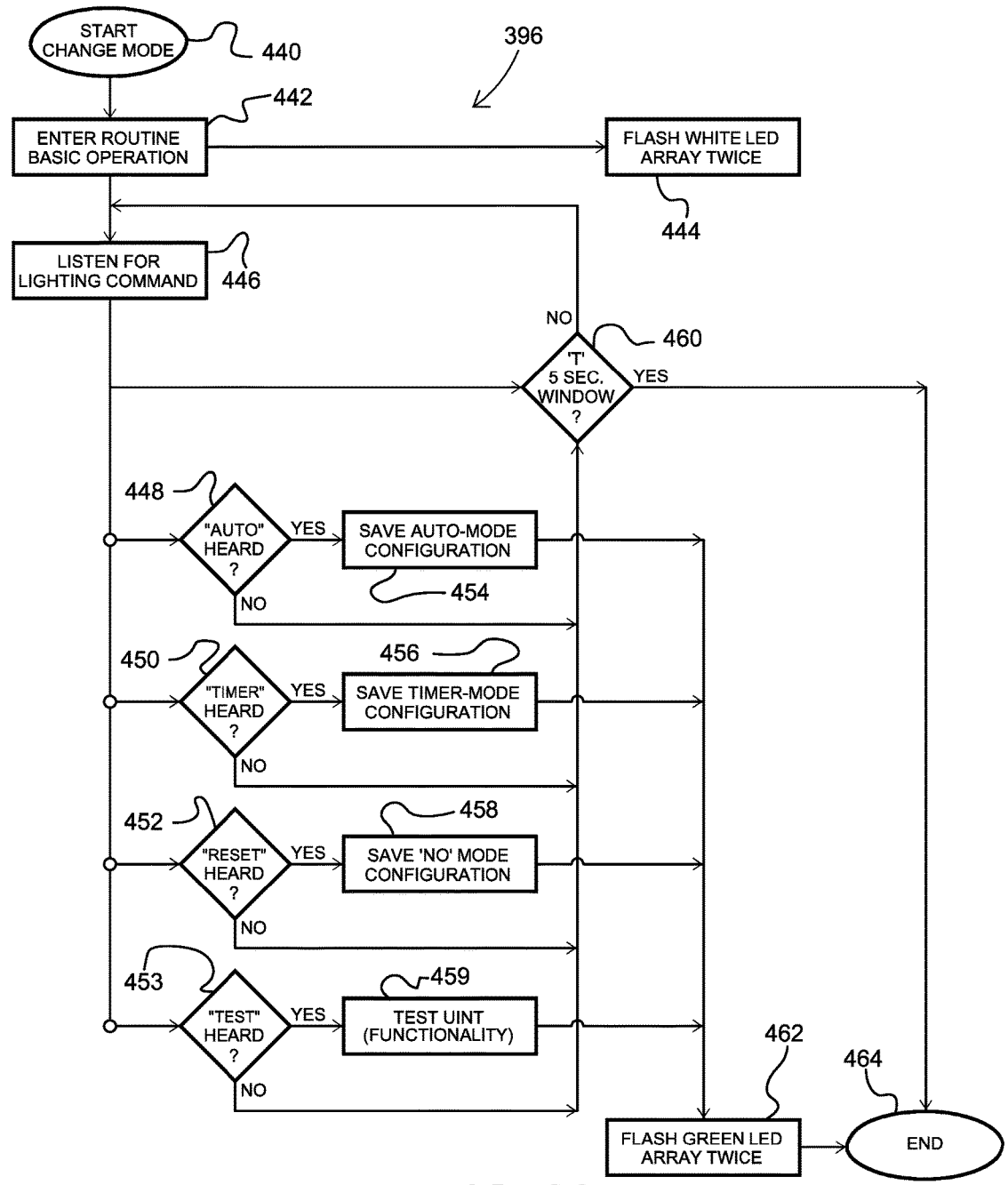
FIG. 26 is a flow-chart of the program CHANGE MODE process of FIG. 24, in accordance with an embodiment of the present invention.

FIG. 26 is a flow-chart routine of the program CHANGE MODE 396 process of FIG. 24. The change mode 396 is a permanent change of the behavior of the system 10c, to either an auto mode or a timer mode behavior. If neither auto or timer modes, then it would be no or none, mode selected (the modes of operation will be detailed later in this disclosure). The routine is entered at a start change mode 440 oval. This is a basic operation 442 process (as was just explained above). A flash white LED array twice 444 process occurs (by the white LED strobing array 24 in FIG. 19), letting the user know the system 10c, is in a program mode to change basic operation 442 behavior. The listen for lighting command 446 process will now be attentive for an "AUTO" heard-? 448, a "TIMER" heard-? 450, or a "RESET" heard-? 452 commands, and start a 'T' 5-sec. window 460 timer.

Upon any one of these executions (448, 450 or 452) with a 'YES', will save the unit's basic operation function respectively, to a save auto-mode configuration 454, a save timer-mode configuration 456, or a save 'no' mode configuration 458, and, all future basic operation functionality will respond only to such mode selected (448, 450 or 452); until or when the unit is re-programmed to a different basic routine function by re-entering start change-mode 440 process. After the change-mode process is successfully saved, a flash green LED array twice 462 process will occur (via the green LED strobing array 25 in FIG. 19), letting the user know that the mode successfully was changed and permanently saved. And, the change-mode program 396 is exited at the end 464 process; and returning back to operation routine in FIG. 24.

Referring back to the "AUTO" heard-? 448, or the "TIMER" heard-? 450, or the "RESET" heard-? 452 commands that are NOT heard (such as would be if the voice command is not properly spoken as in a muddled speech command or noise in the background), the process is 'NO', and the "T" 5-sec. window 460 timer is entered. During the 5 second time period, the process will revert back to the listen for lighting command 446 until a proper command is heard, or, will exit via the 'YES' upon completion of the time period, directly to end 464. This would be an unsuccessful attempt to change modes and no action was taken; the user could retry to enter the change-mode 396 routine if desired to change mode again.

Finally, if a command to "TEST" heard-? 453 is 'YES' would cause a unit enter test unit 459 process. The test 459 process would 'step-though' an alarm state both with audibly sounding of the horn and the strobing of the white and colored LED's, as the system 10c is equipped. Such testing would be, for example, at least one chirp of the horn, one strobing of the white LED array, one strobing of the colored (red and/or amber and/or blue) LED array, and one strobing of the green LED array. After the test is complete, the process test 459 is exited to the flash green LED array twice 462 process and exit the routine via end 464. The TEST command can be via the query command using the base-station control-center for a system wide full test of all network devices.

Figure 27:
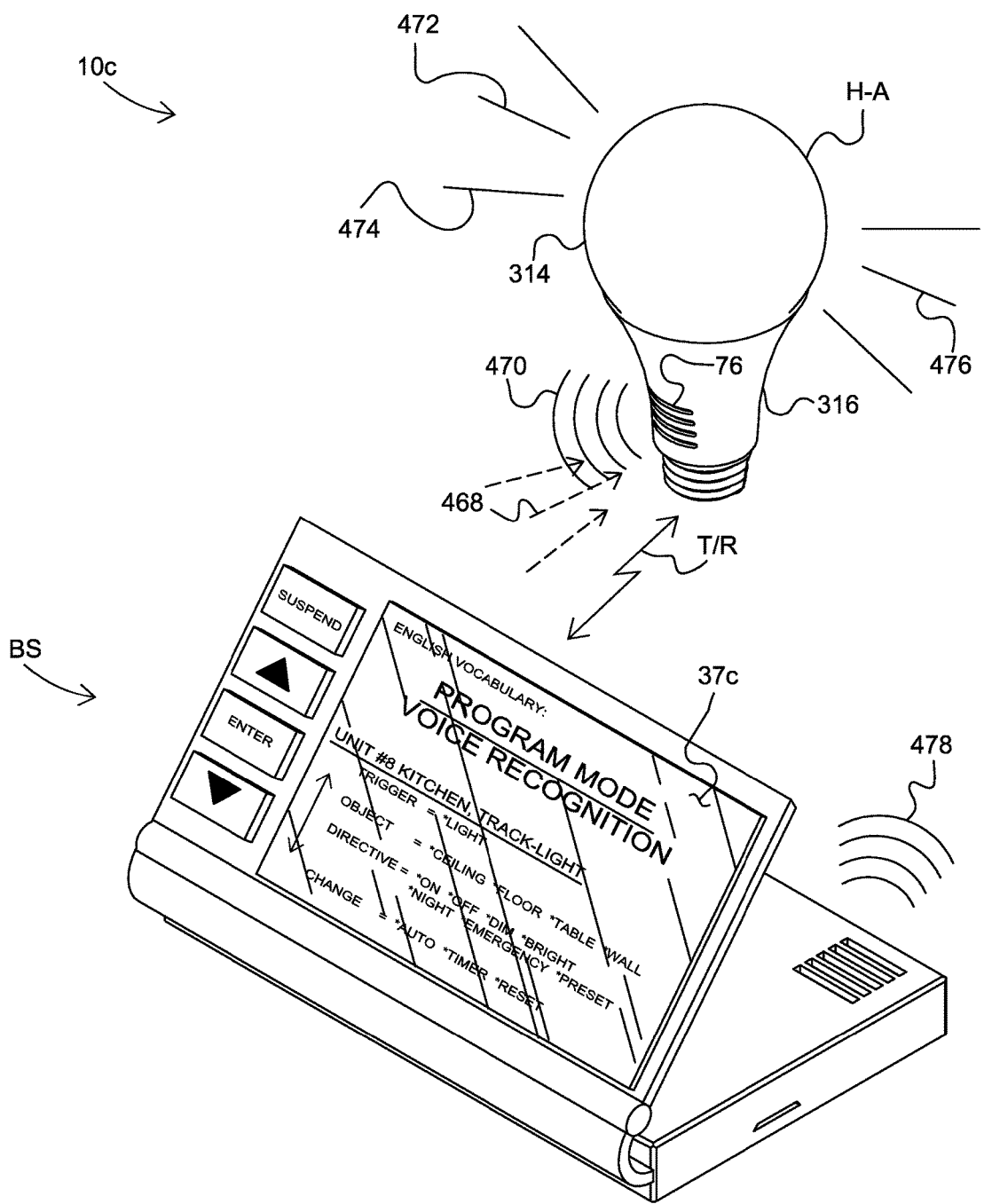
FIG. 27 is an illustration of the base station (control-center) of the second alternate embodiment, interacting with the two-piece improved LED light bulb detector 10c, of the present invention, showing the program mode for the voice recognition menu, in accordance with an embodiment of the present invention.

FIG. 27 is an illustration of the base-station (control-center) of the alternate embodiment, interacting (networking) with the 'two-part assembly' improved LED light bulb detector 10c, of the present invention, showing the program mode menu for the voice recognition set-up. The base-station BS, having the display screen 37c is showing program mode for voice recognition, and, displaying its vocabulary in 'English.' The base-station BS further communicates with the user via speech, represented by the curved lines 478. The radio frequency RF transmit/receive signals T/R communication with Edison style (H-A), 'two-part assembly' improved LED light bulb detector 10c.

A dashed lines 468, a curved lines 470, a burst of light lines 472 and 474, and, a light lines 476, all show the system 10c interacting with the base-station BS. The dashed lines 468 representing smoke, carbon monoxide, or gas entering into the vents 76 of the Part-B 316 assemble (where the detector sensors are located therein). The curved lines 470 representing sound emanating the audible alarm of the horn. On the Part-A 314 section, burst of light lines 472 representing white and colored LED's either strobing (in the case of an alarm) or flashing once or twice in white (in the case of entering into program modes as referenced in FIGS. 25 and 26 as 412 or 444 respectively).

The burst of light lines 474, representing green LED's either strobing (in the case of a repeat alarm) or flashing once or twice in green (in the case of exiting the program mode as referenced in FIGS. 25 and 26 as 436 or 462 respectively). The light lines 476, are representing the light commands for illumination in a normal operating of the light bulb functionality of 10c. Such commands as ON, OFF, DIM, BRIGHT, NIGHT, EMERGENCY and PRESET, in accordance with mode settings as AUTO, TIMER and NONE, would all cause the system to action as appropriate to its namesake (these operations and actions will be discussed in more detail in the following paragraphs).

In operation, the improved 'two-part assembly' LED light bulb with smoke, carbon monoxide or gas detection means, have the ability to respond to voice recognition commands, in this embodiment 10c, is preferably constructed in two parts; the LED/communications/processing Part-A 314 and the sensor/alarm/voice recognition Part-B 316. Said two parts being easily assembled with a rechargeable battery 320 by the user at installation of the system (by 'snapping' the two parts together) and causing it to become electrically active for service; by venture of the battery being 'pushed' into place and making physical electrical contact of the battery to the PCB (+) and (−) points. When first activated, the unit would flash the white LED array 24 once (via the process 412) and wait for a verbal command to identify the unit as a ceiling, floor, table or wall light object, and, when successful in the identifying process, flash the green LED array 25 once (via the process 436).

The device will now be responsive here forward to the identity correlative (ceiling, floor, table or wall) as an object. The system 10c can further be programed with a mode; auto, timer or none by giving it such commands (the program indications to 'change' is with two flashes of the white for entering change mode (process 444) and two flashes of green LED's on exiting change mode (process 462). In either case, the object identifier or change mode programing events are stored in a non-volatile memory and will remain such until the unit is re-programed at soon future time as desired.

With respect to the directives ON and OFF, the system 10c would turn the white LED main array 22 (alone with array 24 in a stable state, reference FIG. 19) to either full on or off as the case may be. With the voice commands DIM or BRIGHT, the system 10c wound decrease or increase light intensity of the said LED's, for example, 20% for dim and 10% for bright, per command as the case may be. The command NIGHT, would set all networked system 10c to a predetermined state of illumination. Some units may be full on and others full off, and still other at some level of brightness. The user would identify the statue of each individual unit (object), to the NIGHT directive as desired. When the NIGHT is commanded, either any given individual unit voice command or via all units with the base-station BS control-center command. This is particular useful to the user when retiring for the evening; to simply command the NIGHT directive and all lights go to their designated detail task of illumination.

Similarly, the EMERGENCY command directive, would illuminate all desired networked systems 10c to come to action in a two-capacity feature. The first, for example, an unknown noise was heard in the middle of the night, the user could command EMERGENCY and all predetermined units would respond with illumination, flashing, full on (giving a 'panic' sense of importance). In the second case, the EMERGENCY command will allow illuminate during 120/240 VAC line power outages, using just a 20% illumination (giving enough light to sufficiently see surroundings). Thus extending the time the battery can give emergency lighting of the system 10c. The PRESET feature is a mood environment level of light that was a desirable set-up and saved. For example, commanding a unit to a DIM setting, say down to just 40% (i.e., three 20% dim directives), and, then using the preset to save the desired setting for future commands. The unit would go directly to the preset level of intensity when commanded in future use be verbally commanding PRESET as the directive. To summarize, each 'directive' command is defined as follows:
  a) ON=system LED illumination too full 'on',
  b) OFF=system full off,
  c) DIM=if system is 'off', illuminate to 80%, if system is 'on' decrease illumination by 20% for each DIM command,
  d) BRIGHT=increase illumination by 10% for the first-of commands, then by 20% for each additional BRIGHT command,
  e) NIGHT=system to go-to predetermined setting (ON, OFF or DIM),
  f) PRESET=system to go-to predetermined setting (ON or DIM),
  g) EMERGENCY=system LED illumination too full 'on-flashing' if 120/230 VAC line power is available, else use 20% illumination for battery operation.

The CHANGE mode feature, will set the system 10c to behave in any of four routines. The AUTO mode configuration would illuminate any given unit, to ON or OFF when activity is sensed in the area. For example, a user walking in a room or hallway, and the lights automatically turn on, and off again when the user leave the area. The sensing can be of two different processes, 1) by listening to sounds and reacting, or 2) by a motion detector (not shown in any figures).

The TIMER mode configuration would turn lights on or to a preset level, at a sliding time period for an interval of time. This is accomplished by showing the unit when to activate (either on/dim setting and off), if the TIMER feature was commanded at said time period, the unit would behave in like manner, to a 'sliding schedule' there forward.

Again for example, commanding a system 10c on to a preset of 80% at 6:00 pm and then off at 10:00 pm (if TIMER was initiated at both commands), the system 10c would automatically turn on to 80% and off at a daily regular schedule. However, the timer schedule would be with-in a sliding range plus or minus one half hour for each event. The system does not have a so-called time-of-day chock internal to it, it simply just counts hours and thereby would repeat the timer schedule to a pseudo twenty-four-hour interval (+/− to the ongoing sliding range). The timer mode is particularly useful if the user is not home, and would give the illusion that the user is at home and doing the lighting manually.

The RESET mode feature, will deactivate either the auto or timer modes and put the system 10c to none (or 'no' mode), where upon the unit now behaves with just the regular ON, OFF, DIM, BRIGHT, NIGHT, EMERGENCY or PRESET commands only.

Finally, the command to TEST would cause the unit 'step-though' an alarm state both with audible sounding of the horn and the strobing of the white and colored LED's, as the system 10c is equipped. For Example, such test would be one chirp of the horn, one strobing of the white LED array, one strobing of the colored (red and/or amber and/or blue) LED array, and one strobing of the green LED array. Note, a more 'system-wide' comprehensive test is accomplished via the base-station control-center through the query feature.

The command and control process of the system 10c is very easy to understand and use. From just out-of-the-box and the two parts 'snapped' together, the unit would flash the white LED array and the use would say the intended objective, i.e., "TABLE LIGHT." Then install the system into the lamp fixture. The use would there forward simply command "TABLE-LIGHT-ON", in the listing range of the unit, and the system would follow the command. If the light was too bright, another command . . . "TABLE-LIGHT-DIM" and the unit would dim down to 80% of full capacity, etc. The other commands and controls are just as simple to understand, follow and execute.

One other feature is important to understand. Since the lamp fixture on/off switch is normally left in the ON position (and always having 120/230 VAC Line voltage available to the system 10c), one could position the lamp fixture on/off switch 'off'; then followed immediately back to 'on.' This would cause the lamp fixture to simply turn ON; with no voice command or any other action. Such a feature is particularly useful to a guest in the owner's home, that may not be familiar with the system lighting commands. The guest would simply operate the switch as normal, and when there is no action (since the switch was now in the off position), it is presumed that the guest would position the switch back to its original position, and thus, turn the light on. In any case, informing a guest to do such an instruction is simple to accomplish and remember; over having them to remember lighting commands.

The lamp fixture would stay in this 'on' state until the next scheduled event (AUTO, TIMER) and voice command (OFF, DIM, NIGHT, EMERGENCY or PRESET) was ordered. In other words, the light fixture would act, fairly close to a conventional light; with respect to turning 'on' the fixture. It is important to understand, in this scenario of a guest entering a room, of a home that had was equipped with the lighting system 10c, of the present invention, and, not being familiar with the command process, e.g., the light would come 'on' by functioning the mechanical fixture switch as found conventionally in any home.

Finally, the improved light bulb (light, lamp or fixture), is making obsolete the use of an on/off switch altogether; as is conventionally conceived. Such a feature is particularly useful when the present invention is installed as part of a 'hard-wired' device, as required by law in installations in proximity to furnaces, where, a smoke, carbon monoxide and gas detection systems becomes paramount to safety. In this scenario, the system 10c would be hard-wired to an electrical utility box (as would be found in a furnace room). The unit would fully function using 120/230 VAC line voltage and with rechargeable battery backup, and a light illumination device having voice recognition command capabilities, along with, a smoke, and/or carbon monoxide and/or gas detector; all with the benefits of networking as detailed earlier in this disclosure.

Although the system 10c can function fully on its own, it is well complimented to work in conjunction with the base-station BS control-center. Programing can be initiated via simple to execute menu driven applications augmented with sound and voice commands. With respect to any given language (English, Spanish, French, etc.) both the system 10c and the base station can have its limited vocabulary library stored in memory, and then selected on board, or, different models with different languages programed into it for different marketing countries. The base-station BS can also 'download' a different language library to the system 10c via the T/R communications means.

The inventers want to make clear, that by 'programing' of the vocabulary, comprising the speech voice recognition library in each system 10c, can be a learning process. For example, someone who has a speech impediment, accent or any kind of non-normal speech that would make the voice command difficult to ascertain, said speech unique to the systems owner can be achieved by venture of a learning process. That is, the base-station BS can 'prompt' the owner (via a menu driven routine) to pronounce each voice command, and, record to memory its particular 'learned' articulation. The base-station BS then can forward via the T/R communications, to each system 10c in the network. The result is that each network system 10c now can fully understand 'so-called' standard voice command (that was part of the manufacturing process), and, the learned unique speech inflection of the same commands.

The disclosed system 10c illustrates a preferred operating routine. For this 'two-part assembly' alternate embodiment containing voice recognition commands and controls, and, have disclosed that the two-part assembly is mechanically constructed as an improved light bulb with smoke, carbon monoxide and/or gas detector built-in.

It is explicitly understood that these routines and mechanical structures are for illustration of the benefits of the system 10c and base-station control-center system, and that other means of operating routines and mechanical arrangements can be implemented (even though not listed) by those skilled in the art, without straying from the teaching the inventers have set forth. Therefore, it is understood that any other commands, or mechanical structures can be adopted and applied, and still be will considered under the philosophy and teaching of the present patent disclosed.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A networked visual and audible alarm light system with controlling a base station and a speech voice recognition controller, the system comprising:
   a lighting lamp fixture for lighting in a two-part 'snap together' assembly;
   a plurality of partitions, separating areas of internal space in said lighting lamp fixture;
   an LED light operational in said a lighting lamp fixture;
   a detector for smoke, carbon monoxide and gas detection;
   an alarm within said areas of internal space in said a lighting lamp fixture, the alarm having an audible pulsation and a visual pulsations;
   a tester to test operation of the audible pulsation and the visual pulsation from the alarm;
   a power conditioner;
   a speech voice recognition controller operational in said lighting lamp fixture, the speech recognition controller operational to recognize a plurality of predetermined voice commands and at least one voice pattern;
   a silencer for silencing the alarm with the plurality of predetermined voice commands, the plurality of predetermined voice commands including: shut-off;
   a microphone for listening to said plurality of predetermined voice commands and at least one sound pattern in a period of time;
   a communicator for alerting additional systems in a network about the alarm;
   a rechargeable battery, said battery being activated for actuating the system;
   a base station for controlling the system; and
   a code to program the base station, the code defined by a unit identification number.

2. The system of claim 1, wherein said speech voice recognition controller includes at least one of the following: a trigger portion, a correlative portion, and a directive portion.

3. The system of claim 2, wherein said speech voice recognition controller comprises a microphone operable to capture said plurality of predetermined voice commands and said at least one voice pattern.

4. The system of claim 3, wherein said speech voice recognition, has a recordable voice command vocabulary library means, to download to all network voice command devices, whereby causing a learned inflection of voice commands within a network.

5. The system of claim 4, wherein said trigger portion, said correlative portion, and said directive portion comprise a lighting command operable to actuate a light to power on, dim, and power off.

6. The system of claim 5, wherein said trigger portion comprises a light prompt.

7. The system of claim 6, wherein said correlative portion comprises an object.

8. The system of claim 7, wherein said plurality of predetermined voice commands include at least one of the following: a ceiling command for actuating a light, a lamp, or a fixture on a ceiling, a floor command for actuating the light, the lamp, or the fixture with a base on a floor, a table command for actuating the light, the lamp, or the fixture on a table, and a wall command for actuating the light, the lamp, or the fixture on a wall.

9. The system of claim 2, wherein said directive portion commands a light to operate in at least one of the following: on, off, dim, bright, night, preset, and emergency.

10. The system of claim 9, wherein said on command actuates said light to 100 percent of illumination, said dim command actuates said light to decrease about 20 percent of illumination, said bright command actuates said light to illuminate an increase about 10 percent of illumination, said off command actuates said light to illuminate about 0 percent of illumination, said night command changes said illumination from a range of 0 percent to 100 percent, and said preset command changes said illumination from a range of 0 percent to 100 percent, and said emergency command actuates said light to 'flash' ON/OFF indicating an panic means.

11. The system of claim 9, further comprising a plurality of modes of operation that are operable to respond to the plurality of predetermined voice commands, the plurality of modes including at least one of the following: auto, timer, reset, and test.

12. The system of claim 11, wherein said plurality of predetermined voice commands further comprise at least one of the following: a change-auto command that is operable to enable said alarm light system to power on and off when a motion is detected, a change-timer command operable to actuate the alarm light system to power on and off for a timed interval, change-reset command operable to return said alarm light system to a no-mode or a none state.

13. The system of claim 11, wherein said plurality of predetermined voice commands comprise a change-test command operable to actuate the alarm light system to step-through the audible sounding the alarm and the visual strobing of a plurality of light emitting diodes.

14. The system of claim 12, further comprising a power switch operable to power on and power off the light, the lamp, and the fixture, the power switch being operable to be maintained in an on position, or removed.

15. The system of claim 10, wherein said plurality of predetermined voice commands comprise an emergency command operable to actuate one of two emergency lighting states, whereby one of said emergency lighting states is operable when a 120/230 VAC line power is available, whereby a light flashes full on and off to indicate a panic alert state, and whereby another of said emergency lighting states is operable when said 120/230 VAC line power is not available, whereby the light illuminates about 20 percent of capacity for illumination in an emergency lighting state using battery power.

16. The system of claim 1, wherein said plurality of predetermined voice commands include a shut off command operable to suspend operation of said alarm system, whereby said alarm system resumes operation after a pre-determine duration if alarm conditions are not cleared.

17. The system of claim 1, wherein the base station communicates by receiving and transmitting a real-time radio frequency to said lighting lamp fixture and said speech voice recognition controller, said communications comprising the unique coded identification number.

18. The system of claim 17, wherein said base station is operable to network between multiple systems, said base station communicating using a radio frequency signal to transmit and receive between the light emitting diodes, said light emitting diodes operable to emit an alternating white high intensity light emitting diode with colored high intensity light emitting diode, and further comprising an audible signal.

19. The system of claim 1, wherein said lighting lamp fixture is operable to replace a lighting device in a house, wherein each section partition in said lighting lamp fixture comprises a light emitting diode section, an electronics chamber, an isolated detector, a microphone, or a horn space, for smoke, carbon monoxide or gas and sound to enter and exit, wherein said audible and visual pulsation comprises a rhythmic pattern of lights and sound in three beats on, to one beat off.

20. The system of claim 1, wherein a period of time elapses between said audible alarm pulsations pattern, for listen via the microphone for a verbal command to shut-off and suspend the alarm state.

* * * * *